(12) United States Patent
Ransijn

(10) Patent No.: US 12,489,659 B2
(45) Date of Patent: Dec. 2, 2025

(54) DISCRETE-TIME LINEAR EQUALIZER FOR DISCRETE-TIME ANALOG FRONT-END

(71) Applicant: Microchip Technology Incorporated, Chandler, AZ (US)

(72) Inventor: Johannes G. Ransijn, Salem, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/640,493

(22) Filed: Apr. 19, 2024

(65) Prior Publication Data

US 2024/0372758 A1 Nov. 7, 2024

Related U.S. Application Data

(60) Provisional application No. 63/497,039, filed on Apr. 19, 2023.

(51) Int. Cl.
*H04L 25/03* (2006.01)
*H04L 25/49* (2006.01)

(52) U.S. Cl.
CPC .. *H04L 25/03878* (2013.01); *H04L 25/03006* (2013.01); *H04L 25/4917* (2013.01); *H04L 2025/03566* (2013.01)

(58) Field of Classification Search
CPC ......... H04L 25/03878; H04L 25/03006; H04L 25/4917; H04L 2025/03566; H04L 25/03885; H04L 25/03012
See application file for complete search history.

(56) References Cited

U.S. PATENT DOCUMENTS

| 5,872,470 A | 2/1999 | Mallinson et al. |
| 6,529,237 B1 | 3/2003 | Tsay et al. |
| 7,295,070 B2 | 11/2007 | Dillon |

(Continued)

OTHER PUBLICATIONS

International Search Report of International Application No. PCT/US2024/025542, mailed Aug. 23, 2024, 3 pages.
(Continued)

*Primary Examiner* — Vineeta S Panwalkar
(74) *Attorney, Agent, or Firm* — TraskBritt

(57) ABSTRACT

An apparatus comprises a discrete-time linear equalizer circuit. The discrete-time linear equalizer circuit comprises a sample and hold circuitry including multiple switched-capacitor circuits. The multiple switched-capacitor circuits include at least a switched-capacitor circuit of a pre-cursor tap, a switched-capacitor circuit of a cursor tap, and a switched-capacitor circuit of a post-cursor tap. A clock-driven switch circuitry is to switchably couple a capacitor of the switched-capacitor circuit of the pre-cursor tap to a signal input over a first time period, a capacitor of the switched-capacitor circuit of the cursor tap to the signal input over a second time period, and a capacitor of the switched-capacitor circuit of the post-cursor tap to the signal input over a third time period. The clock-driven switch circuitry is to switchably couple the capacitor of the switched-capacitor circuit of the cursor tap to an output, and the capacitors of the SHCs of the pre-cursor and post-cursor taps in a closed feedback loop with the capacitor of the switched-capacitor circuit of the cursor tap, over a fourth time period.

33 Claims, 16 Drawing Sheets

(56) References Cited

U.S. PATENT DOCUMENTS

| | | | |
|---|---|---|---|
| 7,911,370 | B2 | 3/2011 | Chou |
| 8,120,519 | B2 * | 2/2012 | Bales |
| 9,088,449 | B1 * | 7/2015 | Chang ............... H04L 25/03878 |
| 10,581,446 | B1 | 3/2020 | Braswell et al. |
| 10,686,643 | B1 | 6/2020 | Beukema et al. |
| 2004/0131131 | A1 | 7/2004 | Peach et al. |
| 2008/0174465 | A1 | 7/2008 | Sasaki et al. |
| 2014/0355663 | A1 * | 12/2014 | Kizer ............... H04L 25/03885 |
| | | | 375/236 |
| 2016/0105195 | A1 | 4/2016 | Mulder |
| 2019/0356874 | A1 | 11/2019 | Eshel et al. |
| 2021/0021448 | A1 | 1/2021 | Beukema |
| 2021/0126647 | A1 | 4/2021 | Hsieh |

OTHER PUBLICATIONS

U.S. Appl. No. 18/640,493, Discrete-Time Linear Equalizer for Discrete-Time Analog Front-End, filed Apr. 19, 2024, 95 pages.

Written Opinion of the International Searching Authority of International Application No. PCT/US2024/025542, mailed Aug. 23, 2024, 9 pages.

International Search Report of International Application No. PCT/US2024/025543, mailed Aug. 23, 2024, 3 pages.

Written Opinion of the International Searching Authority of International Application No. PCT/US2024/025543, mailed Aug. 23, 2024, 10 pages.

Ayesh, Mostafa M. et al., A Low-Power 20-Gb/s Discrete-Time Analog Front-End for ADC-Based Serial Link Equalizers, Electrical Engineering and Systems Science—Signal Processing, arXiv:1902.00233, Feb. 1, 2019, 9 pages.

* cited by examiner

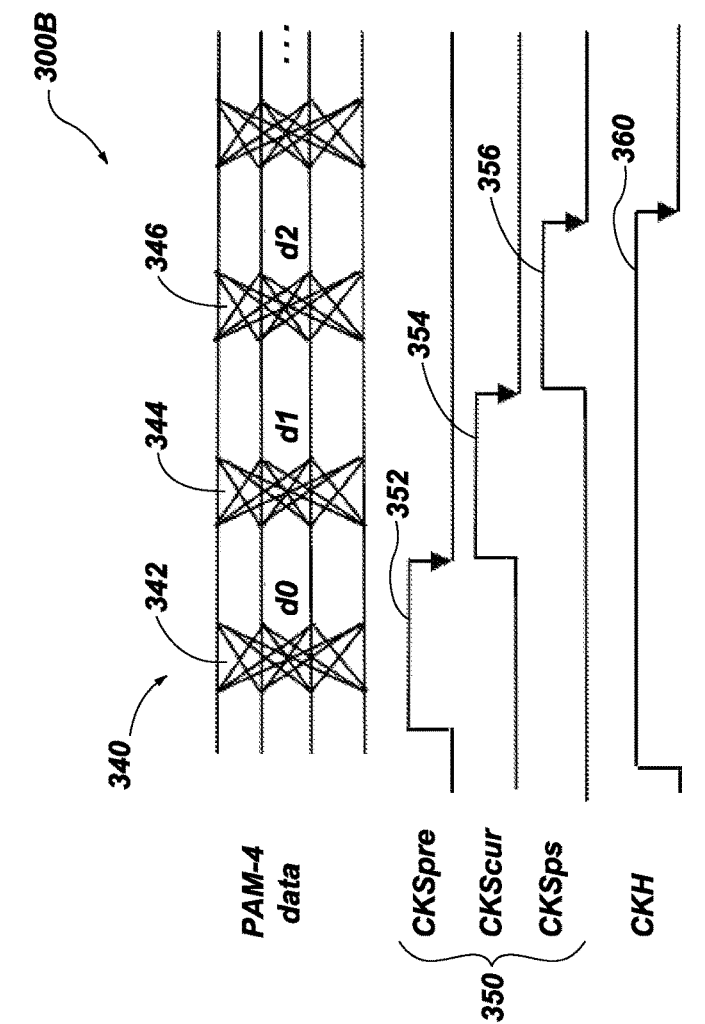
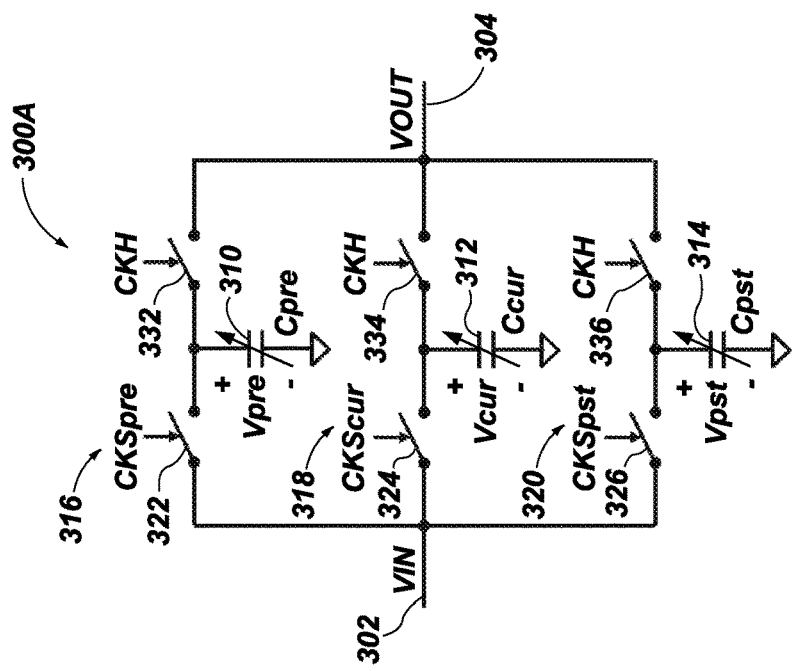
*FIG. 3B*
*FIG. 3A*

DISCRETE-TIME LINEAR EQUALIZER FOR DISCRETE-TIME ANALOG FRONT-END

CROSS-REFERENCE TO RELATED APPLICATIONS

This application claims the benefit under 35 U.S.C. § 119(e) of U.S. Provisional Patent Application No. 63/497,039, filed Apr. 19, 2023, and titled "Improved-Discrete-Time Linear Equalizer For Discrete-Time Analog Front-End," the entire disclosure of which is hereby incorporated herein by reference. The subject matter of this application is also related to U.S. patent application Ser. No. 18/640,491, filed Apr. 19, 2024; and U.S. patent application Ser. No. 18/640,492, filed Apr. 19, 2024, the disclosure of each of which is hereby incorporated herein in its entirety by this reference.

TECHNICAL FIELD

Examples relate, generally, to an analog front-end (AFE) for a data receiver. More specifically, some examples relate to a discrete-time AFE (DT-AFE) for a high-speed serial data receiver, without limitation.

BACKGROUND

A continuous time, analog front-end (AFE or CT-AFE) of a high-speed serial data receiver is operative to terminate a data channel, equalize a received data signal, and drive an analog-to-digital converter (ADC) or slicer. To perform these operations, the CT-AFE may include a passive attenuator, an active, continuous-time linear equalizer (CTLE), and a programmable gain amplifier (PGA). Circuit functions of the CT-AFE are designed taking into consideration various conflicting constraints and performance requirements associated with power, linearity, noise, and substrate area. As data rates increase and power supply voltages decrease using advanced complementary metal-oxide-semiconductor (CMOS) technologies, the circuit functions of the CT-AFE become increasingly difficult to realize.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIG. 3A, FIG. 3B, and FIG. 3C are diagrams for describing a working principle of operation for signal equalization, according to one or more examples;

DETAILED DESCRIPTION

Figure 1:
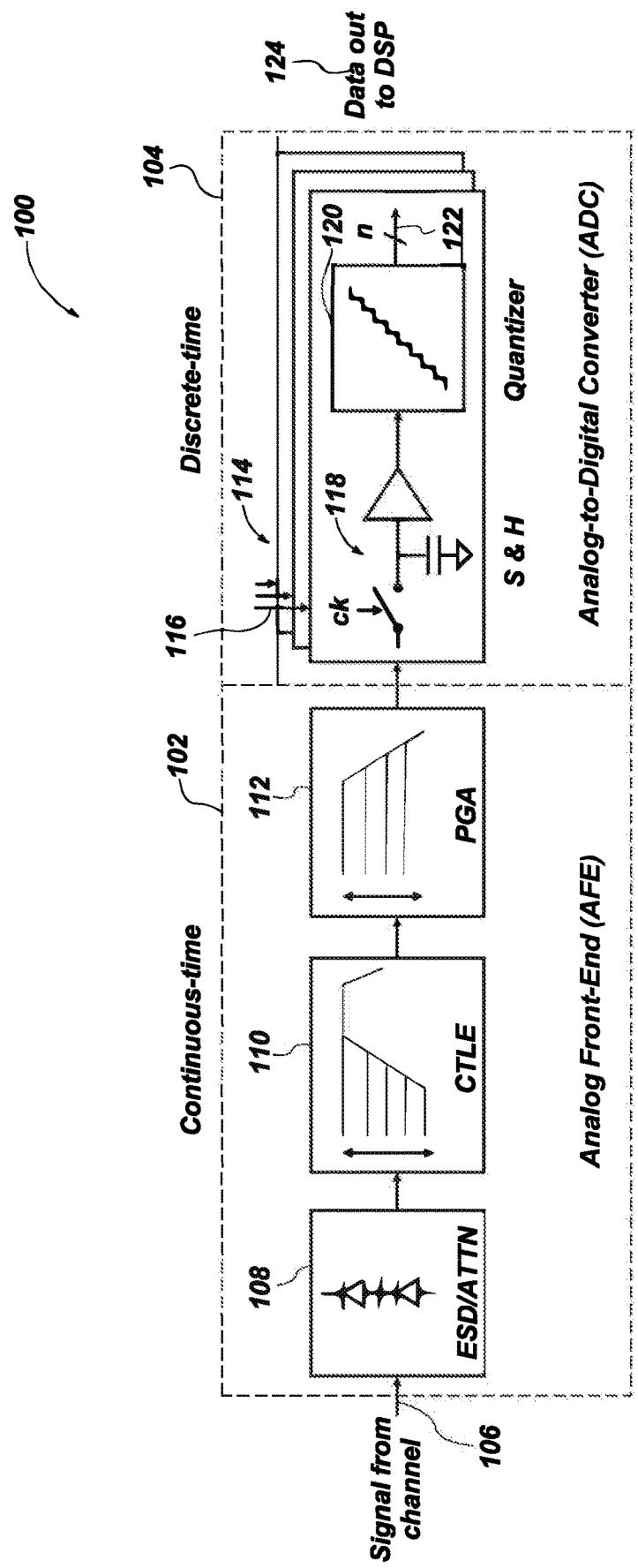
FIG. 1 is a schematic block diagram of a receiver that is known to the inventor of this disclosure.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

FIG. 1 is a schematic block diagram of a receiver 100 that is known to the inventor of this disclosure. Receiver 100 includes an analog front-end (AFE) 102 coupled to an analog-to-digital converter (ADC) 104. AFE 102 is to receive and process a continuous-time signal received at an input 106 (e.g., "Signal from channel"), and is referred to as a continuous-time AFE (CT-AFE) for processing in a continuous-time domain. In FIG. 1, AFE 102 includes an electrostatic discharge (ESD) protection/attenuator (ATTN) circuit 108, a continuous-time linear equalizer (CTLE) 110, and a programmable gain amplifier (PGA) 112. ADC 104 is to convert the processed continuous-time signal from AFE 102 to a discrete-time signal for processing in a discrete-time domain. ADC 104 includes a set of time-multiplexed circuit threads 114 of ADC circuits. Respective ones of time-multiplexed circuit threads 114 of ADC 104 operate responsive to one or more clock signals 116. Respective ones of the ADC circuits of ADC 104 include a sample and hold (S&H) circuit 118 and a quantizer circuit 120. S&H circuit 118 is to sample the incoming signal and quantizer circuit 120 is to produce, at an output 122, a quantization value from a set of quantization values. Quantization values from the ADC circuits of all of the time-multiplexed circuit threads 114 are outputted to a digital signal processor (DSP) ("Data out to DSP" at a data output 124) for processing in the discrete-time domain.

Circuit functions of the CT-AFE (i.e., AFE 102) of receiver 100 of FIG. 1 are designed taking into consideration conflicting constraints and performance requirements associated with power, linearity, noise, and substrate area. As data rates increase and power supply voltages decrease using advanced complementary metal-oxide-semiconductor (CMOS) technologies, the circuit functions of the CT-AFE are increasingly difficult to realize.

The above-noted challenges are particularly true for a CT-AFE configured to receive and process signals modulated according to a multi-level data format, such as Pulse Amplitude Modulation—four (4) level (PAM-4). PAM-4 signaling is often utilized in high-speed communications as it allows relatively more information to be transmitted per symbol cycle. For example, PAM-4 signaling allows twice as much information to be communicated per symbol cycle than Non-Return-to-Zero (NRZ) signaling. PAM-4 signaling also has a lower Signal-to-Noise Ratio (SNR) and an increased sensitivity to compression. Eye diagrams associated with PAM-4 are generally one-third (⅓) of those of NRZ, and the SNR of PAM-4 is 10 dB lower than that of NRZ.

In the CT-AFE, both the CTLE and the PGA contribute noise and distortion to the signaling, and their properties and performance are sensitive to, and increasingly compromised by, process, voltage and temperature (PVT) variations. And, unlike NRZ signaling, PAM-4 signaling is sensitive to impairments of existing CT-AFEs. Such CT-AFE impairments include non-linear compression and linear distortion in the form of group delay variation, which results in overshoot and undershoot. This sensitivity can be especially observed at high data rates, such as 100 Gigabits-per-second (Gbps) and beyond.

A CT-AFE may exhibit non-linearity which can be improved by increasing the supply voltage and device headroom. Linear distortion can be compensated for in a Digital Signal Processor (DSP). Both approaches increase power consumption. CT-AFE modules have a high dynamic range; if the supply voltage is increased, power and reliability concerns may be presented. Increased power dissipation is generally difficult to throttle back.

A CT-AFE typically utilizes inductors to reach bandwidth requirements for higher data rates, but this comes at the price of an increased or enlarged substrate area. In a CT-AFE operating at the baud rate, optional solutions for the highest data rates are generally less effective at lower data rates (e.g., lower data rates that may need to be accommodated for backwards compatibility). Also, time constants associated with continuous-time linear equalization do not easily scale.

Figure 2A:
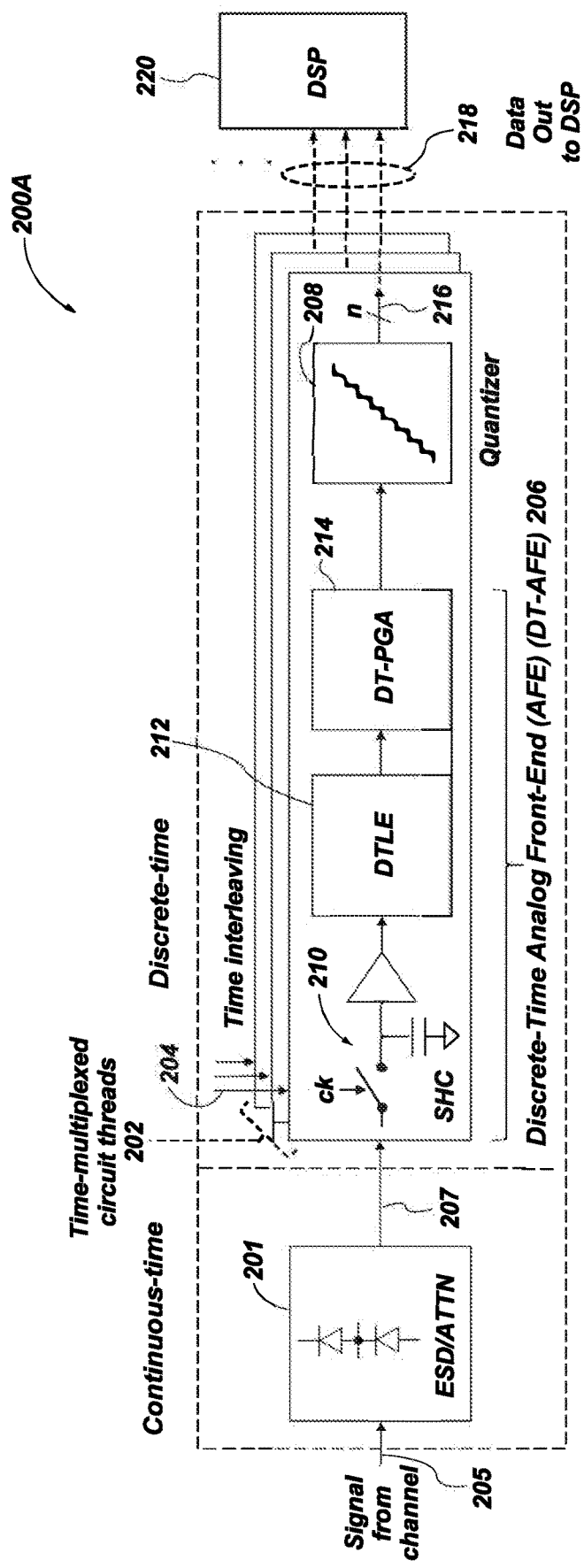
FIG. 2A is a schematic block diagram of a receiver including a discrete-time analog front-end (DT-AFE), according to one or more examples of the disclosure.

FIG. 2A is a schematic block diagram of a receiver 200A including a discrete-time analog front-end (DT-AFE) 206, according to one or more examples of the disclosure.

DT-AFE 206 includes a set of time-multiplexed circuit threads 202 of discrete-time analog front-end circuits. Respective ones of the discrete-time analog front-end circuits of DT-AFE 206 include a sample and hold circuit (SHC) 210, a discrete-time linear equalizer (DTLE) circuit 212, and a discrete-time programmable gain amplifier (DT-PGA) circuit 214. Discrete-time linear equalizer circuit 212 has an input coupled to an output of the sample and hold circuit 210. Discrete-time programmable gain amplifier circuit 214 has an input coupled to an output of discrete-time linear equalizer circuit 212. A quantizer circuit 208 of the circuit thread has an input coupled to an output of discrete-time programmable gain amplifier circuit 214.

In one or more examples, receiver 200A is, or may operate as, a serial data receiver. A continuous-time signal is received at an input 205 (e.g., "Signal from channel") of receiver 200A. The continuous-time signal may be a continuous-time modulated signal, such as a PAM-4 signal. The continuous-time modulated signal may be initially received and processed by an ESD protection/ATTN circuit 201 of receiver 200A. In one or more examples, ESD protection/ATTN circuit 201 includes at least a passive attenuator. The continuous-time modulated signal is then received at an input 207 of DT-AFE 206.

DT-AFE 206 is to receive and convert the continuous-time modulated signal to a discrete-time modulated signal and process the discrete-time modulated signal in a discrete-time domain. More specifically, the continuous-time modulated signal is received at the discrete-time analog front-end circuit of DT-AFE 206 which includes sample and hold circuit 210, discrete-time linear equalizer circuit 212, and discrete-time programmable gain amplifier circuit 214. Sample and hold circuit 210 is to receive and sample the continuous-time modulated signal to generate a discrete-time modulated signal. Discrete-time linear equalizer circuit 212 is to equalize the discrete-time modulated signal to generate an equalized discrete-time modulated signal. Discrete-time programmable gain amplifier circuit 214 is to amplify the equalized discrete-time modulated signal to generate an amplified equalized discrete-time modulated signal. Quantizer circuit 208 is to receive the amplified equalized discrete-time modulated signal and generate, at an output 216, a quantization value from a set of quantization values at least partially based on the signal. Quantization values from the discrete-time analog front-end circuits of (e.g., all of) the time-multiplexed circuit threads 202 are outputted to a DSP 220 ("Data out to DSP" at outputs 218) for further processing in the discrete-time domain.

In one or more examples, sample and hold circuit 210 of DT-AFE 206 may comprise a single-sampling sample and hold circuit, a double-sampling sample and hold circuit, or any suitable variation thereof. In a specific, non-limiting example, sample and hold circuit 210 may be configured according to a sample and hold circuit 600A of FIG. 6A described later below.

In one or more examples, discrete-time linear equalizer circuit 212 of DT-AFE is to perform feed-forward equalization (FFE) in the discrete-time domain. In one or more examples, discrete-time linear equalizer circuit 212 of DT-AFE 206 may comprise a single-sampling sample and hold circuitry including multiple switched-capacitor circuits. In one or more other examples, discrete-time linear equalizer circuit 212 of DT-AFE 206 may comprise a double-sampling sample and hold circuitry including multiple double-sampling switched-capacitor circuits. In specific, non-limiting examples, discrete-time linear equalizer circuit 212 may be configured according to a working principle of operation of FIG. 3A, FIG. 3B, and FIG. 3C; according to a discrete-time linear equalizer circuit 400A of FIG. 4A; according to a discrete-time linear equalizer circuit 500A of FIG. 5A; or according to any suitable variation of the above. In one or more examples, (even) when DSP 220 is used for linearization, discrete-time linear equalizer circuit 212 may perform linear equalization on the input data from the channel in order to reduce ADC dynamic range requirements (e.g., effective number of bits (ENOB), or resolution, without limitation).

In one or more examples, discrete-time programmable gain amplifier circuit 214 of DT-AFE 206 may be based on a multiplying digital-to-analog converter (DAC) (MDAC) configuration. More specifically, discrete-time programmable gain amplifier circuit 214 may comprise a double-sampling sample and hold circuitry including multiple double-sampling switched-capacitor circuits and an operational amplifier. In a specific, non-limiting example, discrete-time programmable gain amplifier circuit 214 may be configured according to a discrete-time programmable gain amplifier circuit 700A of FIG. 7A described later below.

As described earlier above, DT-AFE 206 includes time-multiplexed circuit threads 202 of discrete-time analog front-end circuits. In one or more examples, respective ones of time-multiplexed circuit threads 202 of discrete-time analog front-end circuits of DT-AFE 206 operate responsive to one or more clock signals 204 from a clock signal generating circuitry (not shown in FIG. 2A). In one or more examples, time-multiplexed circuit threads 202 of discrete-time analog front-end circuits of DT-AFE 206 are substantially identical to each other and are time-multiplexed in a round-robin or other suitably scheduled manner. In one or more examples, respective ones of the time-multiplexed circuit threads 202 of discrete-time analog front-end circuits of DT-AFE 206 are to perform signal processing in relation to respective ones of consecutive symbols (or consecutive symbol groupings) of the modulated signal, in a round-robin or other suitably scheduled manner. In one or more examples, respective ones of the time-multiplexed circuit threads 202 of discrete-time analog front-end circuits of DT-AFE 206 may perform signal processing according to a timing diagram 400D of FIG. 4D described later below.

In one or more specific examples, a discrete-time analog front-end circuit may comprise an $M^{th}$ time-multiplexed circuit thread of N time-multiplexed circuit threads of DT-AFE 206, wherein N is a positive integer and M is a positive integer from 1 to N. The discrete-time analog front-end circuit of the $M^{th}$ time-multiplexed circuit thread may perform signal processing in relation to an $M^{th}$ symbol and respective subsequent $(i*N+M)^{th}$ symbols of a continuous-time modulated signal for consecutive positive integers i (e.g., starting at 1, without limitation, such as from 1 to 10, 1 to 100, 1 to 1000, e.g., until the modulated signal is stopped or lost). In one or more examples, N=8. On the other hand, N may be 6, 10, or 12, as a few other examples. In one or more examples, in performing the signal processing in relation to the $M^{th}$ symbol (and subsequent other symbols), the discrete-time analog front-end circuit of the $M^{th}$ time-multiplexed circuit thread may process a predetermined number of consecutive symbol groupings which include the $M^{th}$ symbol (e.g., at least three consecutive symbols including a pre-cursor symbol, a cursor symbol which is the $M^{th}$ symbol, and a post-cursor symbol).

In one or more examples to be described herein, DT-AFE 206 including the discrete-time linear equalizer circuit 212 is adapted to tradeoff bandwidth and linearity at the line rate against settling time and interleaving complexity at a sub-ADC rate.

Figure 2B:
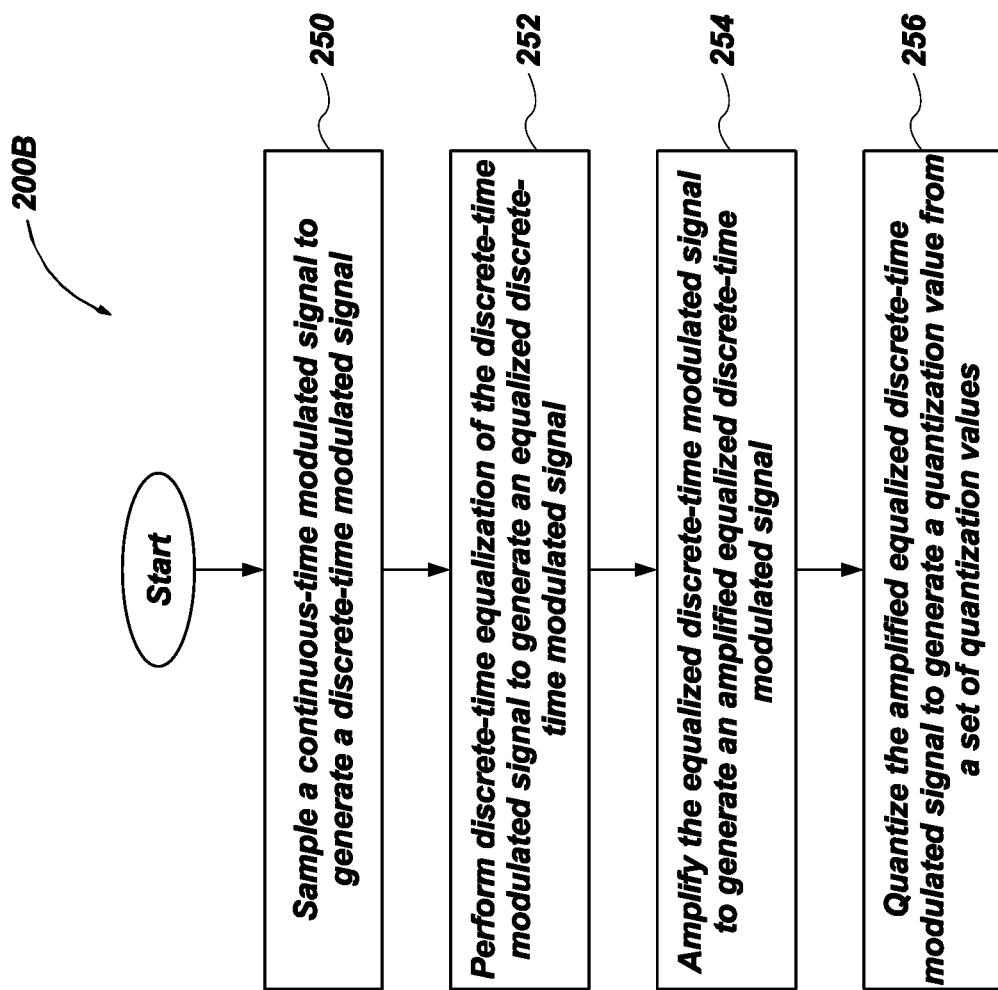
FIG. 2B is a flowchart of a method of performing signal conditioning of a modulated signal, according to one or more examples.

FIG. 2B is a flowchart of a method 200B of performing signal conditioning of a modulated signal, according to one or more examples. In one or more examples, method 200B may be performed at one or more of the discrete-time analog front-end circuits of DT-AFE 206 of FIG. 2A. At an act 250 of FIG. 2B, a continuous-time modulated signal is sampled to generate a discrete-time modulated signal. At an act 252, discrete-time equalization of the discrete-time modulated signal is performed to generate an equalized discrete-time modulated signal. At an act 254, the equalized discrete-time modulated signal is amplified to generate an amplified equalized discrete-time modulated signal. At an act 256, the amplified equalized discrete-time modulated signal is quantized to generate a quantization value from a set of quantization values.

In one or more examples, the continuous-time modulated signal is modulated according to PAM-4. In one or more examples, the sampling, the performing of the discrete-time equalization, the amplifying, and the quantizing are performed in relation to each $i^{th}$ symbol of the continuous-time modulated signal, for consecutive positive integers of i (e.g., at least from 1 to N). In one or more examples, the method further includes outputting, to a digital signal processor, the quantization values associated with each $i^{th}$ symbol of the continuous-time modulated signal, for the consecutive positive integers of i (e.g., at least from 1 to N). In one or more examples, the sampling, the performing of the discrete-time equalization, the amplifying, and the quantizing in relation to each $i^{th}$ symbol of the continuous-time modulated signal, for the consecutive positive integers of i from 1 to N, are performed at respective ones of N time-multiplexed circuit threads of N discrete-time analog front-end circuits of a discrete-time analog front-end.

In one or more examples, the sampling, the performing of the discrete-time equalization, the amplifying, and the quantizing are performed in relation to an $M^{th}$ symbol and respective subsequent $(i*N+M)^{th}$ symbols of the continuous-time modulated signal, for consecutive positive integers i, where N is a positive integer and M is a positive integer from 1 to N. In one or more examples, the sampling, the performing of the discrete-time equalization, the amplifying, and the quantizing are performed at a discrete-time linear equalizer circuit, where the discrete-time linear equalizer circuit comprises an $M^{th}$ time-multiplexed circuit thread of N time-multiplexed circuit threads of a discrete-time analog front-end.

Figure 3C:
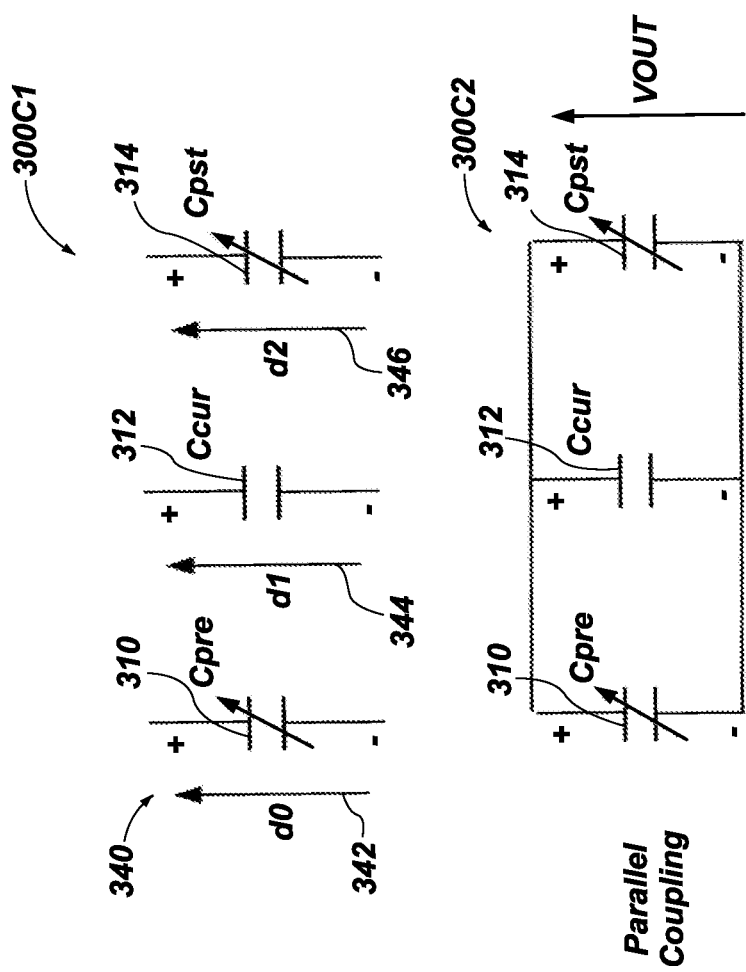

Various examples of discrete-time linear equalizer circuit 212 of DT-AFE 206 are now described in relation to FIG. 3A, FIG. 3B, and FIG. 3C; FIG. 4A, FIG. 4B, FIG. 4C, and FIG. 4D; and FIG. 5A, FIG. 5B, and FIG. 5C.

FIG. 3A, FIG. 3B, and FIG. 3C are diagrams describing a working principle of operation for signal equalization (e.g., for discrete-time linear equalizer circuit 212 of DT-AFE 206 of FIG. 2A), according to one or more examples.

More particularly, FIG. 3A is a schematic diagram of a signal equalizer circuit 300A for signal equalization, according to one or more examples. Signal equalizer circuit 300A may be considered a basic circuit for describing a working principle of operation (e.g., charge redistribution, without limitation) according to one or more examples. In one or more examples, discrete-time linear equalizer circuit 212 of FIG. 2A includes or is based on signal equalizer circuit 300A of FIG. 3A and/or operates based on the working principle of operation of signal equalizer circuit 300A of FIG. 3A.

Signal equalizer circuit 300A includes a sample and hold circuitry including multiple switched-capacitor circuits. In one or more examples, the multiple switched-capacitor circuits include at least three (3) switched-capacitor circuits. In the specific, non-limiting example of FIG. 3A, the multiple switched-capacitor circuits include a switched-capacitor circuit 316 of a pre-cursor tap, a switched-capacitor circuit 318 of a cursor tap, and a switched-capacitor circuit 320 of a post-cursor tap. In FIG. 3A, switched-capacitor circuit 316, switched-capacitor circuit 318, and switched-capacitor circuit 320 are coupled in a parallel arrangement between a signal input 302 and a signal output 304 as shown.

Respective ones of the multiple switched-capacitor circuits include a capacitor and a clock-driven switch circuitry. More specifically, switched-capacitor circuit 316 of the pre-cursor tap includes a capacitor 310 ($C_{pre}$), a switch circuit 322, and a switch circuit 332; switched-capacitor circuit 318 of the cursor tap includes a capacitor 312 ($C_{cur}$), a switch circuit 324, and a switch circuit 334; and switched-capacitor circuit 320 of the post-cursor tap includes a capacitor 314 ($C_{pst}$), a switch circuit 326, and a switch circuit 336. In one or more examples, respective ones of capacitor 310 ($C_{pre}$) and capacitor 314 ($C_{pst}$) have an adjustable capacitance or variable-size capacitance (e.g., adjustable in linear steps).

Signal equalizer circuit 300A is to receive a modulated voltage signal, such as PAM-4 modulated signal, at signal input 302. In FIG. 3B, a modulated voltage signal 340 including consecutive PAM-4 symbols is illustrated. The PAM-4 symbols of modulated voltage signal 340 include a symbol 342 (d0), a symbol 344 (d1), a symbol 346 (d2), and so on. Shown below the PAM-4 symbols of FIG. 3B are clock signals 350 from clock signal generating circuitry to open/close or switch on/off the switch circuits of the multiple switched-capacitor circuits. More specifically, clock signals 350 include a clock signal 352 associated with the pre-cursor tap ("CKSpre"), a clock signal 354 associated with the cursor tap ("CKScur"), and a clock signal 356 associated with the post-cursor tap ("CKSpst"). In one or more other examples, different clock signals 350 (e.g., having different on/off time periods) may be utilized to switch on/off the switch circuits for sampling and/or holding (e.g., see the descriptions below associated with FIG. 4B and FIG. 5B).

For a sampling phase, with reference to both FIG. 3A and FIG. 3B, switch circuit 322 is enabled by clock signal 352 ("CKS$_{pre}$") for switchably coupling capacitor 310 (C$_{pre}$) to signal input 302 over a first sampling time period, for charging capacitor 310 (C$_{pre}$) with the modulated voltage signal 340 (e.g., V$_{pre}$ associated with symbol 342 (d0)) over the first sampling time period. Clock signal 354 ("CKS$_{cur}$") is to enable switch circuit 324 for switchably coupling capacitor 312 (C$_{cur}$) to signal input 302 over a second sampling time period, for charging capacitor 312 (C$_{cur}$) with the modulated voltage signal 340 (e.g., V$_{cur}$ associated with symbol 344 (d1)) over the second sampling time period. Clock signal 356 ("CKSpst") is to enable switch circuit 326 for switchably coupling capacitor 314 (C$_{pst}$) to signal input 302 over a third sampling time period, for charging capacitor 314 (C$_{pst}$) with the modulated voltage signal 340 (e.g., V$_{pst}$ associated with symbol 346 (d2)) over the third sampling time period.

In a schematic diagram 300C1 (an upper portion) of FIG. 3C, capacitor 310 (C$_{pre}$) associated with the pre-cursor tap is indicated as charged (e.g., symbol 342 (d0)), capacitor 312 (C$_{cur}$) associated with the cursor tap is indicated as charged (e.g., symbol 344 (d1)), and capacitor 314 (C$_{pst}$) associated with the post-cursor tap is indicated as charged (e.g., symbol 346 (d2)). A charge Q$_{IN}$ associated with capacitor 310 (C$_{pre}$), capacitor 312 (C$_{cur}$), and capacitor 314 (C$_{pst}$) (e.g., a total charge thereof) is based on the mathematical relation, $$Q_{IN} = Q_{pre} + Q_{cur} + Q_{pst}$$
$$Q_{IN} = C_{pre} \cdot V_{pre} + C_{cur} \cdot V_{cur} + C_{pst} \cdot V_{pst}.$$
$$Q_{IN} = C_{pre} \cdot d_0 + C_{cur} \cdot d_1 + C_{pst} \cdot d_2$$

For a hold phase, with reference back to both FIG. 3A and FIG. 3B, a clock signal 360 associated with a hold time period ("CKH") is to enable switch circuit 332, switch circuit 334, and switch circuit 336 for switchably coupling capacitor 310 (C$_{pre}$), capacitor 312 (C$_{cur}$), and capacitor 314 (C$_{pst}$) in parallel and to signal output 304 over the hold time period.

In a schematic diagram 300C2 (a lower portion) of FIG. 3C, capacitor 310 (C$_{pre}$), capacitor 312 (C$_{cur}$), and capacitor 314 (C$_{pst}$) are shown coupled in parallel. A charge Q$_{OUT}$ at signal output 304 associated with the parallel-coupling of capacitor 310 (C$_{pre}$), capacitor 312 (C$_{cur}$), and capacitor 314 (C$_{pst}$) (e.g., a total charge thereof) may be based on the mathematical relation, $$Q_{OUT} = (C_{pre} + C_{cur} + C_{pst}) \cdot V_{OUT}.$$

According to the principle of charge conservation, $$Q_{OUT} = Q_{IN}.$$

Performing appropriate substitutions with the equations above, and solving for V$_{OUT}$, $$V_{OUT} = \frac{C_{pre} \cdot d_0 + C_{cur} \cdot d_1 + C_{pst} \cdot d_2}{C_{pre} + C_{cur} + C_{pst}}.$$

Accordingly, an output voltage V$_{OUT}$ from the output (e.g., signal output 304 of FIG. 3A) of the parallel coupling of capacitor 310 (C$_{pre}$), capacitor 312 (C$_{cur}$), and capacitor 314 (C$_{pst}$) may be generated at least partially based on a charge redistribution of charges from the capacitors during the hold time period. In one or more examples, the output voltage V$_{OUT}$ may be proportional to a summation of products between respective symbol voltages of symbol 342 (d0), symbol 344 (d1), and symbol 346 (d2) and respective capacitances of capacitor 310 (C$_{pre}$), capacitor 312 (C$_{cur}$), and capacitor 314 (C$_{pst}$). In one or more examples, the output voltage V$_{OUT}$ may be at least partially based on a ratio of the summation of products over a summation of the respective capacitances of capacitor 310 (C$_{pre}$), capacitor 312 (C$_{cur}$), and capacitor 314 (C$_{pst}$).

Figure 4A:
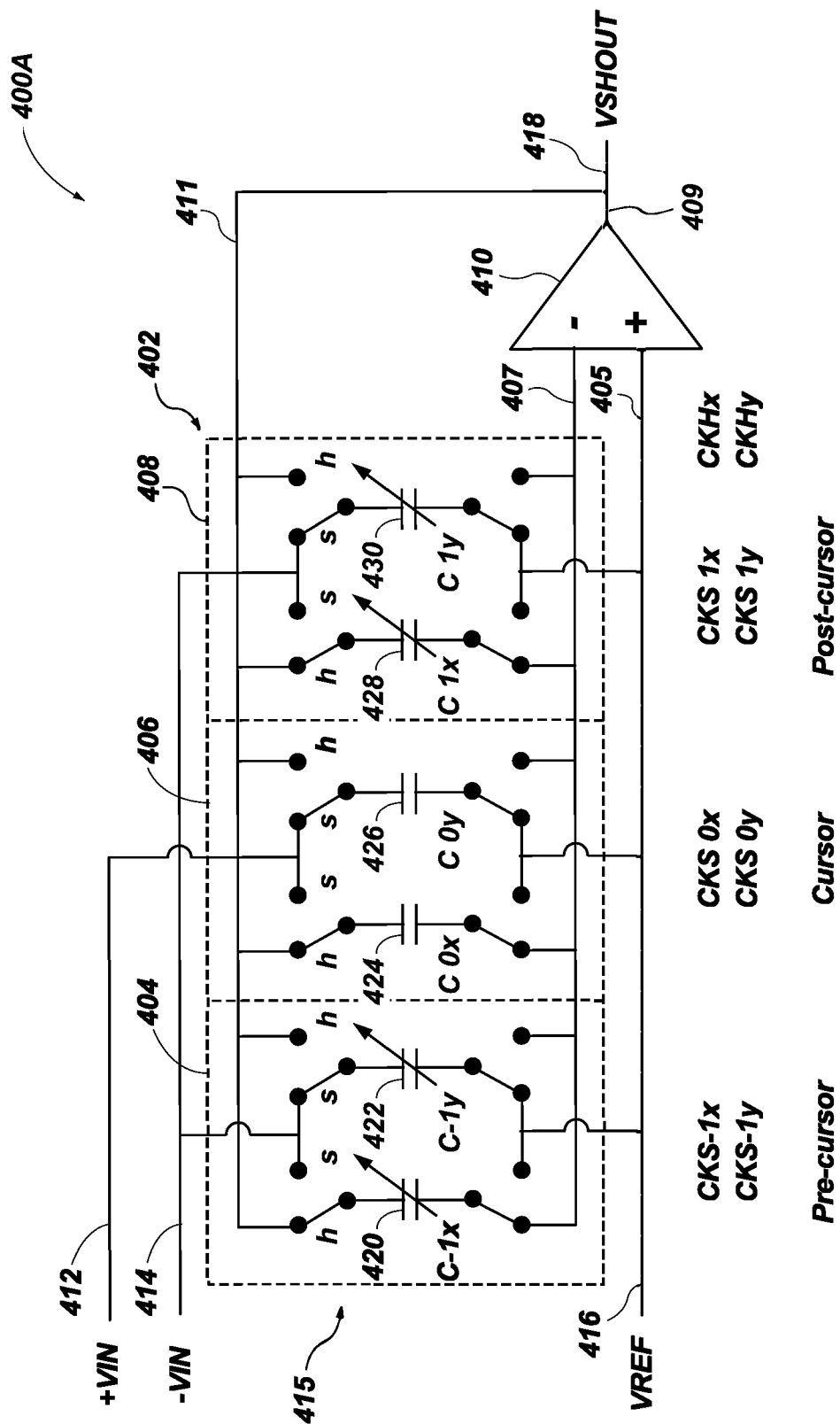
FIG. 4A is a schematic diagram of a discrete-time linear equalizer circuit, according to one or more examples.

FIG. 4A is a schematic diagram of a discrete-time linear equalizer circuit 400A, according to one or more examples. In one or more examples, discrete-time linear equalizer circuit 400A of FIG. 4A may be based on signal equalizer circuit 300A of FIG. 3A, and/or operate based on the working principle of operation of signal equalizer circuit 300A of FIG. 3A. In one or more alternative examples, discrete-time linear equalizer circuit 400A of FIG. 4A may be based on a different or alternative working principle of operation than that of signal equalizer circuit 300A of FIG. 3A. In one or more examples, discrete-time linear equalizer circuit 212 of FIG. 2A includes or is based on discrete-time linear equalizer circuit 400A of FIG. 4A.

In one or more examples, discrete-time linear equalizer circuit 400A of FIG. 4A is to perform feed-forward equalization (FFE) in the discrete-time domain. Discrete-time linear equalizer circuit 400A of FIG. 4A includes a double-sampling sample and hold circuitry including multiple double-sampling switched-capacitor circuits 402 (hereinafter "switched capacitor circuits 402") and an operational amplifier 410 (or "opamp").

Switched-capacitor circuits 402 include at least a double-sampling switched-capacitor circuit 404 (hereinafter "switched capacitor circuit 404") of a pre-cursor tap, a double-sampling switched-capacitor circuit 406 (hereinafter "switched capacitor circuit 406") of a cursor tap, and a double-sampling switched-capacitor circuit 408 (hereinafter "switched capacitor circuit 408") of a post-cursor tap.

Respective ones of the switched-capacitor circuits 402 include a first capacitor and a second capacitor. More particularly, switched-capacitor circuit 404 of the pre-cursor tap includes a first capacitor 420 (C$_{-1x}$) and a second capacitor 422 (C$_{-1y}$), switched-capacitor circuit 406 of the cursor tap includes a first capacitor 424 (C$_{0x}$) and a second capacitor 426 (C$_{0y}$), and switched-capacitor circuit 408 of the post-cursor tap includes a first capacitor 428 (C$_{1x}$) and a second capacitor 430 (C$_{1y}$). In one or more examples, respective ones of first capacitor 420 (C$_{-1x}$) and first capacitor 428 (C$_{1x}$), and second capacitor 422 (C$_{-1y}$) and second capacitor 430 (C$_{1y}$), have an adjustable capacitance or variable-size capacitance (e.g., adjustable in linear steps).

A clock-driven switch circuitry 415 of switched-capacitor circuits 402 may include switches and/or switch circuits as indicated by switch lines and contacts (small dark circles) in the figure. As shown, the switches of clock-driven switch circuitry 415 of FIG. 4A are represented as single, single pole double throw (SPDT) switches for simplicity of illustration. In one or more examples, two (2) separate, single pole single throw (SPST) switches may be employed in practice. Here, in one or more examples, each switch may be driven by a separate clock signal to prevent both switches from being closed at the same time; the common contact will be made to "break" from one of the load contacts before it "makes" contact with the other.

In one or more examples, operational amplifier 410 is provided in a flip-around configuration described in more detail later below. In one or more examples, discrete-time linear equalizer circuit 400A provides operational amplifier 410 as a closed-loop feedback buffer amplifier. In one or more examples, the closed-loop feedback buffer amplifier is a relatively slow-speed but highly linear amplifier that is relatively insensitive to PVT variations.

In one or more examples, discrete-time linear equalizer circuit 400A is differential and may be built with two complementary instances of the circuit shown in FIG. 4A.

For a first sampling phase, clock-driven switch circuitry 415 is to switchably couple first capacitor 420 ($C_{-1x}$) of switched-capacitor circuit 404 of the pre-cursor tap between a negative signal input 414 and a non-inverting input 405 of operational amplifier 410 (i.e., at "s" node pairings) over a first sampling time period. Non-inverting input 405 of operational amplifier 410 is coupled to a reference voltage $V_{REF}$ provided at a node 416 (e.g., a voltage reference node). The switchable coupling of first capacitor 420 ($C_{-1x}$) is to charge first capacitor 420 ($C_{-1x}$) with a modulated signal, in reverse polarity, over the first sampling time period. In addition, clock-driven switch circuitry 415 is to switchably couple first capacitor 424 ($C_{0x}$) of switched-capacitor circuit 406 of the cursor tap between a positive signal input 412 and non-inverting input 405 of operational amplifier 410 (i.e., at "s" node pairings) over a second sampling time period. The switchable coupling of first capacitor 424 ($C_{0x}$) is to charge first capacitor 424 ($C_{0x}$) with the modulated signal, in forward polarity, over the second sampling time period. Furthermore, clock-driven switch circuitry 415 is to switchably couple first capacitor 428 ($C_{1x}$) of switched-capacitor circuit 408 of the post-cursor tap between negative signal input 414 and non-inverting input 405 of operational amplifier 410 (i.e., at "s" node pairings) over a third sampling time period. The switchable coupling of first capacitor 428 ($C_{1x}$) is to charge to charge first capacitor 428 ($C_{1x}$) with the modulated signal, in reverse polarity, over the third sampling time period.

For a first hold phase, clock-driven switch circuitry 415 is to switchably couple, in parallel, the respective ones of the first capacitors of switched-capacitor circuits 402 over a first hold time period. An output 411 of the parallel coupling of the first capacitors of switched-capacitor circuits 402 is coupled to an amplifier output 409 of operational amplifier 410. Specifically, in the switchable coupling, clock-driven switch circuitry 415 is to switchably couple, in parallel, first capacitor 420 ($C_{-1x}$) of switched-capacitor circuit 404 of the pre-cursor tap, first capacitor 424 ($C_{0x}$) of switched-capacitor circuit 406 of the cursor tap, and first capacitor 428 ($C_{1x}$) of switched-capacitor circuit 408 of the post-cursor tap, between amplifier output 409 of operational amplifier 410 and an inverting input 407 of operational amplifier 410 (i.e., at respective "h" node pairings). An output voltage $V_{SHOUT}$ 418 from the output of the parallel coupling is generated at least partially based on charge redistribution of charges from the first capacitors of switched-capacitor circuits 402 during the first hold time period.

For a second sampling phase, clock-driven switch circuitry 415 is to switchably couple second capacitor 422 ($C_{-1y}$) of switched-capacitor circuit 404 of the pre-cursor tap between negative signal input 414 and non-inverting input 405 of operational amplifier 410 (i.e., at "s" nodes) over a fourth sampling time period. The switchable coupling of second capacitor 422 ($C_{-1y}$) is to charge second capacitor 422 ($C_{-1y}$) with the modulated signal, in reverse polarity, over the fourth sampling time period. In addition, clock-driven switch circuitry 415 is to switchably couple second capacitor 426 ($C_{0y}$) of switched-capacitor circuit 406 of the cursor tap between positive signal input 412 and non-inverting input 405 of operational amplifier 410 (i.e., at "s" nodes) over a fifth sampling time period. The switchable coupling of second capacitor 426 ($C_{0y}$) is to charge second capacitor 426 ($C_{0y}$) with the modulated signal, in forward polarity, over the fifth sampling time period. Furthermore, clock-driven switch circuitry 415 is to switchably couple second capacitor 430 ($C_{1y}$) of switched-capacitor circuit 408 of the post-cursor tap between negative signal input 414 and non-inverting input 405 of operational amplifier 410 (i.e., at "s" nodes) over a sixth sampling time period. The switchable coupling of second capacitor 430 ($C_{1y}$) is to charge second capacitor 430 ($C_{1y}$) with the modulated signal, in reverse polarity, over the sixth sampling time period. In one or more examples, the second sampling phase is performed, in part or in full, during the (previously described) first hold phase (e.g., at or near a beginning of the first hold phase).

For a second hold phase, clock-driven switch circuitry 415 is to switchably couple, in parallel, the respective ones of the second capacitors of switched-capacitor circuits 402 over a second hold time period. Output 411 of the parallel coupling of the second capacitors of switched-capacitor circuits 402 is coupled to amplifier output 409 of operational amplifier 410. Specifically, in the switchable coupling, clock-driven switch circuitry 415 is to switchably couple, in parallel, second capacitor 422 ($C_{-1y}$) of switched-capacitor circuit 404 of the pre-cursor tap, second capacitor 426 ($C_{0y}$) of switched-capacitor circuit 406 of the cursor tap, and second capacitor 430 ($C_{1y}$) of switched-capacitor circuit 408 of the post-cursor tap, between amplifier output 409 of operational amplifier 410 and inverting input 407 of operational amplifier 410 (i.e., at respective "h" node pairings). The output voltage $V_{SHOUT}$ 418 from the output of the parallel coupling is generated at least partially based on charge redistribution of charges from the second capacitors of switched-capacitor circuits 402 during the second hold time period.

In one or more examples, the charge redistribution is purely passive and does not (have to) utilize the operational amplifier to produce gain. In one or more examples, the operational amplifier is utilized to buffer the charge on the capacitors during the hold phase but does not contribute any gain.

In one or more examples, discrete-time linear equalizer circuit 400A performs equalization in relation to adjacent, consecutive symbols (i.e., pre-cursor symbol, cursor symbol, and post-cursor symbol), and therefore operates to reduce or eliminate inter-symbol interference (ISI) (e.g., pre-cursor ISI and post-cursor ISI) with respect to the cursor symbol.

Thus, a discrete-time linear equalizer circuit may be configured at least partially based on the circuit of FIG. 4A. The discrete-time linear equalizer circuit may comprise a sample and hold circuitry including multiple switched-capacitor circuits, where the multiple switched-capacitor circuits include a switched-capacitor circuit of a pre-cursor tap, a switched-capacitor circuit of a cursor tap, and a switched-capacitor circuit of a post-cursor tap. Respective ones of the multiple switched-capacitor circuits include at least a capacitor. A clock-driven switch circuitry of the multiple switched-capacitor circuits is to switchably couple the capacitor of the switched-capacitor circuit of the pre-cursor tap to a negative signal input over a first time period, the capacitor of the switched-capacitor circuit of the cursor tap to a positive signal input over a second time period, and the capacitor of the switched-capacitor circuit of the post-cursor tap to the negative signal input over a third time period. The clock-driven switch circuitry is to switchably couple the capacitor of the switched-capacitor circuit of the pre-cursor tap, the capacitor of the switched-capacitor circuit of the cursor tap, and the capacitor of the switched-capacitor circuit of the post-cursor tap in parallel over a fourth time period. More particularly, the clock-driven switch circuitry is to switchably couple the capacitor of the switched-capacitor circuit of the pre-cursor tap to the negative signal input over the first time period to charge the capacitor with a modulated signal, in negative polarity, over the first time period, switchably couple the capacitor of the switched-capacitor circuit of the cursor tap to the positive signal input over the second time period to charge the capacitor with the modulated signal, in forward polarity, over the second time period, and switchably couple the capacitor of the switched-capacitor circuit of the post-cursor tap to the negative signal input over the third time period to charge the capacitor with the modulated signal, in negative polarity, over the third time period. In one or more examples, the modulated signal (e.g., a discrete-time modulated voltage signal) includes a first symbol during the first time period, a second symbol during the second time period, and a third symbol during the third time period, and an output voltage from an output of the parallel coupling of the capacitors of the multiple switched-capacitor circuits is generated at least partially based on charge redistribution of charges from the capacitors of the multiple switched-capacitor circuits during the fourth time period.

Further, the discrete-time linear equalizer circuit based on FIG. 4A may include sample and hold circuitry including an operational amplifier. In one or more examples, the clock-driven switch circuitry is to switchably couple the capacitor of the switched-capacitor circuit of the pre-cursor tap between the negative signal input and a non-inverting input of the operational amplifier over the first time period, the capacitor of the switched-capacitor circuit of the cursor tap between the positive signal input and the non-inverting input of the operational amplifier over the second time period, and the capacitor of the switched-capacitor circuit of the post-cursor tap between the negative signal input and the non-inverting input of the operational amplifier over the third time period. The clock-driven switch circuitry is to switchably couple the capacitor of the switched-capacitor circuit of the pre-cursor tap, the capacitor of the switched-capacitor circuit of the cursor tap, and the capacitor of the switched-capacitor circuit of the post-cursor tap in parallel between an inverting input of the operational amplifier and an amplifier output of the operational amplifier over the fourth time period.

Figure 4B:
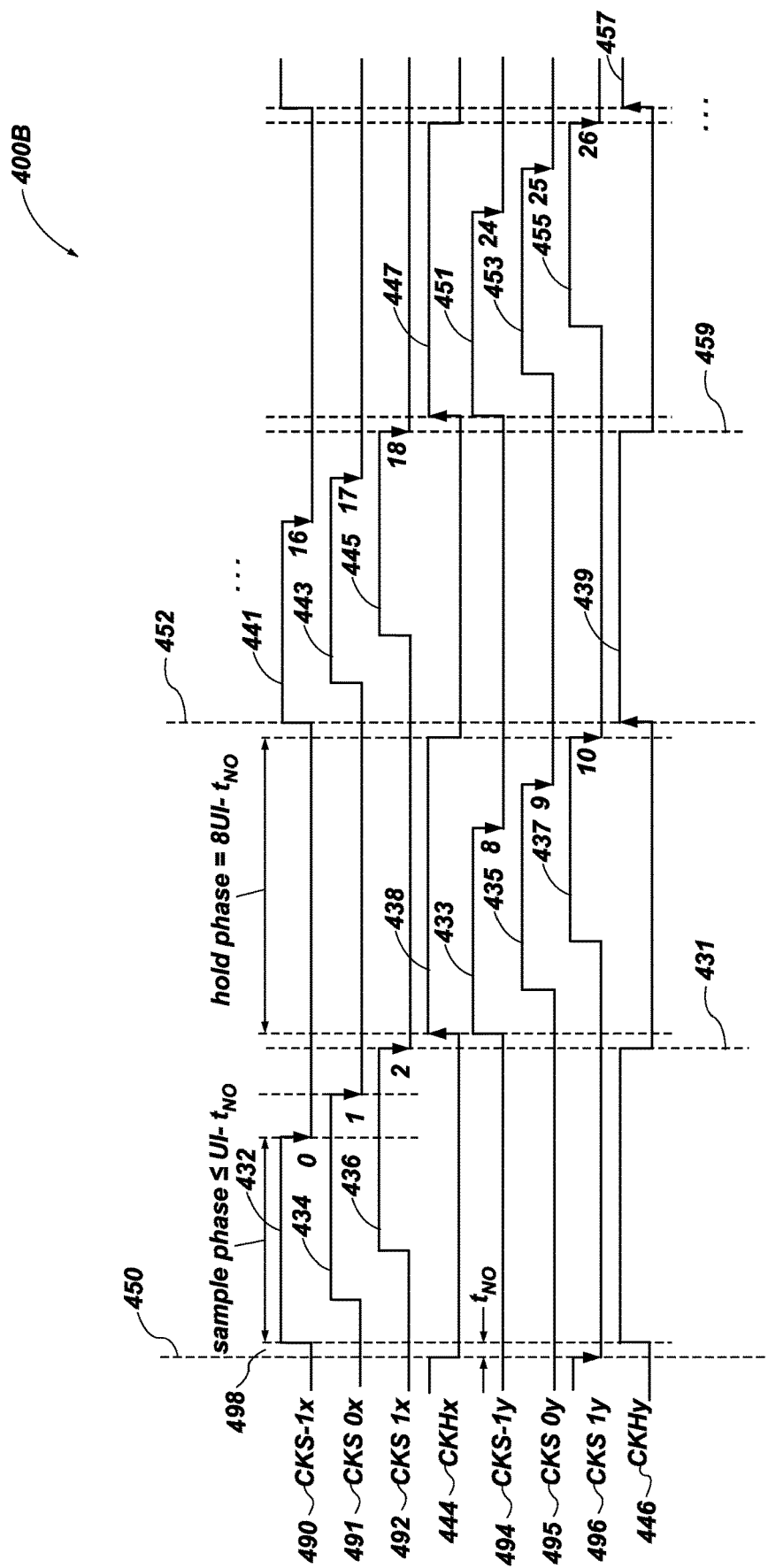
FIG. 4B is a timing diagram of clock signals used to enable and disable switch circuits of a clock-driven switch circuitry of the discrete-time linear equalizer circuit of FIG. 4A, according to one or more examples.

FIG. 4B is a timing diagram of clock signals 400B used to enable and disable switch circuits of clock-driven switch circuitry 415 (e.g., turn on and off the switch circuits thereof for capacitor coupling and decoupling) of discrete-time linear equalizer circuit 400A of FIG. 4A, according to one or more examples. In one or more examples, clock signals 400B of FIG. 4B may be generated by clock signal generator circuitry and provided at respective clock output nodes which are coupled to respective switch control inputs of clock-driven switch circuitry 415 of FIG. 4A. In one or more examples, discrete-time linear equalizer circuit 400A of FIG. 4A utilizing clock signals 400B of FIG. 4B is adapted to use passive (fast) sampling and active (slow) holding. If the sampling time=M UI (unit interval), then the hold phase settling time≤N−M−2$t_{NO}$ UI. Note that the operational amplifier is drifting when CKH=0(<<1 UI).

In one or more examples, discrete-time linear equalizer circuit 400A of FIG. 4A utilizing clock signals 400B of FIG. 4B may be part of a first ($1^{st}$) time-multiplexed circuit thread of eight (8) time-multiplexed circuit threads of a discrete-time linear equalizer. The discrete-time linear equalizer circuit of the first ($1^{st}$) time-multiplexed circuit thread is to perform signal equalization in relation to a $1^{st}$ symbol (i.e., a cursor symbol) and respective subsequent $(i*8+1)^{th}$ symbols (i.e., subsequent cursor symbols) of a modulated signal, for consecutive positive integers i. In one or more alternative examples, the discrete-time linear equalizer circuit utilizing clock signals 400B of FIG. 4B is part of a different $M^{th}$ time-multiplexed circuit thread of the N time-multiplexed circuit threads.

A first sample and hold operation associated with the first capacitors of switched-capacitor circuits 402 of FIG. 4A begins at a time 450 of FIG. 4B. Clock signals 400B include a first sampling clock signal 490 ($CKS_{-1x}$), a second sampling clock signal 491 ($CKS_{0x}$), a third sampling clock signal 492 ($CKS_{1x}$), and a first hold clock signal 444 ($CKH_x$). For a first sampling phase associated with the first sample and hold operation, first sampling clock signal 490 ($CKS_{-1x}$) includes an enable signal portion 432 for enabling clock-driven switch circuitry 415 to charge first capacitor 420 ($C_{-1x}$) over the first sampling time period (for symbol "0"). Second sampling clock signal 491 ($CKS_{0x}$) includes an enable signal portion 434 for enabling clock-driven switch circuitry 415 to charge first capacitor 424 ($C_{0x}$) over the second sampling time period (for symbol "1"). Third sampling clock signal 492 ($CKS_{1x}$) includes an enable signal portion 436 for enabling clock-driven switch circuitry 415 charge first capacitor 428 ($C_{1x}$) over the third sampling time period (for symbol "2"). In one or more examples, respective time periods of the first sample phase associated with respective ones of enable signal portions of the clock signals (i.e., enable signal portion 432, enable signal portion 434, and enable signal portion 436) is less than or equal to the UI, or less than or equal to the difference between the UI and a time period $t_{NO}$ (e.g., a time period 498). Note that enable signal portions (e.g., at high signal levels) of the respective clock signals are separated by disable signal portions (e.g., at low signal levels) of the respective clock signals.

For a first hold phase associated with the first sample and hold operation, first hold clock signal 444 ($CKH_x$) has an enable signal portion 438 for enabling clock-driven switch circuitry 415 to switchably couple, in parallel, the first capacitors of switched-capacitor circuits 402 over the first hold time period. In one or more examples, the first hold time period associated with enable signal portion 438 of first hold clock signal 444 ($CKH_x$) is equal to N*UI (e.g., 8*UI), or equal to the difference between 8*UI and the time period $t_{NO}$.

A second sample and hold operation associated with the second capacitors of switched-capacitor circuits 402 of FIG. 4A begins at a time 431 of FIG. 4B. Clock signals 400B include a fourth sampling clock signal 494 ($CKS_{-1y}$), a fifth sampling clock signal 495 ($CKS_{0y}$), a sixth sampling clock signal 496 ($CKS_{1y}$), and a second hold clock signal 446 ($CKH_y$). For a second sampling phase associated with the second sample and hold operation, fourth sampling clock signal 494 ($CKS_{-1y}$) includes an enable signal portion 433 for enabling clock-driven switch circuitry 415 to charge second capacitor 422 ($C_{-1y}$) over the fourth sampling time period (for symbol "8"). Fifth sampling clock signal 495 ($CKS_{0y}$) includes an enable signal portion 435 is for enabling clock-driven switch circuitry 415 to charge second capacitor 426 ($C_{0y}$) over the fifth sampling time period (for symbol "9"). Sixth sampling clock signal 496 ($CKS_{1y}$) includes an enable signal portion 437 is for enabling clock-driven switch circuitry 415 to charge second capacitor 430 ($C_{1y}$) over the sixth sampling time period (for symbol "10"). In one or more examples, respective time periods of the second sample phase associated with respective ones of enable signal portions of the clock signals (i.e., enable signal portion 433, enable signal portion 435, and enable signal portion 437) is less than or equal to the UI, or less than or equal to the difference between the UI and the time period $t_{NO}$. In one or more examples, the second sampling phase is performed, in part or in full, during the (previously described) first hold phase, as shown (e.g., at or near a beginning of the first hold phase).

For a second hold phase associated with the second sample and hold operation, second hold clock signal 446 ($CKH_y$) has an enable signal portion 439 for enabling clock-driven switch circuitry 415 to switchably couple, in parallel, the second capacitors of switched-capacitor circuits 402 over the second hold time period. In one or more examples, the second hold time period associated with enable signal portion 439 of second hold clock signal 446 ($CKH_y$) is equal to N*UI (e.g., 8*UI), or equal to the difference between 8*UI and the time period $t_{NO}$.

The above-described sample and hold operations are repeated with use of multiple double-sampling switched-capacitor circuits 402 of FIG. 4A, operations that are now described for completeness. A "next" first sample and hold operation associated with the first capacitors of switched-capacitor circuits 402 of FIG. 4A begins at a time 452 of FIG. 4B. Clock signals 400B including first sampling clock signal 490 ($CKS_{-1x}$), second sampling clock signal 491 ($CKS_{0x}$), third sampling clock signal 492 ($CKS_{1x}$), and first hold clock signal 444 ($CKH_x$) are again utilized. For a next first sampling phase associated with this next first sample and hold operation, first sampling clock signal 490 ($CKS_{-1x}$) includes an enable signal portion 441 for enabling clock-driven switch circuitry 415 to charge first capacitor 420 ($C_{-1x}$) over the next first sampling time period (for symbol "16"). Second sampling clock signal 491 ($CKS_{0x}$) includes an enable signal portion 443 for enabling clock-driven switch circuitry 415 to charge first capacitor 424 ($C_{0x}$) over the next second sampling time period (for symbol "17"). Third sampling clock signal 492 ($CKS_{1x}$) includes an enable signal portion 445 for enabling clock-driven switch circuitry 415 to charge first capacitor 428 ($C_{1x}$) over the next third sampling time period (for symbol "18"). In one or more examples, respective time periods of the next first sample phase associated with respective ones of enable signal portions of the clock signals (i.e., enable signal portion 441, enable signal portion 443, and enable signal portion 445) is less than or equal to the UI, or less than or equal to the difference between the UI and the time period $t_{NO}$. In one or more examples, this next first sampling phase is performed, in part or in full, during the (previously described) second hold phase, as shown (e.g., at or near a beginning of the second hold phase).

For a next first hold phase associated with the next first sample and hold operation, first hold clock signal 444 ($CKH_x$) has an enable signal portion 447 for enabling clock-driven switch circuitry 415 to switchably couple, in parallel, the first capacitors of switched-capacitor circuits 402 over the next first hold time period. In one or more examples, the next first hold time period associated with enable signal portion 447 of second hold clock signal 444 ($CKH_x$) is equal to N*UI (e.g., 8*UI), or equal to the difference between 8*UI and the time period $t_{NO}$.

A "next" second sample and hold operation associated with the second capacitors of switched-capacitor circuits 402 of FIG. 4A begins at a time 459 of FIG. 4B. Clock signals 400B including fourth sampling clock signal 494 ($CKS_{-1y}$), fifth sampling clock signal 495 ($CKS_{0y}$), sixth sampling clock signal 496 ($CKS_{1y}$), and second hold clock signal 446 ($CKH_y$) are utilized. For a next second sampling phase associated with the next second sample and hold operation, fourth sampling clock signal 494 ($CKS_{-1y}$) includes an enable signal portion 451 for enabling clock-driven switch circuitry 415 to charge second capacitor 422 ($C_{-1y}$) over the next fourth sampling time period (for symbol "24"). Fifth sampling clock signal 495 ($CKS_{0y}$) includes an enable signal portion 453 is for enabling clock-driven switch circuitry 415 to charge second capacitor 426 ($C_{0y}$) over the next fifth sampling time period (for symbol "25"). Sixth sampling clock signal 496 ($CKS_{1y}$) includes an enable signal portion 455 is for enabling clock-driven switch circuitry 415 charge second capacitor 430 ($C_{1y}$) over the next sixth sampling time period (for symbol "26"). In one or more examples, respective time periods of the next second sample phase associated with respective ones of enable signal portions of the clock signals (i.e., enable signal portion 451, enable signal portion 453, and enable signal portion 455) is less than or equal to the UI, or less than or equal to the difference between the UI and the time period $t_{NO}$. In one or more examples, this next second sampling phase is performed, in part or in full, during the (previously described) next first hold phase, as shown (e.g., at or near a beginning of the next first hold phase).

For a next second hold phase associated with the next second sample and hold operation, second hold clock signal 446 ($CKH_y$) has an enable signal portion 457 (only a portion thereof shown in FIG. 4B) for enabling clock-driven switch circuitry 415 to switchably couple, in parallel, the second capacitors of switched-capacitor circuits 402 over the next second hold time period. In one or more examples, the next second hold time period associated with enable signal portion 457 of second hold clock signal 446 ($CKH_y$) is equal to N*UI (e.g., 8*UI), or equal to the difference between 8*UI and the time period $t_{NO}$.

In one or more examples, the above-described sample and hold operations are repeated, in an on-going manner, with use of switched-capacitor circuits 402 of FIG. 4A.

As described earlier above, operational amplifier 410 of FIG. 4A is provided in a flip-around configuration. In one or more examples, such a "flip-around hold amplifier" ensures that a charge sampled on a capacitor is preserved during a hold phase, even if the amplifier is loaded with the next stage. The input of the amplifier is not able to conduct current, and therefore the charge (and hence the voltage) on the capacitor will not change. The feedback arrangement forces the output of the amplifier to settle to a voltage that equals $V_{REF}$ plus the voltage. Since the capacitor was charged during the sampling phase to $V_{IN}$(tsample)−$V_{REF}$, the output voltage during the hold phase must settle to $V_{REF}$+($V_{IN}$(tsample)−$V_{REF}$)=$V_{IN}$(tsample).

In one or more examples, discrete-time linear equalizer circuit 400A of FIG. 4A including the flip-around hold amplifier may provide one or more advantages (e.g., as compared to a 1× buffer amplifier). The flip-around hold amplifier is a closed-loop operational amplifier structure. Using a transimpedance amplifier topology, this structure can typically swing much wider at its output than a 1× buffer. A 1× buffer is usually implemented as a voltage follower, with a limited swing. In at least some instances, a voltage follower may not have as accurate a gain as a transimpedance amplifier, which may complicate thread-to-thread matching.

In one or more examples, the single flip-around hold amplifier is used for two consecutive (double) samples. If a 1× buffer were utilized, each hold capacitor would need its own buffer (e.g., otherwise it would lose charge when switching/multiplexing a buffer with two hold capacitors). A 1× buffer would only be used half the time during the hold phase.

With the flip-around hold amplifier, the charged capacitor may be placed in the feedback path of the operational amplifier. Due to the high loop gain, no charge is lost in the amplifier's input capacitor, which can be even higher than the sampling capacitor since it is not connected to the sampling capacitor during the sampling phase. The input capacitor of a 1× buffer contributes to the sampling capacitance and cannot exceed the intended sampling capacitor value.

With the flip-around hold amplifier, the sampling and holding processes are independent from each other. One can use relatively large sampling switches to track the input signal over the full bandwidth and use relatively small hold switches, as the hold phase can be much longer than the sampling phase (which may be as small as one (1) UI). Consequently, the clock drivers and the power they consume can be tailored to their intended purpose, whether for sampling or holding.

Figure 4C:
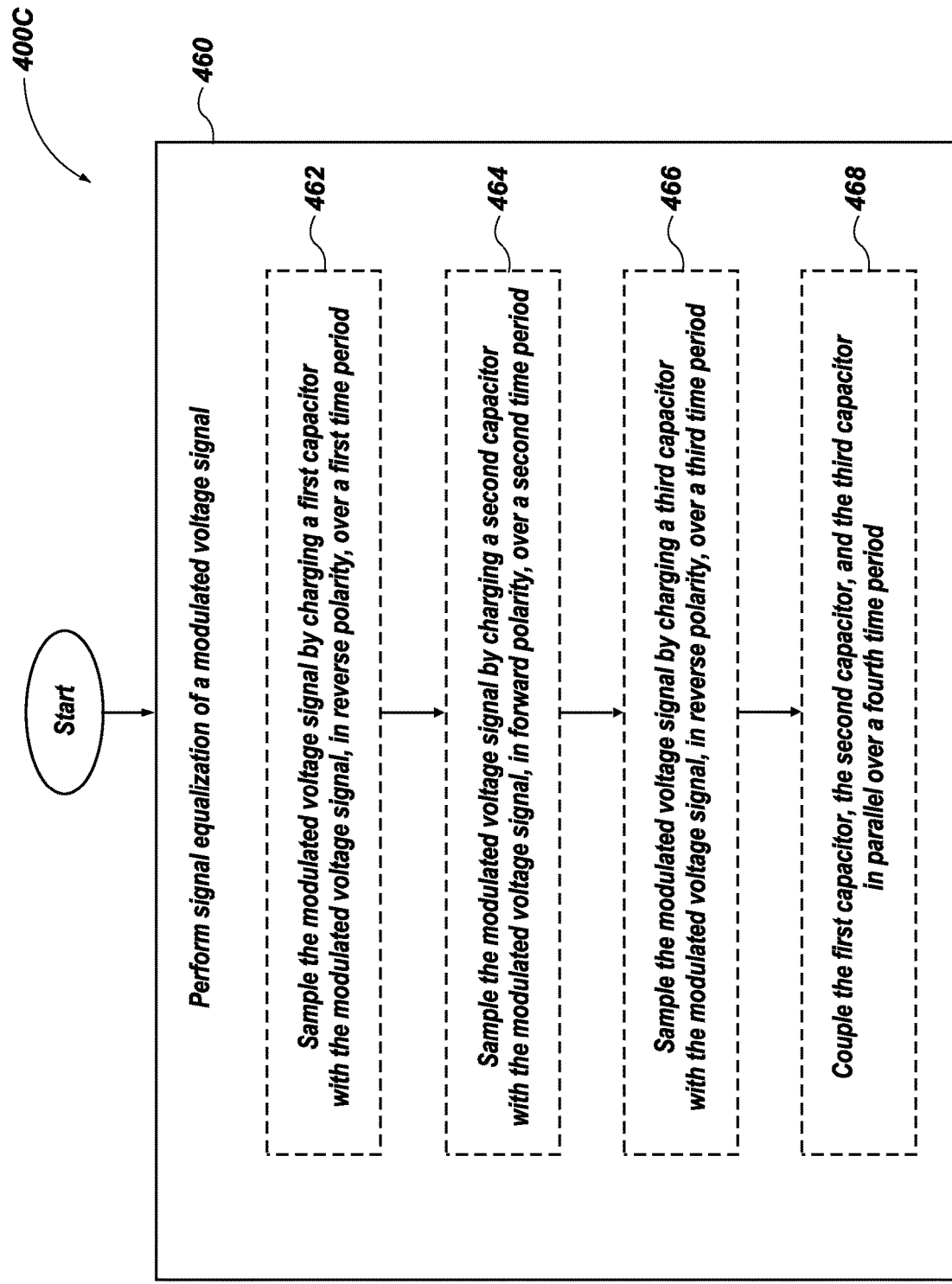
FIG. 4C is a flowchart of a method of performing signal equalization of a modulated voltage signal using a discrete-time linear equalizer, according to one or more examples.

FIG. 4C is a flowchart of a method 400C of performing signal equalization of a modulated voltage signal using a discrete-time linear equalizer, according to one or more examples. In one or more examples, method 400C may be performed with use of discrete-time linear equalizer circuit 400A of FIG. 4A, with use of discrete-time linear equalizer circuit 400A of FIG. 4A using clock signals 400B of FIG. 4B, or variations of the same.

At an act 460 of method 400C of FIG. 4C, signal equalization of a modulated voltage signal is performed. Signal equalization of the modulated voltage signal may be performed at least by an act 462, an act 464, an act 466, and an act 468. At an act 462, the modulated voltage signal is sampled by charging a first capacitor with the modulated voltage signal, in reverse polarity, over a first time period. At an act 464, the modulated voltage signal is sampled by charging a second capacitor with the modulated voltage signal, in forward polarity, over a second time period. At an act 466, the modulated voltage signal is sampled by charging a third capacitor with the modulated voltage signal, in reverse polarity, over a third time period. At an act 468, the first capacitor, the second capacitor, and the third capacitor are coupled in parallel over a fourth time period.

In one or more examples, an output voltage from an output of the parallel coupling of the first capacitor, the second capacitor, and the third capacitor is generated at least partially based on a charge redistribution of charges from the first capacitor, the second capacitor, and the third capacitor during the fourth time period. In one or more examples, the output voltage is proportional to a summation of products between respective symbol voltages of the first symbol, the second symbol, and the third symbol and respective capacitances of the first capacitor, the second capacitor, and the third capacitor. In one or more examples, the output voltage is at least partially based on a ratio of the summation of products over a summation of the respective capacitances of the first capacitor, the second capacitor, and the third capacitor.

In one or more examples, the modulated voltage signal comprises a discrete-time modulated voltage signal. In one or more examples, the discrete-time modulated voltage signal includes a first symbol during the first time period, a second symbol during the second time period, and a third symbol during the third time period. In one or more examples, the first symbol, the second symbol, and the third symbols are consecutive symbols and/or part of a sequence of consecutive symbols. In one or more examples, the modulated voltage signal is modulated according to PAM-4, and the consecutive symbols are consecutive PAM-4 symbols.

In one or more examples, the performing of the signal equalization is repeated for respective consecutive symbols of the modulated voltage signal. In one or more examples, the repeated performing of the signal equalization for the respective consecutive symbols of the modulated voltage signal are performed at respective ones of N time-multiplexed circuit threads of N discrete-time linear equalizer circuits of a discrete-time linear equalizer, where N is a positive integer.

In one or more examples, in the act 460, the signal equalization is performed at a discrete-time linear equalizer comprising a double-sampling sample and hold circuitry including multiple double-sampling switched-capacitor circuits. In one or more examples, the signal equalization of the modulated voltage signal is performed by repeating the act 462, the act 464, the act 466, and the act 468 (e.g., using the multiple double-sampling SHCs). Here, in one or more examples, the modulated voltage signal is further sampled by charging a fourth capacitor with the modulated voltage signal, in reverse polarity, over a fifth time period. The modulated voltage signal is further sampled by charging a fifth capacitor with the modulated voltage signal, in forward polarity, over a sixth time period. The modulated voltage signal is further sampled by charging a sixth capacitor with the modulated voltage signal, in reverse polarity, over a seventh time period. The fourth capacitor, the fifth capacitor, and the sixth capacitor are then coupled in parallel over an eighth time period. In one or more examples, a second output voltage from the output of the parallel coupling of the fourth capacitor, the fifth capacitor, and the sixth capacitor is generated at least partially based on a charge redistribution of charges from the fourth capacitor, the fifth capacitor, and the sixth capacitor during the eighth time period.

Figure 4D:
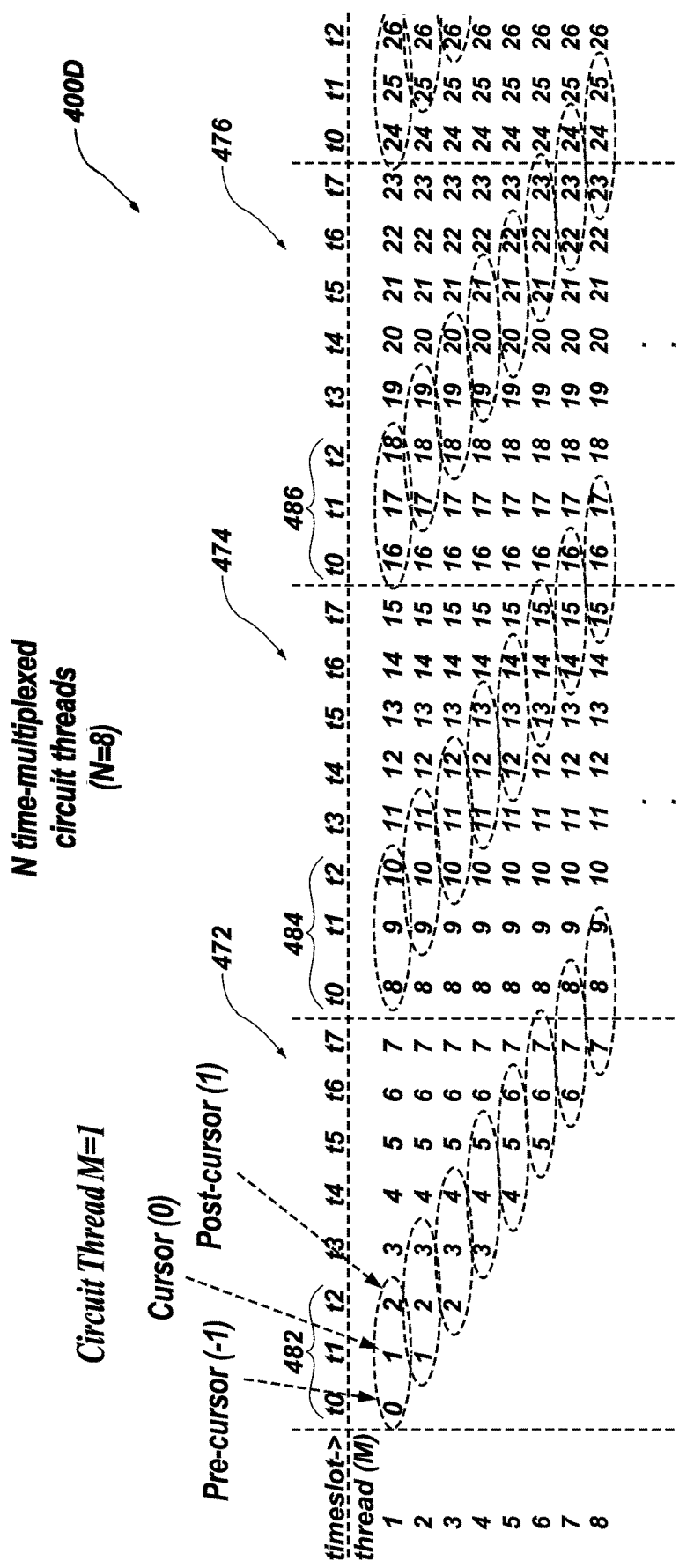
FIG. 4D is a timing diagram to illustrate signal processing associated with a set of time-multiplexed circuit threads of discrete-time linear equalizer circuits, according to one or more examples.

FIG. 4D is a timing diagram 400D to illustrate signal processing associated with a set of N time-multiplexed circuit threads of discrete-time linear equalizer circuits (e.g., discrete-time linear equalizer circuit of FIG. 4A), according to one or more examples. More generally, timing diagram 400D may illustrate signal processing associated with a set of N time-multiplexed circuit threads of discrete-time analog front-end circuits (e.g., discrete-time analog front-end circuit 206 of FIG. 2A). As described earlier, respective ones of the time-multiplexed circuit threads of circuits operate responsive to one or more clock signals from clock signal generating circuitry. In one or more examples, the time-multiplexed circuit threads of circuits are substantially identical to each other, and are time-multiplexed in a round-robin manner.

In the specific, non-limiting example of FIG. 4D, timing diagram 400D illustrates signal processing associated with N time-multiplexed circuit threads, where N=8. Thus, signal processing associated with eight (8) circuit threads (i.e., threads 1, 2, 3, 4, 5, 6, 7, and 8) are indicated in the leftmost column, from top to bottom, in the figure. In addition, repeated sets of eight (8) timeslots over time are indicated from left to right in the figure, including a set of timeslots 472, followed by a set of timeslots 474, followed by a set of timeslots 476, and so on. Each set of the sets of timeslots 472, 474, and 476 includes timeslots t0, t1, t2, t3, t4, t5, t6, and t7 associated with respective consecutive symbols of a modulated signal. The consecutive symbols of the modulated signal are denoted as 0, 1, 2, 3, 4, 5, 6, and 7, and continuing as 8, 9, 10, 11, 12, 13, 14, and 15, and so on, in the figure. In one or more examples, any suitable number N may be chosen according to one or more specific operating conditions (e.g., N=6, 10, or 12, to name but a few).

Signal processing associated with a "first" time-multiplexed circuit thread (i.e., M=1, or circuit thread 1) is specifically indicated in FIG. 4D. The first time-multiplexed circuit thread is indicated to perform signal processing in relation to a symbol (e.g., symbol 1 in timeslot t1) associated with a symbol grouping (e.g., a symbol grouping 482 of consecutive symbols 0, 1, and 2). Each symbol grouping (e.g., symbol grouping 482) includes at least a pre-cursor symbol (e.g., symbol 0), a cursor symbol (e.g., symbol 1), and a post-cursor symbol (e.g., symbol 2). More specifically, the first time-multiplexed circuit thread is indicated to perform signal processing in relation to repeated symbol groupings. The repeated symbol groupings indicated in FIG. 4D include symbol grouping 482 (i.e., consecutive symbols 0, 1, and 2, indicated in a dashed oval shape for circuit thread 1), followed by a symbol grouping 484 (i.e., consecutive symbols 8, 9, and 10, indicated in a dashed oval shape for circuit thread 1), followed by a symbol grouping 486 (i.e., consecutive symbols 16, 17, and 18, indicated in a dashed oval shape for circuit thread 1), and so on.

Signal processing associated with other time-multiplexed circuit threads is now described. A "second" time-multiplexed circuit thread (i.e., M=2, or circuit thread 2) is also indicated to perform signal processing in relation to repeated symbol groupings, including a symbol grouping of consecutive symbols 1, 2, and 3 (indicated in a dashed oval shape for circuit thread 2), followed by a symbol grouping of consecutive symbols 9, 10, and 11 (again indicated in a dashed oval shape for circuit thread 2), followed by a symbol grouping of consecutive symbols 17, 18, and 19 (again indicated in a dashed oval shape for circuit thread 2), and so on. A "third" time-multiplexed circuit thread (i.e., M=3, or circuit thread 3) is also indicated to perform signal processing in relation to repeated symbol groupings, including a symbol grouping of consecutive symbols 2, 3, and 4 (indicated in a dashed oval shape for circuit thread 3), followed by a symbol grouping of consecutive symbols 10, 11, and 12 (again indicated in a dashed oval shape for circuit thread 3), followed by a symbol grouping of consecutive symbols 18, 19, and 20 (again indicated in a dashed oval shape for circuit thread 3), and so on. Signal processing associated with the remaining time-multiplexed circuit threads is also performed in relation to repeated symbol groupings, in a like manner as the previously described circuit threads.

The above-described signal processing for each $M^{th}$ time-multiplexed circuit thread may be or include signal processing associated with sample and hold circuit 210 of FIG. 2A, signal processing associated with discrete-time linear equalizer circuit 212 of FIG. 2A, signal processing associated with discrete-time programmable gain amplifier circuit 214 of FIG. 2A, signal processing associated with quantizer circuit 208 of FIG. 2A, and/or signal processing associated with discrete-time analog front-end circuit 206 of FIG. 2A in its entirety.

In one or more specific examples, the DT-AFE (e.g., DT-AFE 206 of FIG. 2A) is an eight (8) circuit thread, time-interleaved DT-AFE adapted for communication at a 56-GigaBaud rate (or higher). Respective ones of the eight (8) circuit threads of circuits include a sample and hold stage to drive FFE slices in two (2) neighboring threads. Each FFE slice has two (2) taps, each of which may be adjusted in eight (8) linear steps (e.g., variable size capacitors). In a test or simulation, no visible compression was observed in relation to an 800 m Vppd PAM-4 output data signal. In one or more examples, the DT-AFE including the DTLE is adapted to tradeoff bandwidth and linearity at the line rate against settling time and interleaving complexity at the sub-ADC rate.

Based on the above, a discrete-time analog front-end circuit may be an $M^{th}$ time-multiplexed circuit thread of N time-multiplexed circuit threads of a discrete-time analog front-end, where N is a positive integer and M is a positive integer from 1 to N. The discrete-time analog front-end circuit of the $M^{th}$ time-multiplexed circuit thread is to perform signal processing in relation to an $M^{th}$ symbol and respective subsequent $(i*N+M)^{th}$ symbols of a modulated signal for consecutive positive integers i (e.g., starting at 1, such as 1 to 10, 1 to 100, 1 to 1000, e.g., until the modulated signal is stopped or lost). Similarly, a discrete-time linear equalizer circuit (e.g., of a discrete-time analog front-end circuit) may be an $M^{th}$ time-multiplexed circuit thread of N time-multiplexed circuit threads of a discrete-time linear equalizer, where N is a positive integer and M is a positive integer from 1 to N. The discrete-time linear equalizer circuit of the $M^{th}$ time-multiplexed circuit thread is to perform signal equalization in relation to an $M^{th}$ symbol and respective subsequent $(i*N+M)^{th}$ symbols of a modulated signal for consecutive positive integers i.

Thus, a discrete-time linear equalizer circuit may be configured at least partially based on FIG. 4A, FIG. 4B, FIG. 4C, and FIG. 4D. The discrete-time linear equalizer may comprise a set of N time-multiplexed circuit threads of N discrete-time linear equalizer circuits. Respective $M^{th}$ ones of the N discrete-time linear equalizer circuits is to perform signal equalization in relation to an $M^{th}$ symbol and respective subsequent $(i*N+M)^{th}$ symbols of a modulated signal (e.g., a discrete-time modulated symbol) for consecutive positive integers i, where N is a positive integer and M is a positive integer from 1 to N. The respective $M^{th}$ ones of the N discrete-time linear equalizer circuits comprise a double-sampling sample and hold circuitry including multiple double-sampling switched-capacitor (SC) circuits and an operational amplifier, the multiple double-sampling switched-capacitor circuits including at least a double-sampling switched-capacitor circuit of a pre-cursor tap, a double-sampling switched-capacitor circuit of a cursor tap, and a double-sampling switched-capacitor circuit of a post-cursor tap, the double-sampling switched-capacitor circuit of the pre-cursor tap including a first capacitor $C_{-1x}$ and a second capacitor $C_{-1y}$, the double-sampling switched-capacitor of the cursor tap including a first capacitor $C_{0x}$ and a second capacitor $C_{0y}$, and the double-sampling switched-capacitor circuit of the post-cursor tap including at least a first capacitor $C_{1x}$ and a second capacitor $C_{1y}$. A clock-driven switch circuitry of the multiple double-sampling switched-capacitor circuits is to switchably couple the first capacitor $C_{-1x}$ to a negative signal input to charge the first capacitor $C_{-1x}$ with the modulated signal, in reverse polarity, over an $(M-1)^{th}$ sampling time period, the first capacitor $C_{0x}$ to a positive signal input to charge the first capacitor $C_{0x}$ with the modulated signal, in forward polarity, over an $M^{th}$ sampling time period, and the first capacitor $C_{1x}$ to the negative signal input to charge the first capacitor $C_{1x}$ with the modulated signal, in reverse polarity, over an $(M+1)^{th}$ sampling time period. In addition, the clock-driven switch circuitry is to switchably couple the first capacitor $C_{-1x}$, the first capacitor $C_{0x}$, and the first capacitor $C_{1x}$ in parallel and to an amplifier output of the operational amplifier over an $M^{th}$ hold time period. Furthermore, the clock-driven switch circuitry is to switchably couple the second capacitor $C_{-1y}$ to the negative signal input to charge the second capacitor $C_{-1y}$ with the modulated signal, in reverse polarity, over an $(M+N+1)^{th}$ sampling time period, the second capacitor $C_{0y}$ to the positive signal input to charge the second capacitor $C_{0y}$ with the modulated signal, in forward polarity, over an $(M+N)^{th}$ sampling time period, and the second capacitor $C_{1y}$ to the negative signal input to charge the second capacitor $C_{1y}$ with the modulated signal, in reverse polarity, over an $(M+N+1)^{th}$ sampling time period. In addition, the clock-driven switch circuitry is to switchably couple the second capacitor $C_{-1y}$, the second capacitor $C_{0y}$, and the second capacitor $C_{1y}$ in parallel and to the amplifier output of the operational amplifier over an $(M+N)^{th}$ hold time period.

In one or more specific examples based on FIG. 4A, FIG. 4B, FIG. 4C, and FIG. 4D, a first output voltage is generated at the amplifier output at least partially based on charge redistribution of charges from the first capacitor $C_{-1x}$, the first capacitor $C_{0x}$, and the first capacitor $C_{1x}$ during the $M^{th}$ hold time period, and a second output voltage is generated at the amplifier output at least partially based on charge redistribution of charges from the second capacitor $C_{-1y}$, the second capacitor $C_{0y}$, and the second capacitor $C_{1y}$ during the $(M+N)^{th}$ hold time period. The first output voltage may be based on the mathematical relation $$V_{OUT_1} = \frac{C_{-1x} * d_{M-1} + C_{0x} * d_M + C_{1x} * d_{M+1}}{C_{-1x} + C_{0x} + C_{1x}},$$

where $V_{OUT1}$ is the first output voltage, $C_{-1x}$, $C_{0x}$, and $C_{1x}$ are respective capacitances of the first capacitors $C_{-1x}$, $C_{0x}$, and $C_{1x}$, and $d_{M-1}$ is a voltage of an $(M-1)^{th}$ symbol during the $(M-1)^{th}$ sampling time period, $d_M$ is a voltage of an $M^{th}$ symbol during the $M^{th}$ sampling time period, and $d_{M+1}$ is a voltage of an $(M+1)^{th}$ symbol during the $(M+1)^{th}$ sampling time period. The second output voltage is based on the mathematical relation $$V_{OUT_2} = \frac{C_{-1y} * d_{M+N-1} + C_{0y} * d_{M+N} + C_{1y} * d_{M+N+1}}{C_{-1y} + C_{0y} + C_{1y}},$$

where $V_{OUT2}$ is the second output voltage, $C_{-1y}$, $C_{0y}$, and $C_{1y}$ are respective capacitances of the second capacitors $C_{-1y}$, $C_{0y}$, and $C_{1y}$, and $d_{M+N-1}$ is a voltage of an $(M+N-1)^{th}$ symbol during the $(M+N-1)^{th}$ sampling time period, $d_{M+N}$ is a voltage of an $(M+N)^{th}$ symbol during the $(M+N)^{th}$ sampling time period, and $d_{M+N+1}$ is a voltage of an $(M+N+1)^{th}$ symbol during the $(M+N+1)^{th}$ sampling time period.

Figure 5A:
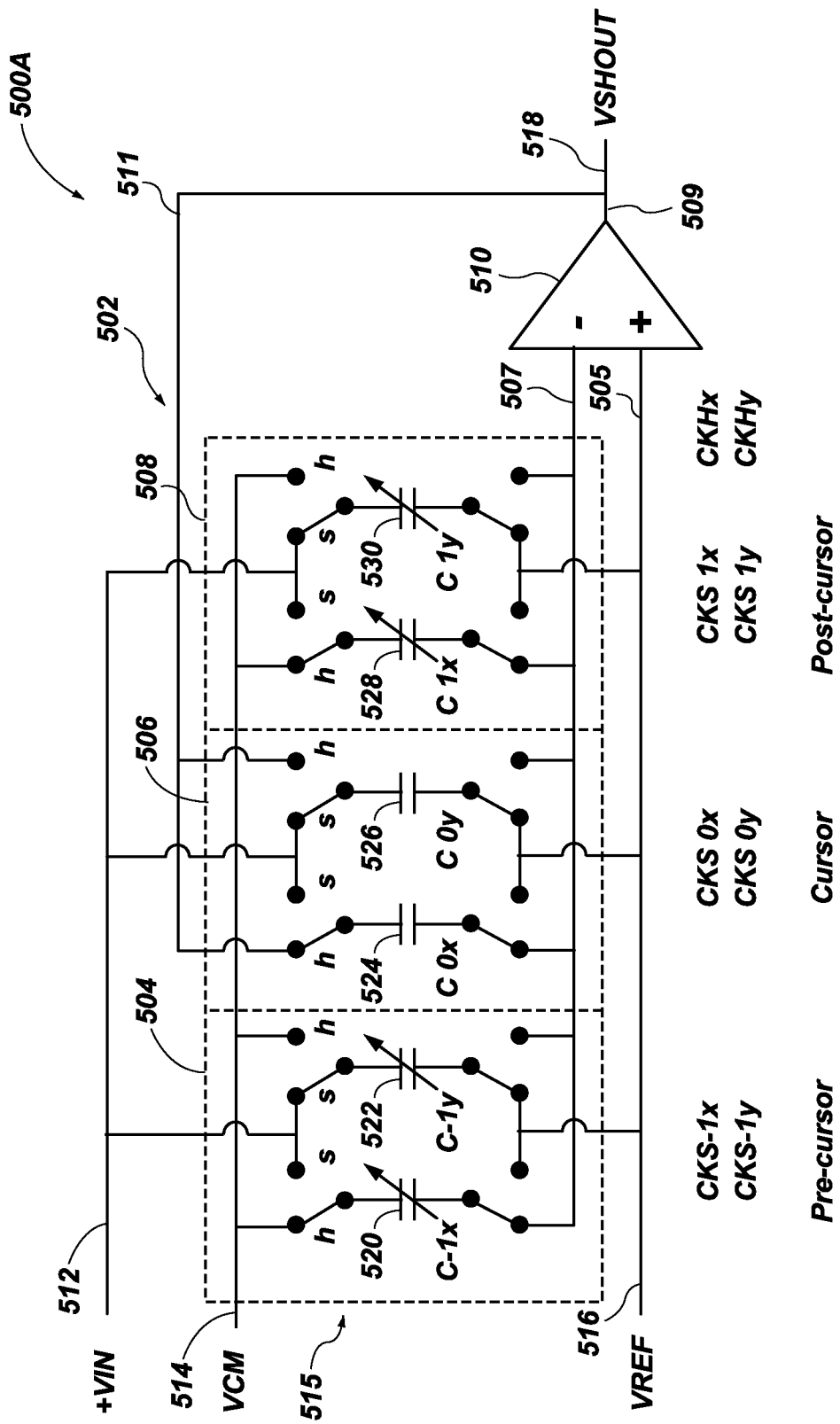
FIG. 5A is a schematic diagram of a discrete-time linear equalizer circuit, according to one or more examples.

FIG. 5A is a schematic diagram of a discrete-time linear equalizer circuit 500A according to one or more examples. In one or more examples, discrete-time linear equalizer circuit 500A of FIG. 5A is to perform feed-forward equalization (FFE) in the discrete-time domain. In one or more examples, discrete-time linear equalizer circuit 212 of FIG. 2A includes or is based on discrete-time linear equalizer circuit 500A of FIG. 5A.

Discrete-time linear equalizer circuit 500A includes a double-sampling sample and hold circuitry including multiple double-sampling switched-capacitor circuits 502 (or hereinafter "switched-capacitor circuits 502") and an operational amplifier 510. Switched-capacitor circuits 502 include at least a double-sampling switched-capacitor circuit 504 (or hereinafter "switched-capacitor circuit 504") of a pre-cursor tap, a double-sampling switched-capacitor circuit 506 (or hereinafter "switched-capacitor circuit 506") of a cursor tap, and a double-sampling switched-capacitor circuit 508 (or hereinafter "switched-capacitor circuit 508") of a post-cursor tap.

Respective ones of switched-capacitor circuits 502 include a first capacitor and a second capacitor. More particularly, switched-capacitor circuit 504 of the pre-cursor tap includes a first capacitor 520 ($C_{-1x}$) and a second capacitor 522 ($C_{-1y}$), switched-capacitor circuit 506 of the cursor tap includes a first capacitor 524 ($C_{0x}$) and a second capacitor 526 ($C_{0y}$), and switched-capacitor circuit 508 of the post-cursor tap includes a first capacitor 528 ($C_{1x}$) and a second capacitor 530 ($C_{1y}$). In one or more examples, respective ones of first capacitor 520 ($C_{-1x}$) and first capacitor 528 ($C_{1x}$), and second capacitor 522 ($C_{-1y}$) and second capacitor 530 ($C_{1y}$), have an adjustable capacitance or variable-size capacitance (e.g., adjustable in linear steps).

A clock-driven switch circuitry 515 of switched-capacitor circuits 502 may include switches and/or switch circuits as indicated by switch lines and contacts (small dark circles) in the figure. As shown, the switches of clock-driven switch circuitry 415 of FIG. 4A are represented as single, SPDT switches for simplicity of illustration. In one or more other examples, two (2) separate, SPST switches may be employed in practice. Here, in one or more examples, each switch may be driven by a separate clock signal to prevent both switches from being closed at the same time; the common contact will be made to "break" from one of the load contacts before it "makes" contact with the other.

In one or more examples, operational amplifier 510 is provided in an inverse, flip-around configuration. In one or more examples, discrete-time linear equalizer circuit 500A provides operational amplifier 510 as a closed-loop feedback buffer amplifier. In one or more examples, the closed-loop feedback buffer amplifier is a relatively slow-speed but highly linear amplifier that is relatively insensitive to PVT variations.

In one or more examples, discrete-time linear equalizer circuit 500A is differential and may be built with two complementary instances of the circuit shown in FIG. 5A.

For a first sampling phase, clock-driven switch circuitry 515 is to switchably couple first capacitor 520 ($C_{-1x}$) of switched-capacitor circuit 504 of the pre-cursor tap between a signal input 512 (e.g., a positive signal input) and a non-inverting input 505 of operational amplifier 510 (i.e., at "s" node pairings) over a first sampling time period. Non-inverting input 505 of operational amplifier 510 is coupled to a reference voltage $V_{REF}$ provided at a node 516 (e.g., a voltage reference node). The switchable coupling of first capacitor 520 ($C_{-1x}$) is to charge first capacitor 520 ($C_{-1x}$) with a modulated signal (e.g., in forward polarity) over the first sampling time period. In addition, clock-driven switch circuitry 515 is to switchably couple first capacitor 524 ($C_{0x}$) of switched-capacitor circuit 506 of the cursor tap between signal input 512 and non-inverting input 505 of operational amplifier 510 (i.e., at "s" node pairings) over a second sampling time period. The switchable coupling of first capacitor 524 ($C_{0x}$) is to charge first capacitor 524 ($C_{0x}$) with the modulated signal (e.g., in forward polarity) over the second sampling time period. Furthermore, clock-driven switch circuitry 515 is to switchably couple first capacitor 528 ($C_{1x}$) of switched-capacitor circuit 508 of the post-cursor tap between signal input 512 and non-inverting input 505 of operational amplifier 510 (i.e., at "s" node pairings) over a third sampling time period. The switchable coupling of first capacitor 528 ($C_{1x}$) is to charge first capacitor 528 ($C_{1x}$) with the modulated signal (e.g., in forward polarity) over the third sampling time period.

For a first hold phase, clock-driven switch circuitry 515 is to switchably couple first capacitor 524 ($C_{0x}$) of switched-capacitor circuit 506 of the cursor tap between an output 511 and an inverting input 507 of operational amplifier 510 over a first hold time period (i.e., at respective "h" node pairings). Output 511 of the coupling of first capacitor 524 ($C_{0x}$) is coupled to an amplifier output 509 of operational amplifier 510. Clock-driven switch circuitry 515 is to further switchably couple, over the first hold time period, first capacitor 520 ($C_{-1x}$) of switched-capacitor circuit 504 of the pre-cursor tap and first capacitor 528 ($C_{1x}$) of switched-capacitor circuit 508 of the post-cursor tap in a closed feedback loop with first capacitor 524 ($C_{0x}$) of switched-capacitor circuit 506 of the cursor tap. In the closed feedback loop, first capacitor 520 ($C_{-1x}$) and first capacitor 528 ($C_{1x}$) are coupled between a node 514 coupled to a common mode voltage $V_{CM}$ (e.g., a common mode voltage node) and inverting input 507 of operational amplifier 510 (i.e., at respective "h" node pairings).

In one or more examples, in the closed feedback loop, charges from first capacitor 520 ($C_{-1x}$) of switched-capacitor circuit 504 of the pre-cursor tap and first capacitor 528 ($C_{1x}$) of switched-capacitor circuit 508 of the post-cursor tap are forced in first capacitor 524 ($C_{0x}$) of switched-capacitor circuit 506 of the cursor tap during the first hold time period. In one or more examples, an output voltage $V_{SHOUT}$ 518 from the output is generated at least partially based on a charge redistribution of charges between first capacitor 520 ($C_{-1x}$) and first capacitor 528 ($C_{1x}$); the closed feedback loop forces the charges of first capacitor 520 ($C_{-1x}$) and first capacitor 528 ($C_{1x}$) into first capacitor 524 ($C_{0x}$), adding to the charge of first capacitor 524 ($C_{0x}$).

For a second sampling phase, clock-driven switch circuitry 515 is to switchably couple second capacitor 522 ($C_{-1y}$) of switched-capacitor circuit 504 of the pre-cursor tap between signal input 512 (e.g., the positive signal input) and non-inverting input 505 of operational amplifier 510 (i.e., at "s" nodes) over a fourth sampling time period. The switchable coupling of second capacitor 522 ($C_{-1y}$) is to charge second capacitor 522 ($C_{-1y}$) with the modulated signal (e.g., in forward polarity) over the fourth sampling time period. In addition, clock-driven switch circuitry 515 is to switchably couple second capacitor 526 ($C_{0y}$) of switched-capacitor circuit 506 of the cursor tap between signal input 512 and non-inverting input 505 of operational amplifier 510 (i.e., at "s" nodes) over a fifth sampling time period. The switchable coupling of second capacitor 526 ($C_{0y}$) is to charge second capacitor 526 ($C_{0y}$) with the modulated signal (e.g., in forward polarity) over the fifth sampling time period. Furthermore, clock-driven switch circuitry 515 is to switchably couple second capacitor 530 ($C_{1y}$) of switched-capacitor circuit 508 of the post-cursor tap between signal input 512 and non-inverting input 505 of operational amplifier 510 (i.e., at "s" nodes) over a sixth sampling time period. The switchable coupling of second capacitor 530 ($C_{1y}$) is to charge second capacitor 530 ($C_{1y}$) with the modulated signal (e.g., in forward polarity) over the sixth sampling time period. In one or more examples, the second sampling phase is performed, in part or in full, during the (previously described) first hold phase.

For a second hold phase, clock-driven switch circuitry 515 is to switchably couple second capacitor 526 ($C_{0y}$) of switched-capacitor circuit 506 of the cursor tap between output 511 and inverting input 507 of operational amplifier 510 over a second hold time period (i.e., at respective "h" node pairings). Output 511 of the coupling of second capacitor 526 ($C_{0y}$) is coupled to amplifier output 509 of operational amplifier 510. Clock-driven switch circuitry 515 is to further switchably couple, over the second hold time period, second capacitor 522 ($C_{-1y}$) of switched-capacitor circuit 504 of the pre-cursor tap and second capacitor 530 ($C_{1y}$) of switched-capacitor circuit 508 of the post-cursor tap in a closed feedback loop with second capacitor 526 ($C_{0y}$) of switched-capacitor circuit 506 of the cursor tap. In the closed feedback loop, second capacitor 522 ($C_{-1y}$) and second capacitor 530 ($C_{1y}$) are coupled between node 514 coupled to the common mode voltage $V_{CM}$ (e.g., the common mode voltage node) and inverting input 507 of operational amplifier 510 (i.e., at respective "h" node pairings).

In one or more examples, in the closed feedback loop, charges from second capacitor 522 ($C_{-1y}$) of switched-capacitor circuit 504 of the pre-cursor tap and second capacitor 530 ($C_{1y}$) of switched-capacitor circuit 508 of the post-cursor tap are forced in second capacitor 526 ($C_{0y}$) of switched-capacitor circuit 506 of the cursor tap during the second hold time period. In one or more examples, output voltage $V_{SHOUT}$ 518 from the output is generated at least partially based on a charge redistribution of charges between second capacitor 522 ($C_{-1y}$) and second capacitor 530 ($C_{1y}$); the closed feedback loop forces the charges of second capacitor 522 ($C_{-1y}$) and second capacitor 530 ($C_{1y}$) into second capacitor 526 ($C_{0y}$), adding to the charge of second capacitor 526 ($C_{0y}$).

In one or more examples, discrete-time linear equalizer circuit 500A of FIG. 5A performs equalization in relation to adjacent, consecutive symbols (i.e., pre-cursor symbol, cursor symbol, and post-cursor symbol), and therefore operates to reduce or eliminate inter-symbol interference (ISI) (e.g., pre-cursor ISI and post-cursor ISI) with respect to the cursor symbol.

Note that the sampling phase for discrete-time linear equalizer circuit 500A is substantially the same as or similar to that of discrete-time linear equalizer circuit 400A of FIG. 4A. However, for the hold phase of discrete-time linear equalizer circuit 500A (e.g., with respect to the "x" capacitors), only first capacitor 524 ($C_{0x}$) is flipped around across operational amplifier 510. First capacitor 520 ($C_{-1x}$) and first capacitor 528 ($C_{1x}$) are connected in parallel between the common mode voltage $V_{CM}$ and the opamp input, forming an inverting closed loop amplifier with (the feedback) first capacitor 524 ($C_{0x}$). The loop gain of the opamp forces its input voltage, and therefore the voltage, across first capacitor 520 ($C_{-1x}$) and first capacitor 528 ($C_{1x}$), to zero. As a result, the charges on first capacitor 520 ($C_{-1x}$) and first capacitor 528 ($C_{1x}$) are forced onto (the feedback) first capacitor 524 ($C_{0x}$).

Mathematical relationships (similar to those of FIG. 3A, FIG. 3B, and FIG. 3C) may be presented for discrete-time linear equalizer circuit 500A of FIG. 5A, with the difference being that the charge $Q_{IN}$ is now present only on the "cursor" capacitor:

$$Q_{IN} = C_{pre} \cdot d_0 + C_{cur} \cdot d_1 + C_{pst} \cdot d_2,$$

$$Q_{OUT} = (C_{cur}) \cdot V_{OUT},$$

$$Q_{OUT} = Q_{IN}.$$

Performing appropriate substitutions with the equations above, and solving for $V_{OUT}$, $$V_{OUT} = \frac{C_{pre} \cdot d_0 + C_{cur} \cdot d_1 + C_{pst} \cdot d_2}{C_{cur}}.$$

In the present case, the operational amplifier provides a gain, where the gain is multiplied by $(C_{pre}+C_{cur}+C_{pst})/C_{cur}$. Given equal capacitances, the gain amounts to a three (3) times gain.

Thus, a discrete-time linear equalizer circuit may be configured at least partially based on the circuit of FIG. 5A. The discrete-time linear equalizer circuit may comprise a sample and hold circuitry including multiple switched-capacitor circuits. The multiple switched-capacitor circuits include at least a switched-capacitor circuit of a pre-cursor tap, a switched-capacitor circuit of a cursor tap, and a switched-capacitor circuit of a post-cursor tap. Respective ones of the multiple switched-capacitor circuits including at least a capacitor. A clock-driven switch circuitry of the multiple switched-capacitor circuits is to switchably couple the capacitor of the switched-capacitor circuit of the pre-cursor tap to a signal input over a first time period, the capacitor of the switched-capacitor circuit of the cursor tap to the signal input over a second time period, and the capacitor of the switched-capacitor circuit of the post-cursor tap to the signal input over a third time period. The clock-driven switch circuitry is to switchably couple the capacitor of the switched-capacitor circuit of the cursor tap to an output, and the capacitor of the switched-capacitor circuit of the pre-cursor tap and the capacitor of the switched-capacitor circuit of the post-cursor tap in a closed feedback loop with the capacitor of the switched-capacitor circuit of the cursor tap, over a fourth time period.

In addition, the discrete-time linear equalizer circuit based on FIG. 5A includes clock-driven switch circuitry to switchably couple the capacitor of the switched-capacitor circuit of the pre-cursor tap to the signal input over the first time period to charge the capacitor with a modulated signal over the first time period, switchably couple the capacitor of the switched-capacitor circuit of the cursor tap to the signal input over the second time period to charge the capacitor with the modulated signal over the second time period, and switchably couple the capacitor of the switched-capacitor circuit of the post-cursor tap to the signal input over the third time period to charge the capacitor with the modulated signal over the third time period. In one or more examples, in the closed feedback loop, charges from the capacitor of the switched-capacitor circuit of the pre-cursor tap and the capacitor of the switched-capacitor circuit of the post-cursor tap are forced in the capacitor of the switched-capacitor circuit of the cursor tap during the fourth time period. In one or more examples, an output voltage from the output is generated at least partially based on charge redistribution of charges between the capacitor of the switched-capacitor circuit of the pre-cursor tap and the capacitor of the switched-capacitor circuit of the post-cursor tap; the closed feedback loop forces the charges the capacitor of the switched-capacitor circuit of the pre-cursor tap and the capacitor of the switched-capacitor circuit of the post-cursor tap into the capacitor of the switched-capacitor circuit of the cursor tap, adding to the charge of the capacitor of the switched-capacitor circuit of the cursor tap.

Furthermore, the discrete-time linear equalizer circuit based on FIG. 5A may include sample and hold circuitry including an operational amplifier. In one or more examples, the clock-driven switch circuitry is to switchably couple the capacitor of the switched-capacitor circuit of the pre-cursor tap between the signal input and a non-inverting input of the operational amplifier over the first time period, the capacitor of the switched-capacitor circuit of the cursor tap between the signal input and the non-inverting input of the operational amplifier over the second time period, and the capacitor of the switched-capacitor circuit of the post-cursor tap between the signal input and the non-inverting input of the operational amplifier over the third time period. The clock-driven switch circuitry is to switchably couple the capacitor of the switched-capacitor circuit of the cursor tap between the output and an inverting input of the operational amplifier, and the capacitor of the switched-capacitor circuit of the pre-cursor tap and the capacitor of the switched-capacitor circuit of the post-cursor tap between a common mode voltage and the inverting input of the operational amplifier, over the fourth time period.

Figure 5B:
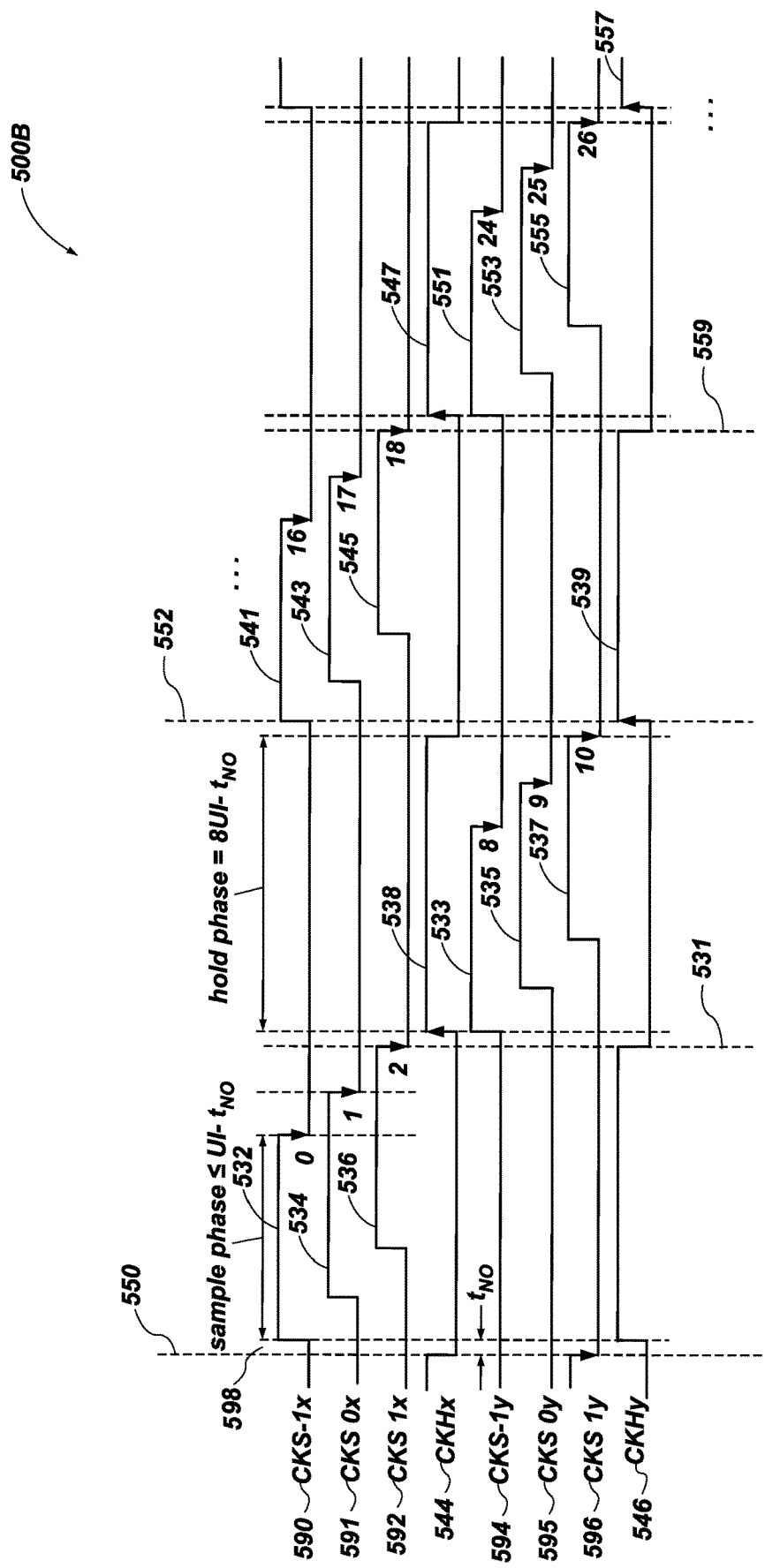
FIG. 5B is a timing diagram of clock signals used to enable and disable switch circuits of a clock-driven switch circuitry of the discrete-time linear equalizer circuit of FIG. 5A, according to one or more examples.

FIG. 5B is a timing diagram of clock signals 500B used to switchably enable and disable switch circuits of clock-driven switch circuitry 515 (e.g., turn on and off the switch circuits thereof for capacitor coupling and decoupling) of discrete-time linear equalizer circuit 500A of FIG. 5A, according to one or more examples. In one or more examples, clock signals 500B of FIG. 5B may be generated by clock signal generator circuitry and provided at respective clock output nodes which are coupled to respective switch control inputs of clock-driven switch circuitry 515 of FIG. 5A.

In one or more examples, the discrete-time linear equalizer circuit utilizing clock signals 500B of FIG. 5B may be part of a first ($1^{st}$) time-multiplexed circuit thread of eight (8) time-multiplexed circuit threads of a discrete-time linear equalizer. The discrete-time linear equalizer circuit of the first ($1^{st}$) time-multiplexed circuit thread is to perform signal equalization in relation to a $1^{st}$ symbol (i.e., a cursor symbol) and respective subsequent $(i*8+1)^{th}$ symbols (i.e., subsequent cursor symbols) of a modulated signal, for consecutive positive integers i. In one or more alternative examples, the discrete-time linear equalizer circuit utilizing clock signals 500B of FIG. 5B is part of a different $M^{th}$ time-multiplexed circuit thread of the N time-multiplexed circuit threads.

A first sample and hold operation associated with the first capacitors of switched-capacitor circuits 502 of FIG. 5A begins at a time 550 of FIG. 5B. Clock signals 500B include a first sampling clock signal 590 ($CKS_{-1x}$), a second sampling clock signal 591 ($CKS_{0x}$), a third sampling clock signal 592 ($CKS_{1x}$), and a first hold clock signal 544 ($CKH_x$). For a first sampling phase associated with the first sample and hold operation, first sampling clock signal 590 ($CKS_{-1x}$) includes an enable signal portion 532 for enabling clock-driven switch circuitry 515 to charge first capacitor 520 ($C_{-1x}$) over the first sampling time period (for symbol "0"). Second sampling clock signal 591 ($CKS_{0x}$) includes an enable signal portion 534 for enabling clock-driven switch circuitry 515 to charge first capacitor 524 ($C_{0x}$) over the second sampling time period (for symbol "1"). Third sampling clock signal 592 ($CKS_{1x}$) includes an enable signal portion 536 for enabling clock-driven switch circuitry 515 charge first capacitor 528 ($C_{1x}$) over the third sampling time period (for symbol "2"). In one or more examples, respective time periods of the first sample phase associated with respective ones of enable signal portions of the clock signals (i.e., enable signal portion 532, enable signal portion 534, and enable signal portion 536) is less than or equal to the UI, or less than or equal to the difference between the UI and a time period $t_{NO}$ (e.g., a time period 598). Note that enable signal portions (e.g., at high signal levels) of the respective clock signals are separated by disable signal portions (e.g., at low signal levels) of the respective clock signals.

For a first hold phase associated with the first sample and hold operation, first hold clock signal 544 ($CKH_x$) has an enable signal portion 538 for enabling clock-driven switch circuitry 515 to switchably couple first capacitor 524 ($C_{0x}$) between output 511 and inverting input 507 of operational amplifier 510 over a first hold time period (e.g., where output 511 is coupled to amplifier output 509 of operational amplifier 510). Clock-driven switch circuitry 515 is to further switchably couple first capacitor 520 ($C_{-1x}$) and first capacitor 528 ($C_{1x}$) in a closed feedback loop with first capacitor 524 ($C_{0x}$) over the first hold time period. In one or more examples, the first hold time period associated with enable signal portion 538 of first hold clock signal 544 ($CKH_x$) is equal to N*UI (e.g., 8*UI), or equal to the difference between 8*UI and the time period $t_{NO}$.

A second sample and hold operation associated with the second capacitors of switched-capacitor circuits 502 of FIG. 5A begins at a time 531 of FIG. 5B. Clock signals 500B include a fourth sampling clock signal 594 ($CKS_{-1y}$), a fifth sampling clock signal 595 ($CKS_{0y}$), a sixth sampling clock signal 596 ($CKS_{1y}$), and a second hold clock signal 546 ($CKH_y$). For a second sampling phase associated with the second sample and hold operation, fourth sampling clock signal 594 ($CKS_{-1y}$) includes an enable signal portion 533 for enabling clock-driven switch circuitry 515 to charge second capacitor 522 ($C_{-1y}$) over the fourth sampling time period (for symbol "8"). Fifth sampling clock signal 595 ($CKS_{0y}$) includes an enable signal portion 535 is for enabling clock-driven switch circuitry 515 to charge second capacitor 526 ($C_{0y}$) over the fifth sampling time period (for symbol "9"). Sixth sampling clock signal 596 ($CKS_{1y}$) includes an enable signal portion 537 is for enabling clock-driven switch circuitry 515 to charge second capacitor 530 ($C_{1y}$) over the sixth sampling time period (for symbol "10"). In one or more examples, respective time periods of the second sample phase associated with respective ones of enable signal portions of the clock signals (i.e., enable signal portion 533, enable signal portion 535, and enable signal portion 537) is less than or equal to the UI, or less than or equal to the difference between the UI and the time period $t_{NO}$. In one or more examples, the second sampling phase is performed, in part or in full, during the (previously described) first hold phase, as shown (e.g., at or near a beginning of the first hold phase).

For a second hold phase associated with the second sample and hold operation, second hold clock signal 546 ($CKH_y$) has an enable signal portion 539 for enabling clock-driven switch circuitry 515 to switchably couple second capacitor 526 ($C_{0y}$) between output 511 and inverting input 507 of operational amplifier 510 over a second hold time period (e.g., where output 511 is coupled to amplifier output 509 of operational amplifier 510). Clock-driven switch circuitry 515 is to further switchably couple second capacitor 522 ($C_{-1y}$) and second capacitor 530 ($C_{1y}$) in a closed feedback loop with second capacitor 526 ($C_{0y}$) over the second hold time period. In one or more examples, the second hold time period associated with enable signal portion 539 of second hold clock signal 546 ($CKH_y$) is equal to N*UI (e.g., 8*UI), or equal to the difference between 8*UI and the time period $t_{NO}$.

The above-described sample and hold operations are repeated with use of switched-capacitor circuits 502 of FIG. 5A, operations that are now described for completeness. A next first sample and hold operation associated with the first capacitors of switched-capacitor circuits 502 of FIG. 5A begins at a time 552 of FIG. 5B. Clock signals 500B including first sampling clock signal 590 ($CKS_{-1x}$), second sampling clock signal 591 ($CKS_{0x}$), third sampling clock signal 592 ($CKS_{1x}$), and first hold clock signal 544 ($CKH_x$) are again utilized. For a next first sampling phase associated with the next first sample and hold operation, first sampling clock signal 590 ($CKS_{-1x}$) includes an enable signal portion 541 for enabling clock-driven switch circuitry 515 to charge first capacitor 520 ($C_{-1x}$) over the next first sampling time period (for symbol "16"). Second sampling clock signal 591 ($CKS_{0x}$) includes an enable signal portion 543 for enabling clock-driven switch circuitry 515 to charge first capacitor 524 ($C_{0x}$) over the next second sampling time period (for symbol "17"). Third sampling clock signal 592 ($CKS_{1x}$) includes an enable signal portion 545 for enabling clock-driven switch circuitry 515 to charge first capacitor 528 ($C_{1x}$) over the next third sampling time period (for symbol "18"). In one or more examples, respective time periods of the next first sample phase associated with respective ones of enable signal portions of the clock signals (i.e., enable signal portion 541, enable signal portion 543, and enable signal portion 545) is less than or equal to the UI, or less than or equal to the difference between the UI and the time period $t_{NO}$. In one or more examples, this next first sampling phase is performed, in part or in full, during the (previously described) second hold phase, as shown (e.g., at or near a beginning of the second hold phase).

For a next first hold phase associated with the next first sample and hold operation, first hold clock signal 544 ($CKH_x$) has an enable signal portion 547 for enabling clock-driven switch circuitry 515 to switchably couple first capacitor 524 ($C_{0x}$) between output 511 and inverting input 507 of operational amplifier 510 over a next first hold time period (e.g., where output 511 is coupled to amplifier output 509 of operational amplifier 510). Clock-driven switch circuitry 515 is to further switchably couple first capacitor 520 ($C_{-1x}$) and first capacitor 528 ($C_{1x}$) in a closed feedback loop with first capacitor 524 ($C_{0x}$) over the next first hold time period. In one or more examples, the next first hold time period associated with enable signal portion 547 of first hold clock signal 544 ($CKH_x$) is equal to N*UI (e.g., 8*UI), or equal to the difference between 8*UI and the time period $t_{NO}$.

A next second sample and hold operation associated with the second capacitors of switched-capacitor circuits 502 of FIG. 5A begins at a time 559 of FIG. 5B. Clock signals 500B including fourth sampling clock signal 594 ($CKS_{-1y}$), fifth sampling clock signal 595 ($CKS_{0y}$), sixth sampling clock signal 596 ($CKS_{1y}$), and second hold clock signal 546 ($CKH_y$) are utilized. For a next second sampling phase associated with the next second sample and hold operation, fourth sampling clock signal 594 ($CKS_{-1y}$) includes an enable signal portion 551 for enabling clock-driven switch circuitry 515 to charge second capacitor 522 ($C_{-1y}$) over the next fourth sampling time period (for symbol "24"). Fifth sampling clock signal 595 ($CKS_{0y}$) includes an enable signal portion 553 for enabling clock-driven switch circuitry 515 to charge second capacitor 526 ($C_{0y}$) over the next fifth sampling time period (for symbol "25"). Sixth sampling clock signal 596 ($CKS_{1y}$) includes an enable signal portion 555 for enabling clock-driven switch circuitry 515 charge second capacitor 530 ($C_{1y}$) over the next sixth sampling time period (for symbol "26"). In one or more examples, respective time periods of the next second sample phase associated with respective ones of enable signal portions of the clock signals (i.e., enable signal portion 551, enable signal portion 553, and enable signal portion 555) is less than or equal to the UI, or less than or equal to the difference between the UI and the time period $t_{NO}$. In one or more examples, this next second sampling phase is performed, in part or in full, during the (previously described) next first hold phase, as shown (e.g., at or near a beginning of the next first hold phase).

For a next second hold phase associated with the next second sample and hold operation, second hold clock signal 546 ($CKH_y$) has an enable signal portion 557 (only a portion thereof shown in FIG. 5B) for enabling clock-driven switch circuitry 515 to switchably couple second capacitor 526 ($C_{0,y}$) between output 511 and inverting input 507 of operational amplifier 510 over a next second hold time period (e.g., where output 511 is coupled to amplifier output 509 of operational amplifier 510). Clock-driven switch circuitry 515 is to further switchably couple second capacitor 522 ($C_{-1,y}$) and second capacitor 530 ($C_{1,y}$) in a closed feedback loop with second capacitor 526 ($C_{0,y}$) over the next second hold time period. In one or more examples, the next second hold time period associated with enable signal portion 557 of second hold clock signal 546 ($CKH_y$) is equal to N*UI (e.g., 8*UI), or equal to the difference between 8*UI and the time period $t_{NO}$.

In one or more examples, the above-described sample and hold operations are repeated, in an on-going manner, with use of multiple double-sampling SHCs 502 of FIG. 5A.

In one or more examples, discrete-time linear equalizer circuit 500A of FIG. 5A exhibits an increased gain in exchange for bandwidth, as compared to discrete-time linear equalizer circuit 400A of FIG. 4A. In one or more examples, the settling time for discrete-time linear equalizer circuit 500A of FIG. 5A is longer than that of FIG. 4A, but the gain is higher and therefore noise performance is improved.

In one or more examples, discrete-time linear equalizer circuit 400A of FIG. 4A is faster than discrete-time linear equalizer circuit 500A of FIG. 5A, as all three capacitors are flipped around the opamp. The reason is that the loop gain is the highest. To better explain, the return ratio of the feedback loop (i.e., βa, where β is the feedback factor and a is the forward gain) depends on the total feedback capacitor $C_f$ and the parasitic input capacitance $C_{in}$ of the opamp: $\beta = C_f/(C_{in}+C_f) = (C_{pre}+C_{cur}+C_{pst})/(C_{in}+C_{pre}+C_{cur}+C_{pst})$. In the case of discrete-time linear equalizer circuit 400A of FIG. 4A, $C_{in}$ is small compared to $C_f$ (the sum of the sampling capacitors) and R is approximately one (1). In the case of discrete-time linear equalizer circuit 500A of FIG. 5A, the feedback capacitor is $C_f'=C_{cur}$, only a third of what was present in the first case. At the input of the opamp, we now have the parasitic input capacitance, plus $C_{pre}+C_{pst}$: $\beta'=C_f'/(C_{in}'+C_f')=C_{cur}/(C_{in}+C_{pre}+C_{cur}+C_{pst})$. The two loop gains, and therefore the bandwidths, relate as $\beta/\beta'=(C_{pre}+C_{cur}+C_{pst})/C_{cur}$. With equal capacitances, $\beta/\beta'=3$.

Figure 5C:
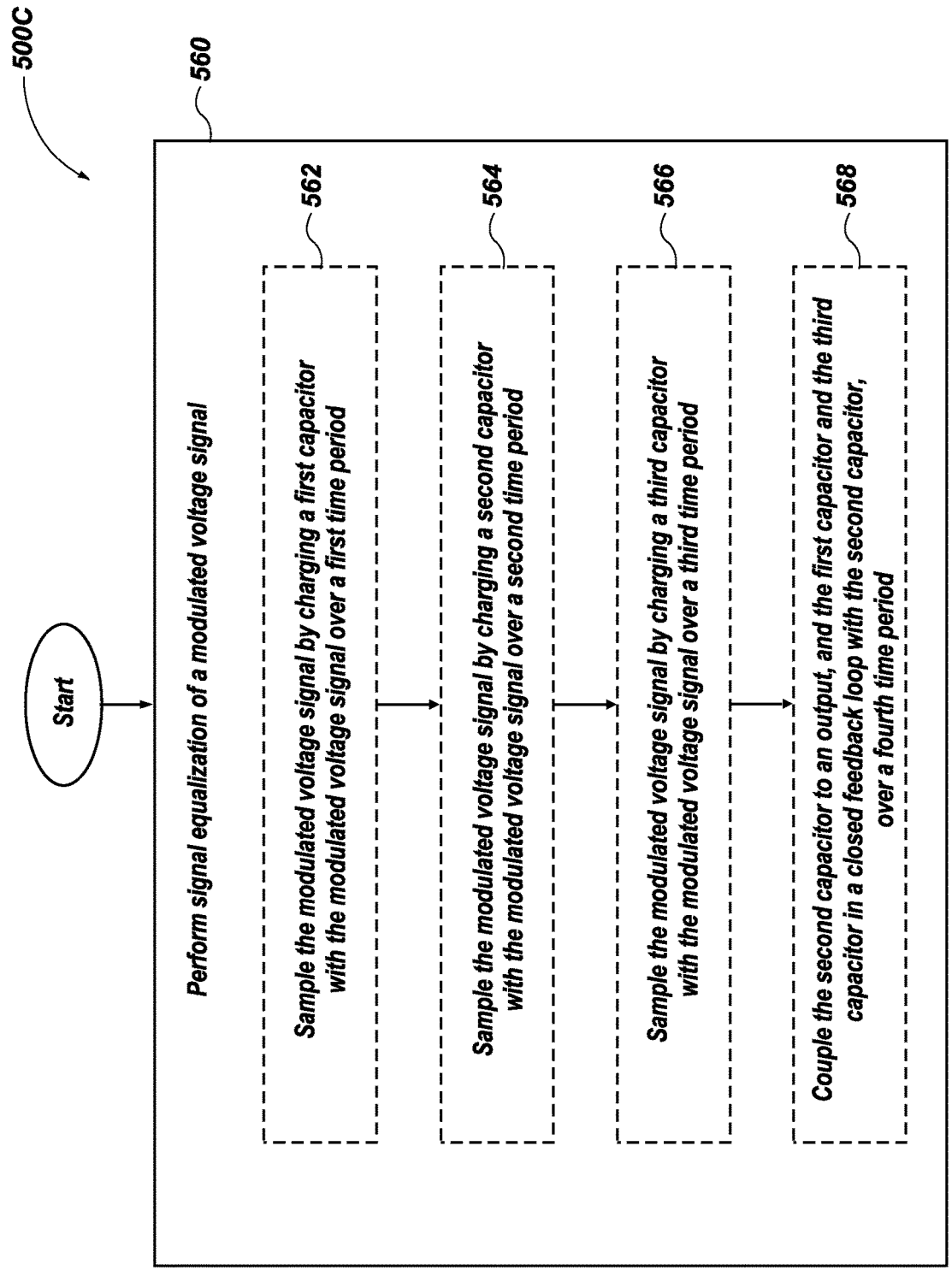
FIG. 5C is a flowchart of a method of performing signal equalization of a modulated voltage signal using a discrete-time linear equalizer, according to one or more examples.

FIG. 5C is a flowchart of a method 500C of performing signal equalization of a modulated voltage signal using a discrete-time linear equalizer, according to one or more examples. In one or more examples, method 500C may be performed with use of discrete-time linear equalizer circuit 500A of FIG. 5A, with use of discrete-time linear equalizer circuit 500A of FIG. 5A using clock signals 500B of FIG. 5B, or variations of the above.

At an act 560 of FIG. 5C, signal equalization of a modulated voltage signal is performed. Signal equalization of the modulated voltage signal may be performed at least by an act 562, an act 564, an act 566, and an act 568. At an act 562, the modulated voltage signal is sampled by charging a first capacitor with the modulated voltage signal over a first time period. At an act 564, the modulated voltage signal is sampled by charging a second capacitor with the modulated voltage signal over a second time period. At an act 566, the modulated voltage signal is sampled by charging a third capacitor with the modulated voltage signal over a third time period. At an act 568, the second capacitor is coupled to an output, and the first capacitor and the third capacitor are coupled in a closed feedback loop with the second capacitor, over a fourth time period.

In one or more examples, in the closed feedback loop, charges from the first capacitor and the third capacitor are forced in the second capacitor during the fourth time period. In one or more examples, an output voltage from the output is generated at least partially based on a charge redistribution of charges from the first capacitor and the third capacitor, which are forced into the second capacitor during the fourth time period. In one or more examples, the output voltage is proportional to a summation of products between respective symbol voltages of the first symbol, the second symbol, and the third symbol and respective capacitances of the first capacitor, the second capacitor, and the third capacitor. In one or more examples, the output voltage is at least partially based on a ratio of this summation of products over the capacitance of the second capacitor.

In one or more examples, the modulated voltage signal comprises a discrete-time modulated voltage signal. In one or more examples, the discrete-time modulated voltage signal includes a first symbol during the first time period, a second symbol during the second time period, and a third symbol during the third time period. In one or more examples, the first symbol, the second symbol, and the third symbols are consecutive symbols and/or part of a sequence of consecutive symbols. In one or more examples, the modulated voltage signal is modulated according to PAM-4, and the consecutive symbols are consecutive PAM-4 symbols.

In one or more examples, the performing of the signal equalization is repeated for respective consecutive symbols of the modulated voltage signal. In one or more examples, the repeated performing of the signal equalization for the respective consecutive symbols of the modulated voltage signal are performed at respective ones of N time-multiplexed circuit threads of N discrete-time linear equalizer circuits of a discrete-time linear equalizer, where N is a positive integer.

In one or more examples, in the act 560, the signal equalization is performed at a discrete-time linear equalizer comprising a double-sampling sample and hold circuitry including multiple double-sampling switched-capacitor circuits. In one or more examples, the signal equalization of the modulated voltage signal is performed by repeating the act 562, the act 564, the act 566, and the act 568 (e.g., using the multiple double-sampling SHCs). Here, in one or more examples, the modulated voltage signal is further sampled by charging a fourth capacitor with the modulated voltage signal over a fifth time period. The modulated voltage signal is further sampled by charging a fifth capacitor with the modulated voltage signal over a sixth time period. The modulated voltage signal is further sampled by charging a sixth capacitor with the modulated voltage signal over a seventh time period. The fifth capacitor is coupled to the output, and the fourth capacitor and the sixth capacitor are coupled in a closed feedback loop with the fifth capacitor, over an eighth time period. In one or more examples, in the closed feedback loop, charges from the fourth capacitor and the sixth capacitor are forced in the fifth capacitor during the eighth time period, and a second output voltage from the output is generated at least partially based on a charge redistribution of charges from the fourth capacitor and the sixth capacitor, which is forced into the fifth capacitor during the eighth time period.

Thus, a discrete-time linear equalizer circuit may be configured at least partially based on FIG. 5A, FIG. 5B, and FIG. 5C, in view of the time-multiplexed processing associated with FIG. 4D described earlier. The discrete-time linear equalizer may comprise a set of N time-multiplexed circuit threads of N discrete-time linear equalizer circuits. Respective $M^{th}$ ones of the N discrete-time linear equalizer circuits are to perform signal equalization in relation to an $M^{th}$ symbol and respective subsequent $(i*N+M)^{th}$ symbols of a modulated signal (e.g., a discrete-time modulated signal) for consecutive positive integers i, where N is a positive integer and M is a positive integer from 1 to N. The respective $M^{th}$ ones of the N discrete-time linear equalizer circuits comprise a double-sampling sample and hold circuitry including multiple double-sampling switched-capacitor (SC) circuits and an operational amplifier. The multiple double-sampling switched-capacitor circuits include at least a double-sampling switched-capacitor circuit of a pre-cursor tap, a double-sampling switched-capacitor circuit of a cursor tap, and a double-sampling switched-capacitor circuit of a post-cursor tap, the double-sampling switched-capacitor circuit of the pre-cursor tap including a first capacitor $C_{-1x}$ and a second capacitor $C_{-1y}$, the double-sampling switched-capacitor circuit of the cursor tap including a first capacitor $C_{0x}$ and a second capacitor $C_{0y}$, and the double-sampling switched-capacitor circuit of the post-cursor tap including at least a first capacitor $C_{1x}$ and a second capacitor $C_{1y}$. A clock-driven switch circuitry is to switchably couple the first capacitor $C_{1x}$ to a signal input to charge the first capacitor $C_{-1x}$ with the modulated signal over an $(M-1)^{th}$ sampling time period, the first capacitor $C_{0x}$ to the signal input to charge the first capacitor $C_{0x}$ with the modulated signal over an $M^{th}$ sampling time period, and the first capacitor $C_{1x}$ to the signal input to charge the first capacitor $C_{1x}$ with the modulated signal over an $(M+1)^{th}$ sampling time period. In addition, the clock-driven switch circuitry is to switchably couple the first capacitor $C_{0x}$ to an amplifier output of the operational amplifier, and in closed feedback loop with the first capacitor $C_{1x}$ and the first capacitor $C_{1x}$, over an $M^{th}$ hold time period. Furthermore, the clock-driven switch circuitry is to switchably couple the second capacitor $C_{-1y}$ to the signal input to charge the second capacitor $C_{-1y}$ with the modulated signal over an $(M+N+1)^{th}$ sampling time period, the second capacitor $C_{0y}$ to the signal input to charge the second capacitor $C_{0y}$ with the modulated signal over an $(M+N)^{th}$ sampling time period, and the second capacitor $C_{1y}$ to the signal input to charge the second capacitor $C_{1y}$ with the modulated signal over an $(M+N+1)^{th}$ sampling time period. In addition, the clock-driven switch circuitry is to switchably couple the second capacitor $C_{0y}$ to the amplifier output of the operational amplifier, and in a closed feedback loop with the second capacitor $C_{-1y}$ and the second capacitor $C_{1y}$, over an $(M+N)^{th}$ hold time period.

In one or more specific examples based on FIG. 5A, FIG. 5B, and FIG. 5C, a first output voltage is generated at the amplifier output at least partially based on charge redistribution of charges between the first capacitor $C_{1x}$ and the first capacitor $C_{1x}$ during the $M^{th}$ hold time period, and a second output voltage is generated at the amplifier output at least partially based on charge redistribution of charges between the second capacitor $C_{-1y}$ and the second capacitor $C_{1y}$ during the $(M+N)^{th}$ hold time period. In one or more examples, the first output voltage is based on the mathematical relation $$V_{OUT1} = \frac{C_{-1X} * d_{M-1} + C_{0X} * d_M + C_{1X} * d_{M+1}}{C_{0X}},$$

where $V_{OUT1}$ is the first output voltage, $C_{-1x}$, $C_{0x}$, and $C_{1x}$ are respective capacitances of the first capacitors $C_{-1x}$, $C_{0x}$, and $C_{1x}$, and $d_{M-1}$ is a voltage of an $(M-1)^{th}$ symbol during the $(M-1)^{th}$ sampling time period, $d_M$ is a voltage of an $M^{th}$ symbol during the $M^{th}$ sampling time period, and $d_{M+1}$ is a voltage of an $(M+1)^{th}$ symbol during the $(M+1)^{th}$ sampling time period. In one or more examples, the second output voltage is based on the mathematical relation $$V_{OUT2} = \frac{C_{-1Y} * d_{M+N-1} + C_{0Y} * d_{M+N} + C_{1Y} * d_{M+N+1}}{C_{0Y}},$$

where $V_{OUT2}$ is the second output voltage, $C_{-1y}$, $C_{0y}$, and $C_{1y}$ are respective capacitances of the second capacitors $C_{-1y}$, $C_{0y}$, and $C_{1y}$, and $d_{M+N-1}$ is a voltage of an $(M+N-1)^{th}$ symbol during the $(M+N-1)^{th}$ sampling time period, $d_{M+N}$ is a voltage of an $(M+N)^{th}$ symbol during the $(M+N)^{th}$ sampling time period, and $d_{M+N+1}$ is a voltage of an $(M+N+1)^{th}$ symbol during the $(M+N+1)^{th}$ sampling time period.

Figure 6A:
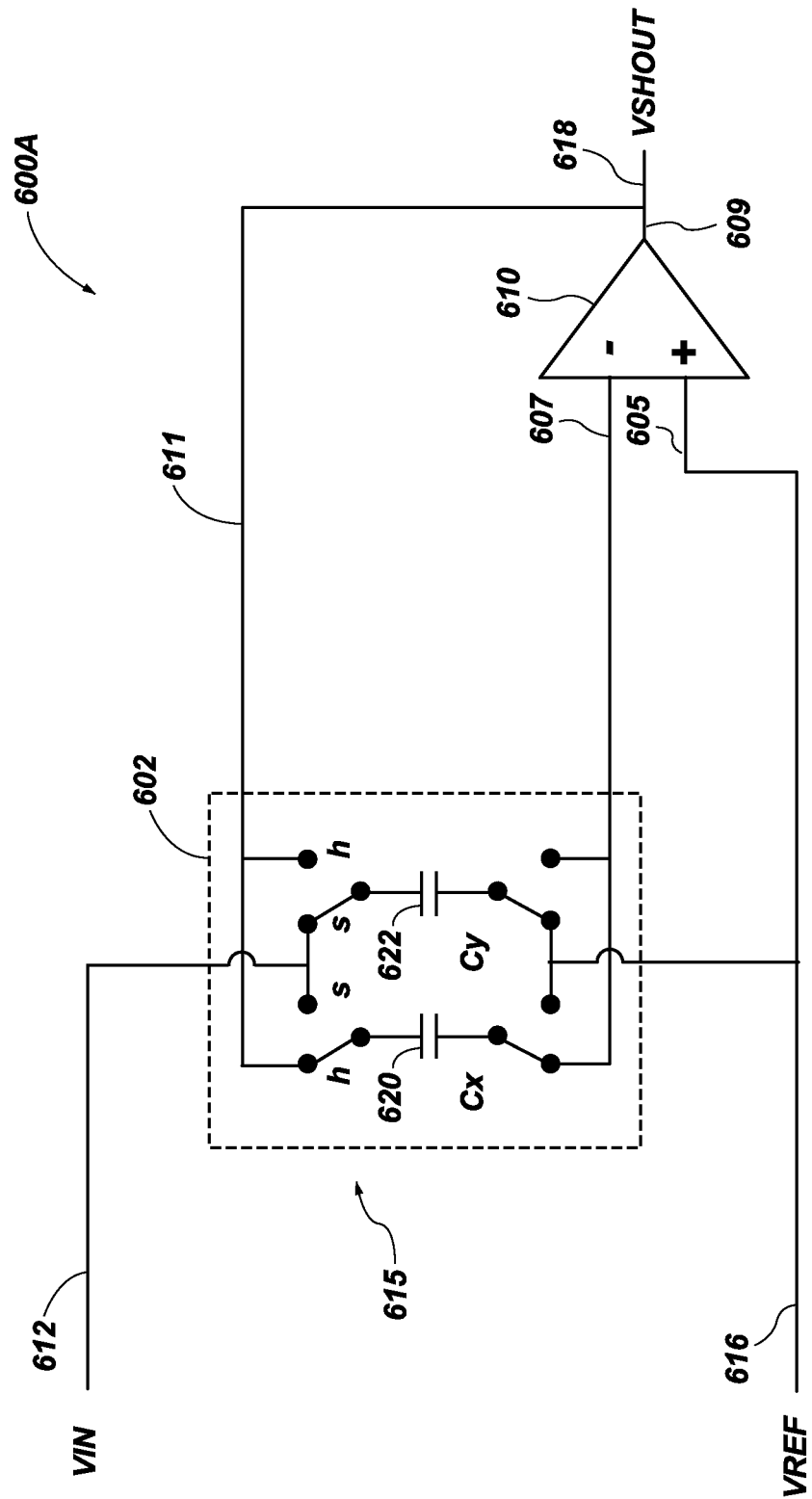
FIG. 6A is a schematic diagram of a sample and hold circuit of a discrete-time analog front-end, according to one or more examples.

FIG. 6A is a schematic diagram of a sample and hold circuit 600A of a discrete-time analog front-end, according to one or more examples. In one or more examples, sample and hold circuit 600A of FIG. 6A may be utilized as or in SHC 210 of DT-AFE 206 of FIG. 2A.

Sample and hold circuit 600A includes a double-sampling switched-capacitor circuit 602 (or hereinafter "switched-capacitor circuit 602") and an operational amplifier 610. Switched-capacitor circuit 602 includes a first capacitor 620 ($C_x$) and a second capacitor 622 ($C_y$). A clock-driven switch circuitry 615 of switched-capacitor circuits 602 may include switches and/or switch circuits as indicated by switch lines and contacts (small dark circles) in the figure. In FIG. 6A, sample and hold circuit 600A utilizes double-sampling ("ping-pong") and a flip-around hold amplifier that operates continuously.

In a first sampling phase, a clock-driven switch circuitry 615 of switched-capacitor circuit 602 is to switchably couple first capacitor 620 ($C_x$) to a signal input 612 to charge first capacitor 620 ($C_x$) with a continuous-time modulated signal over a first sampling time period. More specifically, in one or more examples, clock-driven switch circuitry 615 is to switchably couple first capacitor 620 ($C_x$) between signal input 612 and a non-inverting input 605 of operational amplifier 610 to charge first capacitor 620 ($C_x$) with the continuous-time modulated signal over the first sampling time period. In a first hold phase, clock-driven switch circuitry 615 is to then switchably couple first capacitor 620 ($C_x$) to an output 611 over a first hold time period. Output 611 is coupled to an amplifier output 609 of operational amplifier 610. More specifically, in one or more examples, clock-driven switch circuitry 615 is to switchably couple first capacitor 620 ($C_x$) between output 611 and an inverting input 607 of operational amplifier 610 over the first hold time period.

In a second sampling phase, clock-driven switch circuitry 615 is to switchably couple second capacitor 622 ($C_y$) to signal input 612 to charge second capacitor 622 ($C_y$) with the continuous-time modulated signal over a second sampling time period. More specifically, in one or more examples, clock-driven switch circuitry 615 is to switchably couple second capacitor 622 ($C_y$) between signal input 612 and non-inverting input 605 of operational amplifier 610 to charge second capacitor 622 ($C_y$) with the continuous-time modulated signal over the second sampling time period. In a second hold phase, clock-driven switch circuitry 615 is to switchably couple second capacitor 622 ($C_y$) to output 611 over a second hold time period. Again, output 611 is coupled to amplifier output 609 of operational amplifier 610. More specifically, in one or more examples, clock-driven switch circuitry 615 is to switchably couple second capacitor 622 ($C_y$) between output 611 and inverting input 607 of operational amplifier 610 over the second hold time period.

In one or more examples, respective ones of multiple sample and hold circuits may be configured according to sample and hold circuit 600A of FIG. 6A, for utilization as or in SHC 210 of DT-AFE 206 of FIG. 2A. For example, respective ones of three (3) sample and hold circuits for sampling respective consecutive symbols (e.g., for a precursor symbol, a cursor symbol, and a post-cursor symbol) may be configured according to sample and hold circuit 600A of FIG. 6A, for utilization as or in SHC 210 of DT-AFE 206 of FIG. 2A.

Figure 6B:
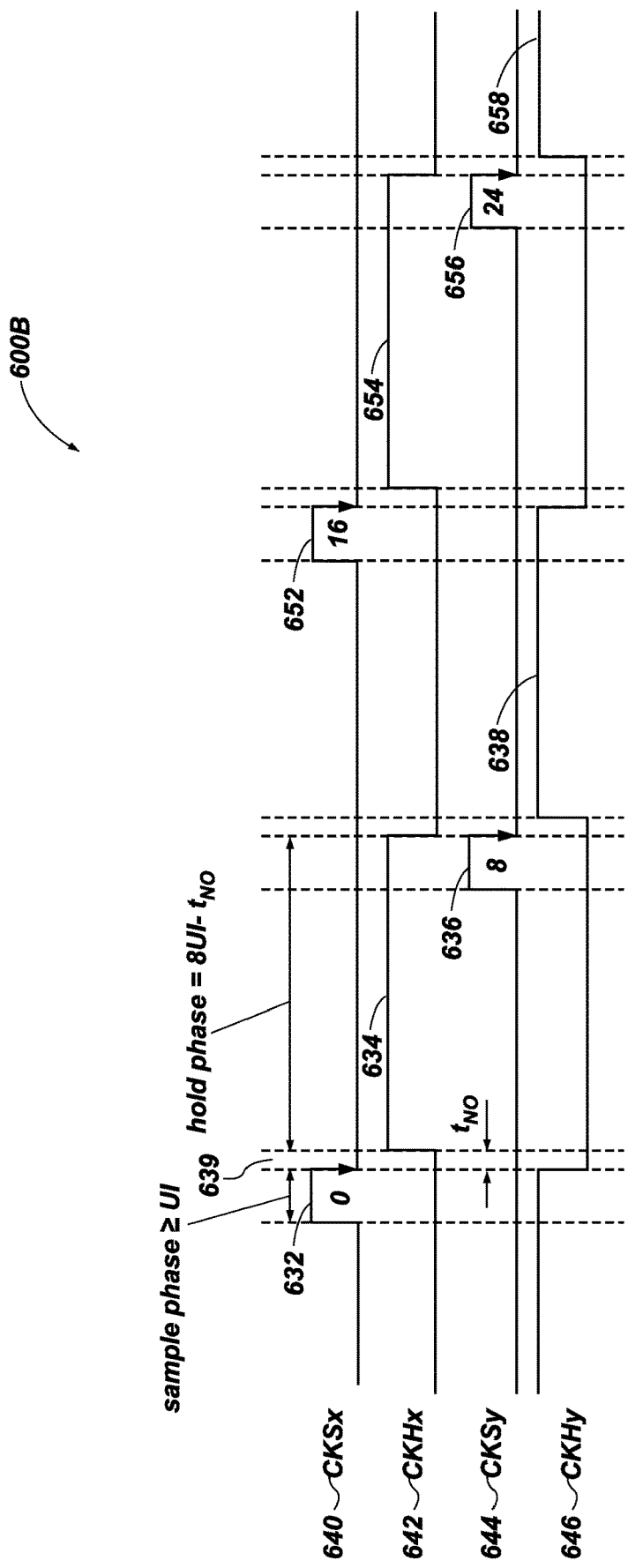
FIG. 6B is a timing diagram of clock signals used to enable and disable switch circuits of a clock-driven switch circuitry of the sample and hold circuit of FIG. 6A, according to one or more examples.

FIG. 6B is a timing diagram of clock signals 600B used to enable and disable switch circuits of clock-driven switch circuitry 615 (e.g., turn on and off the switch circuits thereof for capacitor coupling and decoupling) of sample and hold circuit 600A of FIG. 6A, according to one or more examples. In one or more examples, clock signals 600B of FIG. 6B may be generated by clock signal generator circuitry and provided at respective clock output nodes which are coupled to respective switch control inputs of clock-driven switch circuitry 615 of FIG. 6A. In one or more examples, 3.5 GHz clocks may be used to gate sampling and holding. In one or more examples, a 1-UI strobe pulse may be used for high-speed data sampling.

A first sample and hold operation associated with first capacitor 620 ($C_x$) of switched-capacitor circuit 602 of FIG. 6A is based on clock signals 600B which include a first sampling clock signal 640 ($CKS_x$) and a first hold clock signal 642 ($CKH_x$). For a first sampling phase associated with the first sample and hold operation, first sampling clock signal 640 ($CKS_x$) includes an enable signal portion 632 for enabling clock-driven switch circuitry 615 to charge first capacitor 620 ($C_x$) over the first sampling time period (for symbol "0"). In one or more examples, the first sampling time period associated with enable signal portion 632 is greater than or equal to the UI. For a first hold phase associated with the first sample and hold operation, first hold clock signal 642 ($CKH_x$) has an enable signal portion 634 for enabling clock-driven switch circuitry 615 to switchably couple first capacitor 620 ($C_x$) to output 611 over a first hold time period. In one or more examples, the first hold time period associated with enable signal portion 634 of first hold clock signal 642 ($CKH_x$) is equal to N*UI (e.g., 8*UI), or equal to the difference between 8*UI and a time period $t_{NO}$ (e.g., a time period 639).

A second sample and hold operation associated with second capacitor 622 ($C_y$) of switched-capacitor circuit 602 of FIG. 6A is based on clock signals 600B which include a second sampling clock signal 644 ($CKS_y$) and a second hold clock signal 646 ($CKH_y$). For a second sampling phase associated with the second sample and hold operation, second sampling clock signal 644 ($CKS_y$) includes an enable signal portion 636 for enabling clock-driven switch circuitry 615 to charge second capacitor 622 ($C_y$) over the second sampling time period (for symbol "8"). In one or more examples, the second sampling time period associated with enable signal portion 636 is greater than or equal to the UI. In one or more examples, the second sampling phase is performed, at least in part, during the (previously described) first hold phase, as shown. For a second hold phase associated with the second sample and hold operation, second hold clock signal 646 ($CKH_y$) has an enable signal portion 638 for enabling clock-driven switch circuitry 615 to switchably couple second capacitor 622 ($C_y$) to output 611 over a second hold time period. In one or more examples, the second hold time period associated with enable signal portion 638 of second hold clock signal 646 ($CKH_y$) is equal to N*UI (e.g., 8*UI), or equal to the difference between 8*UI and the time period $t_{NO}$.

The above-described sample and hold operations are repeated with use of switched-capacitor circuit 602 of FIG. 6A, operations that are now described for completeness. A "next" first sample and hold operation associated with first capacitor 620 ($C_x$) is again based on clock signals 600B which include first sampling clock signal 640 ($CKS_x$) and first hold clock signal 642 ($CKH_x$). For a next first sampling phase associated with the next first sample and hold operation, first sampling clock signal 640 ($CKS_x$) includes an enable signal portion 652 for enabling clock-driven switch circuitry 615 to charge first capacitor 620 ($C_x$) over the next first sampling time period (for symbol "16"). In one or more examples, the next first sampling time period associated with enable signal portion 652 is greater than or equal to the UI. In one or more examples, the next first sampling phase is performed, at least in part, during the (previously described) second hold phase, as shown. For a next first hold phase associated with the next first sample and hold operation, first hold clock signal 642 ($CKH_x$) has an enable signal portion 654 for enabling clock-driven switch circuitry 615 to switchably couple first capacitor 620 ($C_x$) to output 611 over a next first hold time period. In one or more examples, the next first hold time period associated with enable signal portion 654 of first hold clock signal 642 ($CKH_x$) is equal to N*UI (e.g., 8*UI), or equal to the difference between 8*UI and the time period $t_{NO}$.

A "next" second sample and hold operation associated with second capacitor 622 ($C_y$) of switched-capacitor circuit 602 of FIG. 6A is again based on clock signals 600B which include second sampling clock signal 644 ($CKS_y$) and second hold clock signal 646 ($CKH_y$). For a next second sampling phase associated with the next second sample and hold operation, second sampling clock signal 644 ($CKS_y$) includes an enable signal portion 656 for enabling clock-driven switch circuitry 615 to charge second capacitor 622 ($C_y$) over the next second sampling time period (for symbol "24"). In one or more examples, the next second sampling time period associated with enable signal portion 656 is greater than or equal to the UI. In one or more examples, the next second sampling phase is performed, in part, during the (previously described) next first hold phase, as shown. For a next second hold phase associated with the next second sample and hold operation, second hold clock signal 646 ($CKH_y$) has an enable signal portion 658 (only a portion thereof shown in FIG. 6B) for enabling clock-driven switch circuitry 615 to switchably couple second capacitor 622 ($C_y$) to output 611 over a next second hold time period. In one or more examples, the next second hold time period associated with enable signal portion 658 of second hold clock signal 646 ($CKH_y$) is equal to N*UI (e.g., 8*UI), or equal to the difference between 8*UI and the time period $t_{NO}$.

Thus, according to FIG. 6A and FIG. 6B, a sample and hold circuit may comprise a double-sampling sample and hold circuit including a first capacitor, a second capacitor, an operational amplifier, and a clock-driven switch circuitry. The clock-driven switch circuitry is to switchably couple the first capacitor to a signal input to charge the first capacitor with a continuous-time modulated signal over a first sampling time period. The clock-driven switch circuitry is to switchably couple the first capacitor to an amplifier output of the operational amplifier over a first hold time period. The clock-driven switch circuitry is to switchably couple the second capacitor to the signal input to charge the second capacitor with the continuous-time modulated signal over a second sampling time period. The clock-driven switch circuitry is to switchably couple the second capacitor to the amplifier output over a second hold time period.

Figure 7A:
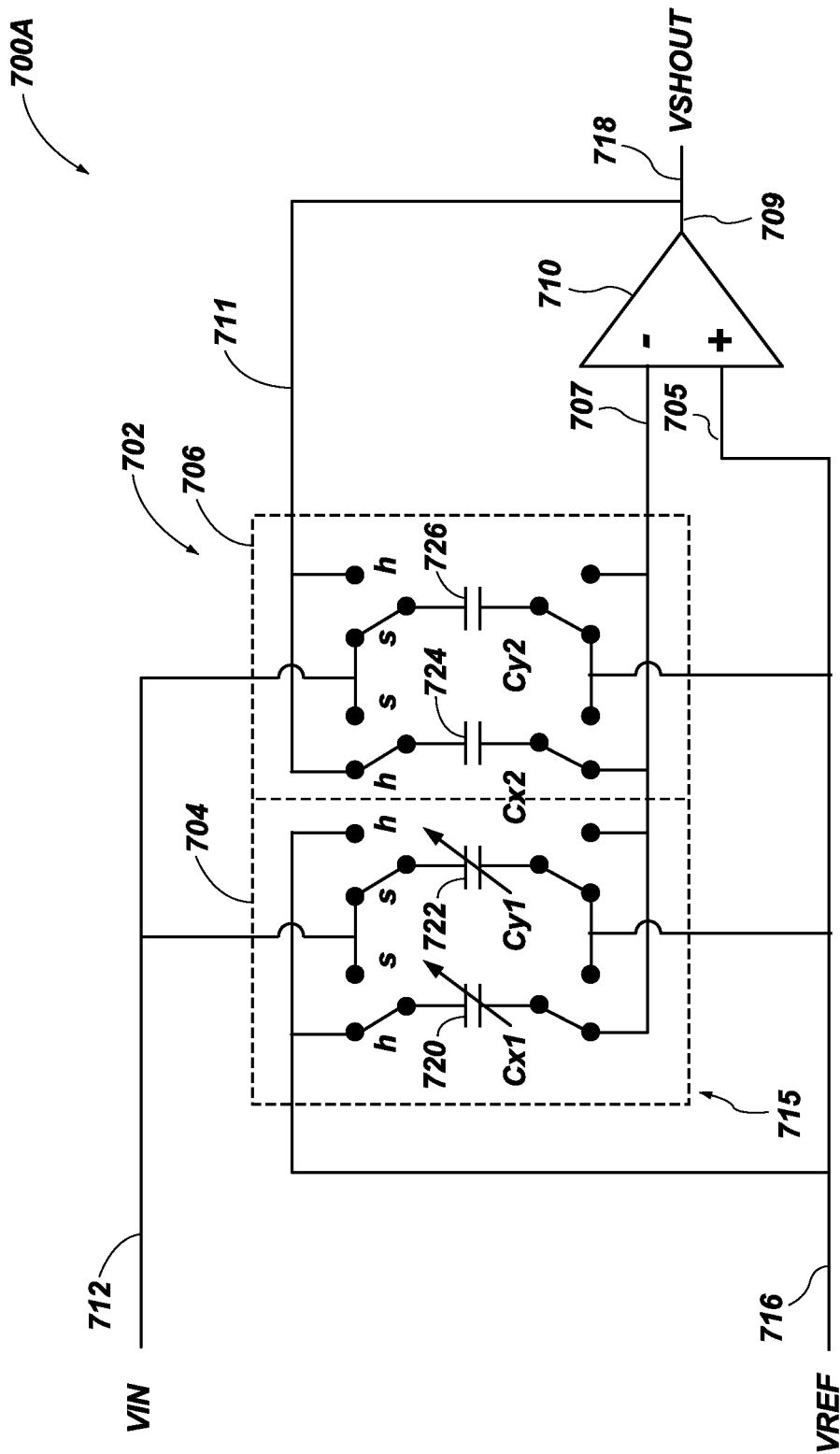
FIG. 7A is a schematic diagram of a discrete-time programmable gain amplifier circuit of a discrete-time analog front-end, according to one or more examples.

FIG. 7A is a schematic diagram of a discrete-time programmable gain amplifier circuit 700A according to one or more examples. In one or more examples, discrete-time programmable gain amplifier circuit 700A of FIG. 7A may be utilized as DT-PGA 214 of FIG. 2A.

In one or more examples, discrete-time programmable gain amplifier circuit 700A of FIG. 7A is based on a multiplying digital-to-analog converter (DAC) (MDAC) configuration. In one or more examples, the gain principle associated with discrete-time programmable gain amplifier circuit 700A is substantially the same as the gain principle described in relation to discrete-time linear equalizer circuit 500A of FIG. 5A.

In one or more examples, discrete-time programmable gain amplifier circuit 700A of FIG. 7A includes a double-sampling sample and hold circuitry including multiple double-sampling switched-capacitor circuits 702 (hereinafter "switched capacitor circuits 702") and an operational amplifier 710. Switched-capacitor circuits 702 include at least a double-sampling switched-capacitor circuit 704 (hereinafter "switched capacitor circuit 704") and a double-sampling switched-capacitor circuit 706 (hereinafter "switched capacitor circuit 706"). Respective ones of the switched-capacitor circuits 702 include a first capacitor and a second capacitor. More particularly, switched-capacitor circuit 702 includes a first capacitor 720 ($C_{x1}$) and a second capacitor 722 ($C_{y1}$), and switched-capacitor circuit 706 includes a first capacitor 724 ($C_{x2}$) and a second capacitor 726 ($C_{y2}$). In one or more examples, respective ones of first capacitor 720 ($C_{x1}$) and second capacitor 722 ($C_{y1}$) have an adjustable capacitance or variable-size capacitance (e.g., adjustable in linear steps). A clock-driven switch circuitry 715 of switched-capacitor circuits 702 may include switches and/or switch circuits as indicated by switch lines and contacts (small dark circles) in the figure.

For a first sampling phase, clock-driven switch circuitry 715 is to switchably couple first capacitor 720 ($C_{x1}$) of switched-capacitor circuit 704 between a signal input 712 and a non-inverting input 705 of operational amplifier 710 (i.e., at "s" node pairings) over a first sampling time period. Non-inverting input 705 of operational amplifier 710 is coupled to a reference voltage $V_{REF}$ provided at a node 716 (e.g., a voltage reference node). The switchable coupling of first capacitor 720 ($C_{x1}$) is to charge first capacitor 720 ($C_{x1}$) with a modulated signal (e.g., in forward polarity) over the first sampling time period. Clock-driven switch circuitry 715 is also to switchably couple first capacitor 724 ($C_{x2}$) of switched-capacitor circuit 706 between signal input 712 and non-inverting input 705 of operational amplifier 710 (i.e., at "s" node pairings) over the first sampling time period. The switchable coupling of first capacitor 724 ($C_{x2}$) is also to charge first capacitor 724 ($C_{x2}$) with the modulated signal (e.g., in forward polarity) over the first sampling time period.

For a first hold phase, clock-driven switch circuitry 715 is to switchably couple first capacitor 724 ($C_{x2}$) to an output 711 over a first hold time period. Output 711 is coupled to an amplifier output 709 of operational amplifier 710. More specifically, in the switchable coupling, clock-driven switch circuitry 715 is to switchably couple first capacitor 724 ($C_{x2}$) between output 711 and an inverting input 707 of operational amplifier 710 (i.e., at respective "h" node pairings) over the first hold time period. Clock-driven switch circuitry 715 is also to switchably couple, over the first hold time period, first capacitor 720 ($C_{x1}$) in a closed feedback loop with first capacitor 724 ($C_{x2}$). In the closed feedback loop, first capacitor 720 ($C_{x1}$) is coupled between non-inverting input 705 and inverting input 707 of operational amplifier 710 (i.e., at respective "h" node pairings). In one or more examples, in the closed feedback loop, the charge from first capacitor 720 ($C_{x1}$) is forced in first capacitor 724 ($C_{x2}$) during the first hold time period. In one or more examples, an output voltage $V_{SHOUT}$ 718 from the output is generated based on the total charge and voltage in first capacitor 724 ($C_{x2}$) (e.g., which is substantially doubled from the additional charge from first capacitor 720 ($C_{x1}$)).

For a second sampling phase, clock-driven switch circuitry 715 is to switchably couple second capacitor 722 ($C_{y1}$) of switched-capacitor circuit 704 between signal input 712 and non-inverting input 705 of operational amplifier 710 (i.e., at "s" node pairings) over a second sampling time period. Again, non-inverting input 705 of operational amplifier 710 is coupled to the reference voltage $V_{REF}$ provided at node 716 (e.g., the voltage reference node). The switchable coupling of second capacitor 722 ($C_{y1}$) is to charge second capacitor 722 ($C_{y1}$) with the modulated signal (e.g., in forward polarity) over the second sampling time period. Clock-driven switch circuitry 715 is also to switchably couple second capacitor 726 ($C_{y2}$) of switched-capacitor circuit 706 between signal input 712 and non-inverting input 705 of operational amplifier 710 (i.e., at "s" node pairings) over the second sampling time period. The switchable coupling of second capacitor 726 ($C_{y2}$) is also to charge second capacitor 726 ($C_{y2}$) with the modulated signal (e.g., in forward polarity) over the second sampling time period.

For a second hold phase, clock-driven switch circuitry 715 is to switchably couple second capacitor 726 ($C_{y2}$) to output 711 over a second hold time period. Output 711 is coupled to amplifier output 709 of operational amplifier 710. More specifically, in the switchable coupling, clock-driven switch circuitry 715 is to switchably couple second capacitor 726 ($C_{y2}$) between output 711 and an inverting input 707 of operational amplifier 710 (i.e., at respective "h" node pairings) over the first hold time period. Clock-driven switch circuitry 715 is also to switchably couple, over the second hold time period, second capacitor 722 ($C_{y1}$) in a closed feedback loop with second capacitor 726 ($C_{y2}$). In the closed feedback loop, second capacitor 722 ($C_{y1}$) is coupled between non-inverting input 705 and inverting input 707 of operational amplifier 710 (i.e., at respective "h" node pairings). In one or more examples, in the closed feedback loop, the charge from second capacitor 722 ($C_{y1}$) is forced in second capacitor 726 ($C_{y2}$) during the first hold time period. In one or more examples, output voltage $V_{SHOUT}$ 718 from the output is generated based on the total charge and voltage in second capacitor 726 ($C_{y2}$) (e.g., which is substantially doubled from the additional charge from first capacitor 720 ($C_{x1}$)).

Again, in one or more examples, the closed feedback loop forces the charge of first capacitor 720 ($C_{x1}$)/second capacitor 722 ($C_{y1}$) into first capacitor 724 ($C_{x2}$)/second capacitor 726 ($C_{y2}$), doubling the charge and voltage in first capacitor 724 ($C_{x2}$)/second capacitor 726 ($C_{y2}$). In one or more examples, the output voltage of discrete-time programmable gain amplifier circuit 700A may be determined based on the mathematical relation $$VSHOUT = \frac{V_{IN}*C2 + V_{IN}*C3}{C2} = V_{IN} * \frac{C2+C3}{C2}.$$

Figure 7B:
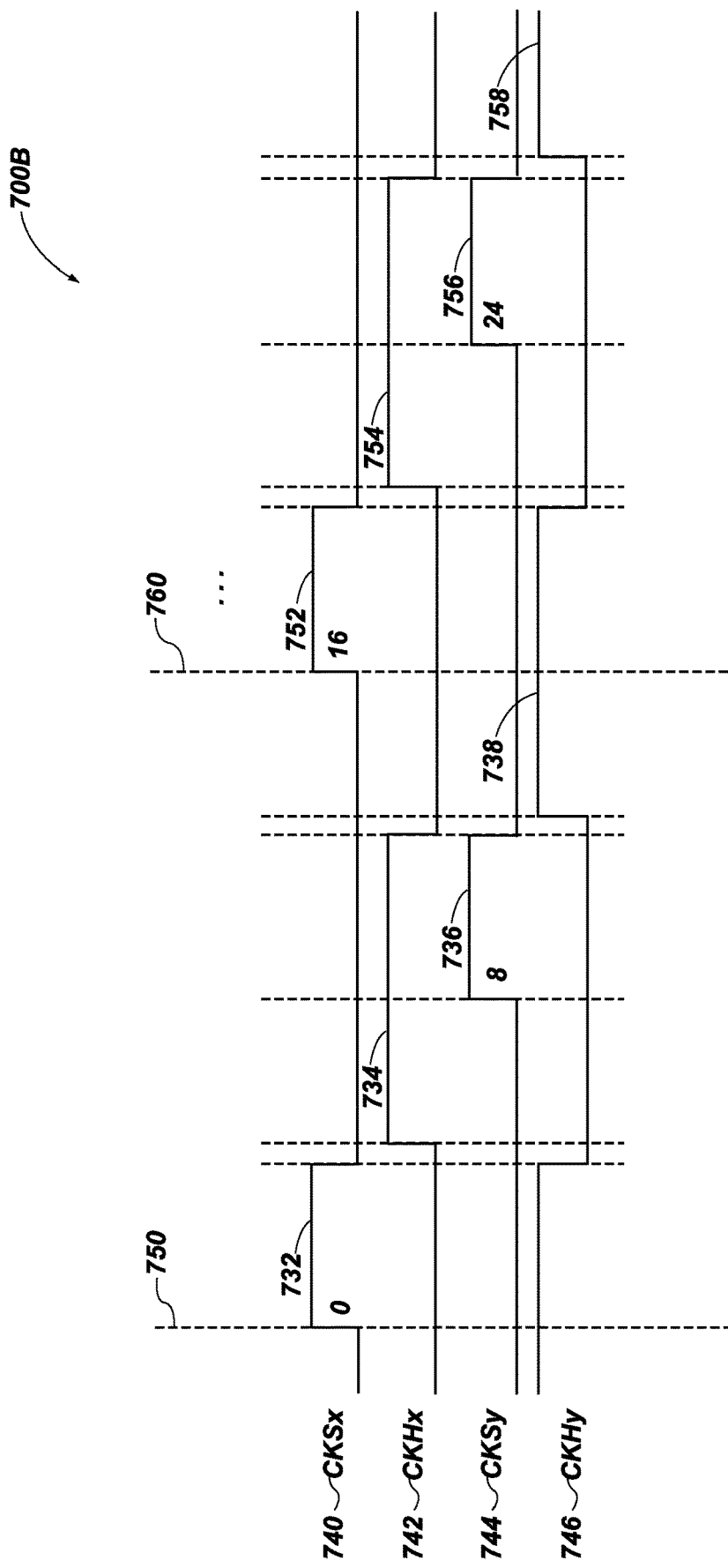
FIG. 7B is a timing diagram of clock signals used to enable and disable switch circuits of a clock-driven switch circuitry of the discrete-time programmable gain amplifier of FIG. 7A, according to one or more examples.

FIG. 7B is a timing diagram of clock signals 700B used to enable and disable switch circuits of clock-driven switch circuitry 715 (e.g., turn on and off the switch circuits thereof for capacitor coupling and decoupling) of discrete-time programmable gain amplifier circuit 700A of FIG. 7A, according to one or more examples. In one or more examples, clock signals 700B of FIG. 7B may be generated by clock signal generator circuitry and provided at respective clock output nodes which are coupled to respective switch control inputs of clock-driven switch circuitry 715 of FIG. 7A. In one or more examples, 3.5 GHz clocks are used to gate the sampling and holding.

A first sample and hold operation associated with the first capacitors of switched-capacitor circuits 702 of FIG. 7A begins at a time 750 of FIG. 7B. Clock signals 700B include a first sampling clock signal 740 ($CKS_x$) and a first hold clock signal 742 ($CKH_x$). For a first sampling phase associated with the first sample and hold operation, first sampling clock signal 740 ($CKS_x$) includes an enable signal portion 732 for enabling clock-driven switch circuitry 715 to charge first capacitor 720 ($C_{x1}$) with the modulated signal (in forward polarity) over the first sampling time period (e.g., associated with a symbol "0"). In addition, first sampling clock signal 740 ($CKS_x$) including enable signal portion 732 is for enabling clock-driven switch circuitry 715 to charge first capacitor 724 ($C_{x2}$) with the modulated signal (in forward polarity) over the first sampling time period (e.g., also associated with the symbol "0"). Note that enable signal portions (e.g., at high signal levels) of the respective clock signals are separated by disable signal portions (e.g., at low signal levels) of the respective clock signals.

For a first hold phase associated with the first sample and hold operation, first hold clock signal 742 ($CKH_x$) has an enable signal portion 734 for enabling clock-driven switch circuitry 715 to switchably couple first capacitor 724 ($C_{x2}$) of switched-capacitor circuit 706 to output 711 over a first hold time period. First hold clock signal 742 ($CKH_x$) also includes enable signal portion 734 for enabling clock-driven switch circuitry 715 to switchably couple first capacitor 720 ($C_{x1}$) of switched-capacitor circuit 704 in the closed feedback loop with first capacitor 724 ($C_{x2}$) of switched-capacitor circuit 706 over the first hold time period.

A second sample and hold operation associated with the second capacitors of switched-capacitor circuits 702 of FIG. 7A begins at a time during the first hold time period. Clock signals 400B include a second sampling clock signal 744 ($CKS_y$) and a second hold clock signal 746 ($CKH_y$). For a second sampling phase associated with the second sample and hold operation, second sampling clock signal 744 ($CKS_y$) includes an enable signal portion 736 for enabling clock-driven switch circuitry 715 to charge second capacitor 722 ($C_{y1}$) with the modulated signal (in forward polarity) over a second sampling time period (e.g., associated with a symbol "8"). In addition, second sampling clock signal 744 ($CKS_y$) including enable signal portion 736 is for enabling clock-driven switch circuitry 715 to charge second capacitor 726 ($C_{y2}$) with the modulated signal (in forward polarity) over the second sampling time period (e.g., also associated with the symbol "8").

For a second hold phase associated with the second sample and hold operation, second hold clock signal 746 ($CKH_y$) has an enable signal portion 738 for enabling clock-driven switch circuitry 715 to switchably couple second capacitor 726 ($C_{y2}$) of switched-capacitor circuit 706 to output 711 over a second hold time period. Second hold clock signal 746 ($CKH_y$) also includes enable signal portion 738 for enabling clock-driven switch circuitry 715 to switchably couple second capacitor 722 ($C_{y1}$) of switched-capacitor circuit 704 in the closed feedback loop with second capacitor 726 ($C_{y2}$) of switched-capacitor circuit 706 over the first hold time period.

The above-described sample and hold operations are repeated with use of multiple double-sampling switched-capacitor circuits 702 of FIG. 7A, operations that are now described for completeness. A "next" first sample and hold operation associated with the first capacitors of switched-capacitor circuits 702 of FIG. 7A begins at a time 760 of FIG. 7B (e.g., during the second hold time period). Clock signals 700B including first sampling clock signal 740 ($CKS_x$) and first hold clock signal 742 ($CKH_x$) are again utilized. For a next first sampling phase associated with the next first sample and hold operation, first sampling clock signal 740 ($CKS_x$) includes an enable signal portion 752 for enabling clock-driven switch circuitry 715 to charge first capacitor 720 ($C_{x1}$) with the modulated signal (in forward polarity) over the next first sampling time period (e.g., associated with a symbol "16"). First sampling clock signal 740 ($CKS_x$) including enable signal portion 752 is also for enabling clock-driven switch circuitry 715 to charge first capacitor 724 ($C_{x2}$) with the modulated signal (in forward polarity) over the next first sampling time period (e.g., also associated with the symbol "16").

For a "next" first hold phase associated with the next first sample and hold operation, first hold clock signal 742 ($CKH_x$) includes enable signal portion 754 for enabling clock-driven switch circuitry 715 to switchably couple first capacitor 724 ($C_{x2}$) of switched-capacitor circuit 706 to output 711 over a next first hold time period. First hold clock signal 742 ($CKH_x$) also includes enable signal portion 754 for enabling clock-driven switch circuitry 715 to switchably couple first capacitor 720 ($C_{x1}$) of switched-capacitor circuit 704 in the closed feedback loop with first capacitor 724 ($C_{x2}$) of switched-capacitor circuit 706 over the next first hold time period.

A "next" second sample and hold operation associated with the second capacitors of switched-capacitor circuits 702 of FIG. 7A begins at a time during the next first hold time period. Clock signals 700B including second sampling clock signal 744 ($CKS_y$) and second hold clock signal 746 ($CKH_y$) are again utilized. For a next second sampling phase associated with the next second sample and hold operation, second sampling clock signal 744 ($CKS_y$) includes an enable signal portion 756 for enabling clock-driven switch circuitry 715 to charge second capacitor 722 ($C_{y1}$) with the modulated signal (in forward polarity) over a next second sampling time period (e.g., associated with a symbol "24"). Second sampling clock signal 744 ($CKS_y$) including enable signal portion 756 is also for enabling clock-driven switch circuitry 715 to charge second capacitor 726 ($C_{y2}$) with the modulated signal (in forward polarity) over the next second sampling time period (e.g., also associated with the symbol "24").

For a "next" second hold phase associated with the next second sample and hold operation, second hold clock signal 746 ($CKH_y$) includes an enable signal portion 758 (only a portion thereof shown in FIG. 7B) for enabling clock-driven switch circuitry 715 to switchably couple second capacitor 726 ($C_{y2}$) of switched-capacitor circuit 706 to output 711 over a next second hold time period. Second hold clock signal 746 ($CKH_y$) also includes enable signal portion 758 for enabling clock-driven switch circuitry 715 to switchably couple second capacitor 722 ($C_{y1}$) of switched-capacitor circuit 704 in the closed feedback loop with second capacitor 726 ($C_{y2}$) of switched-capacitor circuit 706 over the next second hold time period.

Thus, according to FIG. 7A and FIG. 7B, discrete-time programmable gain amplifier circuit 700A may be based on an MDAC configuration. A discrete-time programmable gain amplifier circuit may comprise a double-sampling sample and hold circuitry including multiple double-sampling switched-capacitor circuits and an operational amplifier. The multiple double-sampling switched-capacitor circuits include at least a first double-sampling switched-capacitor circuit and a second double-sampling switched-capacitor circuit. Respective ones of the first double-sampling switched-capacitor circuit and the second double-sampling switched-capacitor circuit include a first capacitor and a second capacitor.

In one or more examples, a clock-driven switch circuitry of the multiple double-sampling switched-capacitor circuits is to switchably couple respective ones of the first capacitors of the first double-sampling switched-capacitor circuit and the second double-sampling switched-capacitor circuit to a signal input to charge the respective first capacitors with a discrete-time modulated signal over a first sampling time period. The clock-driven switch circuitry is to switchably couple the first capacitor of the first double-sampling switched-capacitor circuit to an amplifier output of the operational amplifier, and the first capacitor of the second double-sampling switched-capacitor circuit in a closed feedback loop with the first capacitor of the first double-sampling switched-capacitor circuit, over a first hold time period. The clock-driven switch circuitry is to switchably couple respective ones of the second capacitors of the first double-sampling switched-capacitor circuit and the second double-sampling switched-capacitor circuit to the signal input to charge the respective second capacitors with the discrete-time modulated signal over a second sampling time period. The clock-driven switch circuitry is to switchably couple the second capacitor of the first double-sampling switched-capacitor circuit to the amplifier output of the operational amplifier, and the second capacitor of the second double-sampling switched-capacitor circuit in a closed feedback loop with the second capacitor of the first double-sampling switched-capacitor circuit, over a second hold time period.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Additional non-limiting examples of the disclosure include:

Example 1: An apparatus comprising: a discrete-time linear equalizer circuit comprising: a sample and hold circuitry including multiple switched-capacitor circuits, the multiple switched-capacitor circuits including at least a switched-capacitor circuit of a pre-cursor tap, a switched-capacitor circuit of a cursor tap, and a switched-capacitor circuit of a post-cursor tap, respective ones of the multiple switched-capacitor circuits including at least a capacitor; and a clock-driven switch circuitry of the multiple switched-capacitor circuits to: switchably couple the capacitor of the switched-capacitor circuit of the pre-cursor tap to a signal input over a first time period, the capacitor of the switched-capacitor circuit of the cursor tap to the signal input over a second time period, and the capacitor of the switched-capacitor circuit of the post-cursor tap to the signal input over a third time period; and switchably couple the capacitor of the switched-capacitor circuit of the cursor tap to an output, and the capacitor of the switched-capacitor circuit of the pre-cursor tap and the capacitor of the switched-capacitor circuit of the post-cursor tap in a closed feedback loop with the capacitor of the switched-capacitor circuit of the cursor tap, over a fourth time period.

Example 2: The apparatus according to Example 1, wherein: the clock-driven switch circuitry is to switchably couple the capacitor of the switched-capacitor circuit of the pre-cursor tap to the signal input over the first time period to charge the capacitor with a modulated signal over the first time period, switchably couple the capacitor of the switched-capacitor circuit of the cursor tap to the signal input over the second time period to charge the capacitor with the modulated signal over the second time period, and switchably couple the capacitor of the switched-capacitor circuit of the post-cursor tap to the signal input over the third time period to charge the capacitor with the modulated signal over the third time period.

Example 3: The apparatus according to any of Examples 1 and 2, wherein in the closed feedback loop, charges from the capacitor of the switched-capacitor circuit of the pre-cursor tap and the capacitor of the switched-capacitor circuit of the post-cursor tap are forced in the capacitor of the switched-capacitor circuit of the cursor tap during the fourth time period.

Example 4: The apparatus according to any of Examples 1 through 3, wherein an output voltage from the output is generated at least partially based on charge redistribution of charges between the capacitor of the switched-capacitor circuit of the pre-cursor tap and the capacitor of the switched-capacitor circuit of the post-cursor tap which are forced in the capacitor of the switched-capacitor circuit of the cursor tap during the fourth time period.

Example 5: The apparatus according to any of Examples 1 through 4, wherein: the sample and hold circuitry includes an operational amplifier; the clock-driven switch circuitry is to switchably couple the capacitor of the switched-capacitor circuit of the pre-cursor tap between the signal input and a non-inverting input of the operational amplifier over the first time period, the capacitor of the switched-capacitor circuit of the cursor tap between the signal input and the non-inverting input of the operational amplifier over the second time period, and the capacitor of the switched-capacitor circuit of the post-cursor tap between the signal input and the non-inverting input of the operational amplifier over the third time period; and the clock-driven switch circuitry is to switchably couple the capacitor of the switched-capacitor circuit of the cursor tap between the output and an inverting input of the operational amplifier, and the capacitor of the switched-capacitor circuit of the pre-cursor tap and the capacitor of the switched-capacitor circuit of the post-cursor tap between a common mode voltage and the inverting input of the operational amplifier, over the fourth time period.

Example 6: The apparatus according to any of Examples 1 through 5, wherein the discrete-time linear equalizer circuit comprises an $M^{th}$ time-multiplexed circuit thread of N time-multiplexed circuit threads of a discrete-time linear equalizer, wherein N is a positive integer and M is a positive integer from 1 to N.

Example 7: The apparatus according to any of Examples 1 through 6, wherein the discrete-time linear equalizer circuit of the $M^{th}$ time-multiplexed circuit thread is to perform equalization in relation to an $M^{th}$ symbol and respective subsequent $(i*N+M)^{th}$ symbols of a modulated signal for consecutive positive integers i.

Example 8: The apparatus according to any of Examples 1 through 7, wherein the discrete-time linear equalizer circuit is to equalize pulse amplitudes of a modulated signal which is modulated according to pulse amplitude modulation—four level (PAM-4).

Example 9: A method comprising: performing signal equalization of a modulated voltage signal by: sampling the modulated voltage signal by charging a first capacitor with the modulated voltage signal over a first time period; sampling the modulated voltage signal by charging a second capacitor with the modulated voltage signal over a second time period; sampling the modulated voltage signal by charging a third capacitor with the modulated voltage signal over a third time period; and coupling the second capacitor to an output, and the first capacitor and the third capacitor in a closed feedback loop with the second capacitor, over a fourth time period.

Example 10: The method according to Example 9, wherein the modulated voltage signal comprises a discrete-time modulated voltage signal, the discrete-time modulated voltage signal including a first symbol during the first time period, a second symbol during the second time period, and a third symbol during the third time period.

Example 11: The method according to any of Examples 9 and 10, wherein in the closed feedback loop, charges from the first capacitor and the third capacitor are forced in the second capacitor during the fourth time period.

Example 12: The method according to any of Examples 9 through 11, wherein an output voltage from the output is generated at least partially based on a charge redistribution of charges between the first capacitor and the third capacitor which are forced in the second capacitor during the fourth time period.

Example 13: The method according to any of Examples 9 through 12, wherein the output voltage is proportional to a summation of products between respective symbol voltages of the first symbol, the second symbol, and the third symbol and respective capacitances of the first capacitor, the second capacitor, and the third capacitor.

Example 14: The method according to any of Examples 9 through 13, wherein the output voltage is at least partially based on a ratio of the summation of products over a capacitance of the second capacitor.

Example 15: The method according to any of Examples 9 through 14, wherein the modulated voltage signal comprises a discrete-time modulated voltage signal, the discrete-time modulated voltage signal including a first symbol during the first time period, a second symbol during the second time period, and a third symbol during the third time period, the method comprising: repeating the performing of the signal equalization for respective consecutive symbols of the discrete-time modulated voltage signal.

Example 16: The method according to any of Examples 9 through 15, wherein repeating the performing of the signal equalization for the respective consecutive symbols of the discrete-time modulated voltage signal are performed at respective ones of N time-multiplexed circuit threads of N discrete-time linear equalizer circuits of a discrete-time linear equalizer, where N is a positive integer.

Example 17: The method according to any of Examples 9 through 16, wherein the output voltage comprises a first output voltage, the method comprising: performing the signal equalization of the modulated voltage signal by: sampling the modulated voltage signal by charging a fourth capacitor with the modulated voltage signal over a fifth time period; sampling the modulated voltage signal by charging a fifth capacitor with the modulated voltage signal over a sixth time period; sampling the modulated voltage signal by charging a sixth capacitor with the modulated voltage signal over a seventh time period; and coupling the fifth capacitor to the output, and the fourth capacitor and the sixth capacitor in a closed feedback loop with the fifth capacitor, over an eighth time period.

Example 18: The method according to any of Examples 9 through 17, wherein in the closed feedback loop, charges from the fourth capacitor and the sixth capacitor are forced in the fifth capacitor during the eighth time period, and a second output voltage from the output is generated at least partially based on a charge redistribution of charges between the fourth capacitor and the sixth capacitor which are forced in the first capacitor during the eighth time period.

Example 19: The method according to any of Examples 9 through 18, wherein performing signal equalization on the modulated voltage signal comprises performing signal equalization on the modulated voltage signal which is modulated according to pulse amplitude modulation—four level (PAM-4).

Example 20: An apparatus comprising: a discrete-time linear equalizer circuit comprising: a double-sampling sample and hold circuitry including multiple double-sampling switched-capacitor circuits and an operational amplifier, the multiple double-sampling switched-capacitor circuits including at least a double-sampling switched-capacitor circuit of a pre-cursor tap, a double-sampling switched-capacitor circuit of a cursor tap, and a double-sampling switched-capacitor circuit of a post-cursor tap, respective ones of the multiple double-sampling switched-capacitor circuits including a first capacitor and a second capacitor; a clock-driven switch circuitry of the multiple double-sampling switched-capacitor circuits to: switchably couple the first capacitor of the double-sampling switched-capacitor circuit of the pre-cursor tap between a signal input and a non-inverting input of the operational amplifier to charge the first capacitor with a modulated signal over a first sampling time period; switchably couple the first capacitor of the double-sampling switched-capacitor circuit of the cursor tap between the signal input and the non-inverting input of the operational amplifier to charge the first capacitor with the modulated signal over a second sampling time period; switchably couple the first capacitor of the double-sampling switched-capacitor circuit of the post-cursor tap between the signal input and the non-inverting input of the operational amplifier to charge the first capacitor with the modulated signal over a third sampling time period; and switchably couple the first capacitor of the double-sampling switched-capacitor circuit of the cursor tap between an amplifier output of the operational amplifier and an inverting input of the operational amplifier, and the first capacitor of the double-sampling switched-capacitor circuit of the pre-cursor tap and the first capacitor of the double-sampling switched-capacitor circuit of the post-cursor tap in a closed feedback loop with the first capacitor of the double-sampling switched-capacitor circuit of the cursor tap, over a first hold time period.

Example 21: The apparatus according to Example 20, wherein: the clock-driven switch circuitry is to: switchably couple the second capacitor of the double-sampling switched-capacitor circuit of the pre-cursor tap between the signal input and the non-inverting input of the operational amplifier to charge the first capacitor with the modulated signal over a fourth sampling time period; switchably couple the second capacitor of the double-sampling switched-capacitor circuit of the cursor tap between the signal input and the non-inverting input of the operational amplifier to charge the second capacitor with the modulated signal over a fifth sampling time period; switchably couple the second capacitor of the double-sampling switched-capacitor circuit of the post-cursor tap between the signal input and the non-inverting input of the operational amplifier to charge the second capacitor with the modulated signal over a sixth sampling time period; and switchably couple the second capacitor of the double-sampling switched-capacitor circuit of the cursor tap between the amplifier output and the inverting input of the operational amplifier, and the second capacitor of the double-sampling switched-capacitor circuit of the pre-cursor tap and the second capacitor of the double-sampling switched-capacitor circuit of the post-cursor tap in a closed feedback loop with the second capacitor of the double-sampling switched-capacitor circuit of the cursor tap, over a second hold time period.

Example 22: The apparatus according to any of Examples 20 and 21, wherein the modulated signal includes a first symbol during the first sampling time period, a second symbol during the second sampling time period, and a third symbol during the third sampling time period, and the modulated signal further includes a fourth symbol during the fourth sampling time period, a fifth symbol during the fifth sampling time period, and a sixth symbol during the sixth sampling time period.

Example 23: The apparatus according to any of Examples 20 through 22, wherein a first output voltage is generated at the amplifier output at least partially based on charge redistribution of charges between the first capacitor of the double-sampling switched-capacitor circuit of the pre-cursor tap and the first capacitor of the double-sampling switched-capacitor circuit of the post-cursor tap during the first hold time period, and a second output voltage is generated at the amplifier output at least partially based on charge redistribution of charges between the second capacitor of the double-sampling switched-capacitor circuit of the pre-cursor tap and the second capacitor of the double-sampling switched-capacitor circuit of the post-cursor tap during the second hold time period.

Example 24: The apparatus according to any of Examples 20 through 23, wherein the discrete-time linear equalizer circuit comprises an $M^{th}$ time-multiplexed circuit thread of N time-multiplexed circuit threads of a discrete-time linear equalizer, wherein N is a positive integer and M is a positive integer from 1 to N.

Example 25: The apparatus according to any of Examples 20 through 24, wherein the discrete-time linear equalizer circuit of the $M^{th}$ time-multiplexed circuit thread is to perform signal equalization in relation to an $M^{th}$ symbol and respective subsequent $(i*N+M)^{th}$ symbols of a modulated signal for consecutive positive integers i.

Example 26: The apparatus according to any of Examples 20 through 25, wherein N=8.

Example 27: The apparatus according to any of Examples 20 through 26, wherein the discrete-time linear equalizer circuit is to perform signal equalization in relation to the modulated signal which is modulated according to pulse amplitude modulation—four level (PAM-4).

Example 28: An apparatus comprising: a discrete-time linear equalizer, the discrete-time linear equalizer comprising a set of N time-multiplexed circuit threads of N discrete-time linear equalizer circuits, respective $M^{th}$ ones of the N discrete-time linear equalizer circuits to perform signal equalization in relation to an $M^{th}$ symbol and respective subsequent $(i*N+M)^{th}$ symbols of a modulated signal for consecutive positive integers i, wherein N is a positive integer and M is a positive integer from 1 to N, the respective $M^{th}$ ones of the N discrete-time linear equalizer circuits comprising: a double-sampling sample and hold circuitry including multiple double-sampling switched-capacitor circuits and an operational amplifier, the multiple double-sampling switched-capacitor circuits including at least a double-sampling switched-capacitor circuit of a pre-cursor tap, a double-sampling switched-capacitor circuit of a cursor tap, and a double-sampling switched-capacitor circuit of a post-cursor tap, the double-sampling switched-capacitor circuit of the pre-cursor tap including a first capacitor $C_{-1x}$ and a second capacitor $C_{-1y}$, the double-sampling switched-capacitor circuit of the cursor tap including a first capacitor $C_{0x}$ and a second capacitor $C_{0y}$, and the double-sampling switched-capacitor circuit of the post-cursor tap including at least a first capacitor $C_{1x}$ and a second capacitor $C_{1y}$; a clock-driven switch circuitry, the clock-driven switch circuitry to switchably couple the first capacitor $C_{-1x}$ to a signal input to charge the first capacitor $C_{-1x}$ with a modulated signal over an $(M-1)^{th}$ sampling time period, the first capacitor $C_{0x}$ to the signal input to charge the first capacitor $C_{0x}$ with the modulated signal over an $M^{th}$ sampling time period, and the first capacitor $C_{1x}$ to the signal input to charge the first capacitor $C_{1x}$ with the modulated signal over an (M+1) sampling time period; the clock-driven switch circuitry to switchably couple the first capacitor $C_{0x}$ to an amplifier output of the operational amplifier, and in closed feedback loop with the first capacitor $C_{-1x}$ and the first capacitor $C_{1x}$, over an $M^{th}$ hold time period; the clock-driven switch circuitry to switchably couple the second capacitor $C_{-1y}$ to the signal input to charge the second capacitor $C_{-1y}$ with the modulated signal over an $(M+N+1)$ sampling time period, the second capacitor $C_{0y}$ to the signal input to charge the second capacitor $C_{0y}$ with the modulated signal over an $(M+N)^{th}$ sampling time period, and the second capacitor $C_{1y}$ to the signal input to charge the second capacitor $C_{1y}$ with the modulated signal over an $(M+N+1)$ sampling time period; and the clock-driven switch circuitry to switchably couple the second capacitor $C_{0y}$ to the amplifier output of the operational amplifier, and in a closed feedback loop with the second capacitor $C_{-1y}$ and the second capacitor $C_{1y}$, over an $(M+N)^{th}$ hold time period.

Example 29: The apparatus according to Example 28, wherein a first output voltage is generated at the amplifier output at least partially based on charge redistribution of charges between the first capacitor $C_{-1x}$ and the first capacitor $C_{1x}$ during the $M^{th}$ hold time period, and a second output voltage is generated at the amplifier output at least partially based on charge redistribution of charges between the second capacitor $C_{-1y}$ and the second capacitor $C_{1y}$ during the $(M+N)^{th}$ hold time period.

Example 30: The apparatus according to any of Examples 28 and 29, wherein: the first output voltage is based on a mathematical relation $$V_{OUT_1} = \frac{C_{-1X} * d_{M-1} + C_{0X} * d_M + C_{1X} * d_{M+1}}{C_{0X}},$$

where $V_{OUT1}$ is the first output voltage, $C_{-1x}$, $C_{0x}$, and $C_{1x}$ are respective capacitances of the first capacitors $C_{-1x}$, $C_{0x}$, and $C_{1x}$, and $d_{M-1}$ is a voltage of an $(M-1)^{th}$ symbol during the $(M-1)^{th}$ sampling time period, $d_M$ is a voltage of an $M^{th}$ symbol during the $M^{th}$ sampling time period, and $d_{M+1}$ is a voltage of an $(M+1)^{th}$ symbol during the $(M+1)^{th}$ sampling time period, and the second output voltage is based on a mathematical relation $$V_{OUT_2} = \frac{C_{-1Y} * d_{M+N-1} + C_{0Y} * d_{M+N} + C_{1Y} * d_{M+N+1}}{C_{0Y}},$$

where $V_{OUT2}$ is the second output voltage, $C_{-1y}$, $C_{0y}$, and $C_{1y}$ are respective capacitances of the second capacitors $C_{-1y}$, $C_{0y}$, and $C_{1y}$, and $d_{M+N-1}$ is a voltage of an $(M+N+1)^{th}$ symbol during the $(M+N-1)^{th}$ sampling time period, $d_{M+N}$ is a voltage of an $(M+N)^{th}$ symbol during the $(M+N)^{th}$ sampling time period, and $d_{M+N+1}$ is a voltage of an $(M+N+1)^{th}$ symbol during the $(M+N+1)^{th}$ sampling time period.

Example 31: The apparatus according to any of Examples 28 through 30, wherein N=8.

Example 32: The apparatus according to any of Examples 28 through 31, wherein the respective $M^{th}$ ones of the N discrete-time linear equalizer circuits are to perform signal equalization in relation to the modulated signal which is modulated according to pulse amplitude modulation—four level (PAM-4).

Example 33: The apparatus according to any of Examples 28 through 32, wherein the set of N time-multiplexed circuit threads of N discrete-time linear equalizer circuits are time-multiplexed in a round-robin manner, and the N discrete-time linear equalizer circuits are substantially identical to each other.

What is claimed is:

1. An apparatus comprising:
a discrete-time linear equalizer circuit comprising:
  a sample and hold circuitry including multiple switched-capacitor circuits, the multiple switched-capacitor circuits including at least a switched-capacitor circuit of a pre-cursor tap, a switched-capacitor circuit of a cursor tap, and a switched-capacitor circuit of a post-cursor tap, respective ones of the multiple switched-capacitor circuits including at least a capacitor; and
  a clock-driven switch circuitry of the multiple switched-capacitor circuits to:
    switchably couple the capacitor of the switched-capacitor circuit of the pre-cursor tap to a signal input over a first time period, the capacitor of the switched-capacitor circuit of the cursor tap to the signal input over a second time period, and the capacitor of the switched-capacitor circuit of the post-cursor tap to the signal input over a third time period; and
    switchably couple the capacitor of the switched-capacitor circuit of the cursor tap to an output, and the capacitor of the switched-capacitor circuit of the pre-cursor tap and the capacitor of the switched-capacitor circuit of the post-cursor tap in a closed feedback loop with the capacitor of the switched-capacitor circuit of the cursor tap, over a fourth time period.

2. The apparatus of claim 1, wherein:
the clock-driven switch circuitry is to switchably couple the capacitor of the switched-capacitor circuit of the pre-cursor tap to the signal input over the first time period to charge the capacitor with a modulated signal over the first time period, switchably couple the capacitor of the switched-capacitor circuit of the cursor tap to the signal input over the second time period to charge the capacitor with the modulated signal over the second time period, and switchably couple the capacitor of the switched-capacitor circuit of the post-cursor tap to the signal input over the third time period to charge the capacitor with the modulated signal over the third time period.

3. The apparatus of claim 2, wherein in the closed feedback loop, charges from the capacitor of the switched-capacitor circuit of the pre-cursor tap and the capacitor of the switched-capacitor circuit of the post-cursor tap are forced in the capacitor of the switched-capacitor circuit of the cursor tap during the fourth time period.

4. The apparatus of claim 3, wherein an output voltage from the output is generated at least partially based on charge redistribution of charges between the capacitor of the switched-capacitor circuit of the pre-cursor tap and the capacitor of the switched-capacitor circuit of the post-cursor tap which are forced in the capacitor of the switched-capacitor circuit of the cursor tap during the fourth time period.

5. The apparatus of claim 1, wherein:
the sample and hold circuitry includes an operational amplifier;
the clock-driven switch circuitry is to switchably couple the capacitor of the switched-capacitor circuit of the pre-cursor tap between the signal input and a non-inverting input of the operational amplifier over the first time period, the capacitor of the switched-capacitor circuit of the cursor tap between the signal input and the non-inverting input of the operational amplifier over the second time period, and the capacitor of the switched-capacitor circuit of the post-cursor tap between the signal input and the non-inverting input of the operational amplifier over the third time period; and
the clock-driven switch circuitry is to switchably couple the capacitor of the switched-capacitor circuit of the cursor tap between the output and an inverting input of the operational amplifier, and the capacitor of the switched-capacitor circuit of the pre-cursor tap and the capacitor of the switched-capacitor circuit of the post-cursor tap between a common mode voltage and the inverting input of the operational amplifier, over the fourth time period.

6. The apparatus of claim 1, wherein the discrete-time linear equalizer circuit comprises an $M^{th}$ time-multiplexed circuit thread of N time-multiplexed circuit threads of a discrete-time linear equalizer, wherein N is a positive integer and M is a positive integer from 1 to N.

7. The apparatus of claim 6, wherein the discrete-time linear equalizer circuit of the $M^{th}$ time-multiplexed circuit thread is to perform equalization in relation to an $M^{th}$ symbol and respective subsequent $(i*N+M)^{th}$ symbols of a modulated signal for consecutive positive integers i.

8. The apparatus of claim 1, wherein the discrete-time linear equalizer circuit is to equalize pulse amplitudes of a modulated signal which is modulated according to pulse amplitude modulation—four level (PAM-4).

9. A method comprising:
performing signal equalization of a modulated voltage signal by:
sampling the modulated voltage signal by charging a first capacitor with the modulated voltage signal over a first time period;
sampling the modulated voltage signal by charging a second capacitor with the modulated voltage signal over a second time period;
sampling the modulated voltage signal by charging a third capacitor with the modulated voltage signal over a third time period; and
coupling the second capacitor to an output, and the first capacitor and the third capacitor in a closed feedback loop with the second capacitor, over a fourth time period.

10. The method of claim 9, wherein the modulated voltage signal comprises a discrete-time modulated voltage signal, the discrete-time modulated voltage signal including a first symbol during the first time period, a second symbol during the second time period, and a third symbol during the third time period.

11. The method of claim 10, wherein in the closed feedback loop, charges from the first capacitor and the third capacitor are forced in the second capacitor during the fourth time period.

12. The method of claim 11, wherein an output voltage from the output is generated at least partially based on a charge redistribution of charges between the first capacitor and the third capacitor which are forced in the second capacitor during the fourth time period.

13. The method of claim 12, wherein the output voltage is proportional to a summation of products between respective symbol voltages of the first symbol, the second symbol, and the third symbol and respective capacitances of the first capacitor, the second capacitor, and the third capacitor.

14. The method of claim 13, wherein the output voltage is at least partially based on a ratio of the summation of products over a capacitance of the second capacitor.

15. The method of claim 9, wherein the modulated voltage signal comprises a discrete-time modulated voltage signal, the discrete-time modulated voltage signal including a first symbol during the first time period, a second symbol during the second time period, and a third symbol during the third time period, the method comprising:
repeating the performing of the signal equalization for respective consecutive symbols of the discrete-time modulated voltage signal.

16. The method of claim 15, wherein repeating the performing of the signal equalization for the respective consecutive symbols of the discrete-time modulated voltage signal are performed at respective ones of N time-multiplexed circuit threads of N discrete-time linear equalizer circuits of a discrete-time linear equalizer, where N is a positive integer.

17. The method of claim 12, wherein the output voltage comprises a first output voltage, the method comprising:
performing the signal equalization of the modulated voltage signal by:
sampling the modulated voltage signal by charging a fourth capacitor with the modulated voltage signal over a fifth time period;

sampling the modulated voltage signal by charging a fifth capacitor with the modulated voltage signal over a sixth time period;

sampling the modulated voltage signal by charging a sixth capacitor with the modulated voltage signal over a seventh time period; and coupling the fifth capacitor to the output, and the fourth capacitor and the sixth capacitor in a closed feedback loop with the fifth capacitor, over an eighth time period.

18. The method of claim 17, wherein in the closed feedback loop, charges from the fourth capacitor and the sixth capacitor are forced in the fifth capacitor during the eighth time period, and a second output voltage from the output is generated at least partially based on a charge redistribution of charges between the fourth capacitor and the sixth capacitor which are forced in the first capacitor during the eighth time period.

19. The method of claim 9, wherein performing signal equalization on the modulated voltage signal comprises performing signal equalization on the modulated voltage signal which is modulated according to pulse amplitude modulation—four level (PAM-4).

20. An apparatus comprising:
a discrete-time linear equalizer circuit comprising:
a double-sampling sample and hold circuitry including multiple double-sampling switched-capacitor circuits and an operational amplifier, the multiple double-sampling switched-capacitor circuits including at least a double-sampling switched-capacitor circuit of a pre-cursor tap, a double-sampling switched-capacitor circuit of a cursor tap, and a double-sampling switched-capacitor circuit of a post-cursor tap, respective ones of the multiple double-sampling switched-capacitor circuits including a first capacitor and a second capacitor;
a clock-driven switch circuitry of the multiple double-sampling switched-capacitor circuits to:
switchably couple the first capacitor of the double-sampling switched-capacitor circuit of the pre-cursor tap between a signal input and a non-inverting input of the operational amplifier to charge the first capacitor with a modulated signal over a first sampling time period;
switchably couple the first capacitor of the double-sampling switched-capacitor circuit of the cursor tap between the signal input and the non-inverting input of the operational amplifier to charge the first capacitor with the modulated signal over a second sampling time period;
switchably couple the first capacitor of the double-sampling switched-capacitor circuit of the post-cursor tap between the signal input and the non-inverting input of the operational amplifier to charge the first capacitor with the modulated signal over a third sampling time period; and
switchably couple the first capacitor of the double-sampling switched-capacitor circuit of the cursor tap between an amplifier output of the operational amplifier and an inverting input of the operational amplifier, and the first capacitor of the double-sampling switched-capacitor circuit of the pre-cursor tap and the first capacitor of the double-sampling switched-capacitor circuit of the post-cursor tap in a closed feedback loop with the first capacitor of the double-sampling switched-capacitor circuit of the cursor tap, over a first hold time period.

21. The apparatus of claim 20, wherein:
the clock-driven switch circuitry is to:
switchably couple the second capacitor of the double-sampling switched-capacitor circuit of the pre-cursor tap between the signal input and the non-inverting input of the operational amplifier to charge the first capacitor with the modulated signal over a fourth sampling time period;
switchably couple the second capacitor of the double-sampling switched-capacitor circuit of the cursor tap between the signal input and the non-inverting input of the operational amplifier to charge the second capacitor with the modulated signal over a fifth sampling time period;
switchably couple the second capacitor of the double-sampling switched-capacitor circuit of the post-cursor tap between the signal input and the non-inverting input of the operational amplifier to charge the second capacitor with the modulated signal over a sixth sampling time period; and
switchably couple the second capacitor of the double-sampling switched-capacitor circuit of the cursor tap between the amplifier output and the inverting input of the operational amplifier, and the second capacitor of the double-sampling switched-capacitor circuit of the pre-cursor tap and the second capacitor of the double-sampling switched-capacitor circuit of the post-cursor tap in a closed feedback loop with the second capacitor of the double-sampling switched-capacitor circuit of the cursor tap, over a second hold time period.

22. The apparatus of claim 21, wherein the modulated signal includes a first symbol during the first sampling time period, a second symbol during the second sampling time period, and a third symbol during the third sampling time period, and the modulated signal further includes a fourth symbol during the fourth sampling time period, a fifth symbol during the fifth sampling time period, and a sixth symbol during the sixth sampling time period.

23. The apparatus of claim 22, wherein a first output voltage is generated at the amplifier output at least partially based on charge redistribution of charges between the first capacitor of the double-sampling switched-capacitor circuit of the pre-cursor tap and the first capacitor of the double-sampling switched-capacitor circuit of the post-cursor tap during the first hold time period, and a second output voltage is generated at the amplifier output at least partially based on charge redistribution of charges between the second capacitor of the double-sampling switched-capacitor circuit of the pre-cursor tap and the second capacitor of the double-sampling switched-capacitor circuit of the post-cursor tap during the second hold time period.

24. The apparatus of claim 21, wherein the discrete-time linear equalizer circuit comprises an $M^{th}$ time-multiplexed circuit thread of N time-multiplexed circuit threads of a discrete-time linear equalizer, wherein N is a positive integer and M is a positive integer from 1 to N.

25. The apparatus of claim 24, wherein the discrete-time linear equalizer circuit of the $M^{th}$ time-multiplexed circuit thread is to perform signal equalization in relation to an $M^{th}$ symbol and respective subsequent $(i*N+M)^{th}$ symbols of a modulated signal for consecutive positive integers i.

26. The apparatus of claim 25, wherein N=8.

27. The apparatus of claim 20, wherein the discrete-time linear equalizer circuit is to perform signal equalization in relation to the modulated signal which is modulated according to pulse amplitude modulation—four level (PAM-4).

28. An apparatus comprising:

a discrete-time linear equalizer, the discrete-time linear equalizer comprising a set of N time-multiplexed circuit threads of N discrete-time linear equalizer circuits, respective $M^{th}$ ones of the N discrete-time linear equalizer circuits to perform signal equalization in relation to an $M^{th}$ symbol and respective subsequent $(i*N+M)^{th}$ symbols of a modulated signal for consecutive positive integers i, wherein N is a positive integer and M is a positive integer from 1 to N, the respective $M^{th}$ ones of the N discrete-time linear equalizer circuits comprising:

a double-sampling sample and hold circuitry including multiple double-sampling switched-capacitor circuits and an operational amplifier, the multiple double-sampling switched-capacitor circuits including at least a double-sampling switched-capacitor circuit of a pre-cursor tap, a double-sampling switched-capacitor circuit of a cursor tap, and a double-sampling switched-capacitor circuit of a post-cursor tap, the double-sampling switched-capacitor circuit of the pre-cursor tap including a first capacitor $C_{-1x}$ and a second capacitor $C_{-1y}$, the double-sampling switched-capacitor circuit of the cursor tap including a first capacitor $C_{0x}$ and a second capacitor $C_{0y}$, and the double-sampling switched-capacitor circuit of the post-cursor tap including at least a first capacitor $C_{1x}$ and a second capacitor $C_{1y}$;

a clock-driven switch circuitry, the clock-driven switch circuitry to switchably couple the first capacitor $C_{-1x}$ to a signal input to charge the first capacitor $C_{-1x}$ with a modulated signal over an $(M-1)^{th}$ sampling time period, the first capacitor $C_{0x}$ to the signal input to charge the first capacitor $C_{0x}$ with the modulated signal over an $M^{th}$ sampling time period, and the first capacitor $C_{1x}$ to the signal input to charge the first capacitor $C_{1x}$ with the modulated signal over an $(M+1)^{th}$ sampling time period;

the clock-driven switch circuitry to switchably couple the first capacitor $C_{0x}$ to an amplifier output of the operational amplifier, and in closed feedback loop with the first capacitor $C_{-1x}$ and the first capacitor $C_{1x}$, over an $M^{th}$ hold time period;

the clock-driven switch circuitry to switchably couple the second capacitor $C_{-1y}$ to the signal input to charge the second capacitor $C_{-1y}$ with the modulated signal over an $(M+N+1)^{th}$ sampling time period, the second capacitor $C_{0y}$ to the signal input to charge the second capacitor $C_{0y}$ with the modulated signal over an $(M+N)^{th}$ sampling time period, and the second capacitor $C_{1y}$ to the signal input to charge the second capacitor $C_{1y}$ with the modulated signal over an $(M+N+1)^{th}$ sampling time period; and the clock-driven switch circuitry to switchably couple the second capacitor $C_{0y}$ to the amplifier output of the operational amplifier, and in a closed feedback loop with the second capacitor $C_{-1y}$ and the second capacitor $C_{1y}$, over an $(M+N)^{th}$ hold time period.

29. The apparatus of claim 28, wherein a first output voltage is generated at the amplifier output at least partially based on charge redistribution of charges between the first capacitor $C_{-1x}$ and the first capacitor $C_{1x}$ during the $M^{th}$ hold time period, and a second output voltage is generated at the amplifier output at least partially based on charge redistribution of charges between the second capacitor $C_{-1y}$ and the second capacitor $C_{1y}$ during the $(M+N)^{th}$ hold time period.

30. The apparatus of claim 29, wherein:

the first output voltage is based on a mathematical relation $$V_{OUT1} = \frac{C_{-1X}*d_{M-1} + C_{0X}*d_M + C_{1X}*d_{M+1}}{C_{0X}},$$

where $V_{OUT1}$ is the first output voltage, $C_{-1x}$, $C_{0x}$, and $C_{1x}$ are respective capacitances of the first capacitors $C_{-1x}$, $C_{0x}$, and $C_{1x}$, and $d_{M-1}$ is a voltage of an $(M-1)^{th}$ symbol during the $(M-1)^{th}$ sampling time period, $d_M$ is a voltage of an $M^{th}$ symbol during the $M^{th}$ sampling time period, and $d_{M+1}$ is a voltage of an $(M+1)^{th}$ symbol during the $(M+1)^{th}$ sampling time period, and the second output voltage is based on a mathematical relation $$V_{OUT2} = \frac{C_{-1Y}*d_{M+N-1} + C_{0Y}*d_{M+N} + C_{1Y}*d_{M+N+1}}{C_{0Y}},$$

where $V_{OUT2}$ is the second output voltage, $C_{-1y}$, $C_{0y}$, and $C_{1y}$ are respective capacitances of the second capacitors $C_{-1y}$, $C_{0y}$, and $C_{1y}$, and $d_{M+N-1}$ is a voltage of an $(M+N-1)^{th}$ symbol during the $(M+N-1)^{th}$ sampling time period, $d_{M+N}$ is a voltage of an $(M+N)^{th}$ symbol during the $(M+N)^{th}$ sampling time period, and $d_{M+N+1}$ is a voltage of an $(M+N+1)^{th}$ symbol during the $(M+N+1)^{th}$ sampling time period.

31. The apparatus of claim 29, wherein N=8.

32. The apparatus of claim 28, wherein the respective $M^{th}$ ones of the N discrete-time linear equalizer circuits are to perform signal equalization in relation to the modulated signal which is modulated according to pulse amplitude modulation—four level (PAM-4).

33. The apparatus of claim 28, wherein the set of N time-multiplexed circuit threads of N discrete-time linear equalizer circuits are time-multiplexed in a round-robin manner, and the N discrete-time linear equalizer circuits are substantially identical to each other.

* * * * *

UNITED STATES PATENT AND TRADEMARK OFFICE
CERTIFICATE OF CORRECTION

PATENT NO. : 12,489,659 B2  
APPLICATION NO. : 18/640493  
DATED : December 2, 2025  
INVENTOR(S) : Johannes G. Ransijn Page 1 of 1

It is certified that error appears in the above-identified patent and that said Letters Patent is hereby corrected as shown below:

In the Specification

| | | | |
|---|---|---|---|
| Column 1, | Lines 9-10, | change "titled "Improved-Discrete-Time Linear" to --titled "Discrete-Time Linear-- | |
| Column 21, | Lines 9-10, | change "over an $(M+N+1)^{th}$ sampling" to --over an $(M+N-1)^{th}$ sampling-- | |
| Column 29, | Line 47, | change "and R is" to --and $\beta$ is-- | |
| Column 31, | Line 35, | change "capacitor $C_{1x}$ to a" to --capacitor $C_{-1x}$ to a-- | |
| Column 31, | Line 45, | change "capacitor $C_{1x}$ and" to --capacitor $C_{-1x}$ and-- | |
| Column 31, | Line 49, | change "an $(M+N+1)^{th}$ sampling" to --an $(M+N-1)^{th}$ sampling-- | |
| Column 31, | Line 63, | change "capacitor $C_{1x}$ and" to --capacitor $C_{-1x}$ and-- | |
| Column 45, | Line 39, | change "over an $(M+1)$ sampling" to --over an $(M+1)^{th}$ sampling-- | |
| Column 45, | Lines 48-49, | change "over an $(M+N+1)$ sampling" to --over an $(M+N-1)^{th}$ sampling-- | |
| Column 45, | Lines 53-54, | change "over an $(M+N+1)$ sampling" to --over an $(M+N+1)^{th}$ sampling-- | |
| Column 46, | Lines 24-25, | change "of an $(M+N+1)^{th}$ symbol" to --of an $(M+N-1)^{th}$ symbol;-- | |

In the Claims

| | | | |
|---|---|---|---|
| Claim 28, | Column 51, | Line 52, | change "of an $(M+N+1)^{th}$ sampling" to --of an $(M+N-1)^{th}$ sampling-- |

Signed and Sealed this  
Tenth Day of February, 2026

John A. Squires  
*Director of the United States Patent and Trademark Office*